(12) United States Patent
Schieke et al.

(10) Patent No.: US 12,174,108 B2
(45) Date of Patent: Dec. 24, 2024

(54) SYSTEM AND METHOD FOR CORROSION AND EROSION MONITORING OF FIXED EQUIPMENT

(71) Applicant: Molex, LLC, Lisle, IL (US)

(72) Inventors: Sascha Schieke, Geneva, IL (US); Alexander S. Chernyshov, Satellite Beach, FL (US); Mariusz Kloza, Orlando, FL (US); Raymundo Velarde, Round Lake, IL (US); Dumitru Rosca, Naperville, IL (US); Ke Wang, Naperville, IL (US)

(73) Assignee: Molex, LLC, Lisle, IL (US)

( * ) Notice: Subject to any disclaimer, the term of this patent is extended or adjusted under 35 U.S.C. 154(b) by 248 days.

(21) Appl. No.: 17/800,545

(22) PCT Filed: Mar. 1, 2021

(86) PCT No.: PCT/IB2021/051697
§ 371 (c)(1),
(2) Date: Aug. 18, 2022

(87) PCT Pub. No.: WO2021/171273
PCT Pub. Date: Sep. 2, 2021

(65) Prior Publication Data
US 2023/0064270 A1    Mar. 2, 2023

Related U.S. Application Data

(63) Continuation-in-part of application No. PCT/US2020/063683, filed on Dec. 8, 2020.
(Continued)

(51) Int. Cl.
*G01N 17/00* (2006.01)
*G01N 17/04* (2006.01)
(Continued)

(52) U.S. Cl.
CPC .......... *G01N 17/006* (2013.01); *G01N 17/04* (2013.01); *G01N 29/043* (2013.01); *G01N 29/07* (2013.01);
(Continued)

(58) Field of Classification Search
CPC .... G01N 17/006; G01N 17/04; G01N 29/043; G01N 29/07; G01N 29/22; G01N 29/48;
(Continued)

(56) References Cited

U.S. PATENT DOCUMENTS

| | | | |
|---|---|---|---|
| 4,398,421 A | 8/1983 | White | |
| 6,396,262 B2* | 5/2002 | Light | G01N 29/2412 324/240 |

(Continued)

FOREIGN PATENT DOCUMENTS

| | | |
|---|---|---|
| EP | 2995942 A1 | 3/2016 |
| JP | 2013024817 A | 2/2013 |
| KR | 102183743 B1 | 11/2020 |
| WO | 2014190268 A1 | 11/2014 |
| WO | 2019177905 A1 | 9/2019 |

OTHER PUBLICATIONS

API Recommended Practice 574, "Inspection Practices for Piping System Components," Fourth Edition, American Petroleum Institute, pp. 124, 2016.
(Continued)

*Primary Examiner* — Jacques M Saint Surin

(57) ABSTRACT

This disclosure relates to the monitoring and detection of corrosion and/or erosion of pipes, vessels, and other components in an industrial facility. The monitoring system may comprise of an arrangement of guided wave (GW) transducers and a longitudinal wave (LW) transducer affixed to the piping component to collectively measure for localized corrosion of the piping component without necessarily requiring a thickness map. The monitoring system may use
(Continued)

an intelligent amplified multiplexer/switch to control the operation of the transducers that may be controlled and operated to generate waves in the kilohertz range and megahertz range with the same hardware.

20 Claims, 34 Drawing Sheets

Related U.S. Application Data

(60) Provisional application No. 62/982,751, filed on Feb. 28, 2020.

(51) Int. Cl.
| | |
|---|---|
| *G01N 29/04* | (2006.01) |
| *G01N 29/06* | (2006.01) |
| *G01N 29/07* | (2006.01) |
| *G01N 29/11* | (2006.01) |
| *G01N 29/22* | (2006.01) |
| *G01N 29/48* | (2006.01) |

(52) U.S. Cl.
CPC ............ *G01N 29/11* (2013.01); *G01N 29/22* (2013.01); *G01N 29/48* (2013.01); *G01N 29/0645* (2013.01); *G01N 2291/011* (2013.01); *G01N 2291/015* (2013.01); *G01N 2291/0234* (2013.01); *G01N 2291/0422* (2013.01); *G01N 2291/044* (2013.01); *G01N 2291/2634* (2013.01)

(58) Field of Classification Search
CPC ............ G01N 29/418; G01N 29/223; G01N 29/343; G01N 29/4418; G01N 29/4481; G01N 29/348; G01N 2291/011; G01N 2291/0421; G01N 2291/02854; G01N 29/0645; G01N 2291/0425; G01N 2291/015; G01N 2291/0258; G01N 2291/2634; G01N 2291/0234; G01N 2291/0423; G01N 2291/0422; G01B 17/02
USPC .......................................................... 73/579
See application file for complete search history.

(56) References Cited

U.S. PATENT DOCUMENTS

| | | | |
|---|---|---|---|
| 10,513,922 B2* | 12/2019 | Gao | E21B 47/13 |
| 10,605,719 B2* | 3/2020 | Detor | G01B 11/02 |
| 11,182,891 B2* | 11/2021 | Sheri | G06T 7/0006 |
| 11,519,560 B2* | 12/2022 | Zhang | G01M 3/2815 |
| 2004/0255678 A1 | 12/2004 | Nagashima et al. | |
| 2009/0158850 A1 | 6/2009 | Alleyne et al. | |
| 2013/0197846 A1 | 8/2013 | Kuroda | |
| 2019/0316902 A1 | 10/2019 | Sparago | |
| 2020/0088686 A1 | 3/2020 | Sinha et al. | |
| 2020/0240954 A1 | 7/2020 | Saboonchi et al. | |
| 2020/0285988 A1 | 9/2020 | Saha et al. | |

OTHER PUBLICATIONS

Daycounter—Engineering Resources, "Sallen-Key Low Pass Butterworth Filter Calculator," Retrieved from the Internet URL: https://daycounter.com/Filters/Sallen-Key-LP-Calculator2.phtml, p. 1, 2022.
Mike Sparago, "Statistical Tools for Ultrasonic Thickness Data Analysis, Part 1: Piping Thickness Analysis", Inspectioneering Journal, 05 Pages, Jan. 1999.
Mike Sparago. "Statistical Tools for Ultrasonic Thickness Data Analysis, Part 2: Remaining Life Estimates", Inspectioneering Journal, 07 Pages, Mar. 1999.
Streamwise, "Pattern recognition and machine learning for event detection in sensor data," Retrieved from the Internet URL: https://www.streamwise.ch/2019/03/15/pattern_and_machine_learning/, pp. 2, 2020.
International Preliminary Report on Patentability received for PCT Application No. PCT/US2020/063683, mailed on Jun. 22, 2023, 6 pages.
Lingyu, Yu et al., "In-situ Multi-mode Sensing With Embedded Piezoelectric Wafer Active Sensors For Critical Pipeline Health Monitoring", ASME International Mechanical Engineering Congress and Exposition, Seattle, Washington, USA, Nov. 11-15, 2007, pp. 1-10.
Lozev, M.G et al., "Evaluation of methods for detecting and monitoring of corrosion damage in risers", 22nd International Conference on Offshore Mechanics & Arctic Engineering, vol. 127, Aug. 2005, pp. 244-254.

* cited by examiner

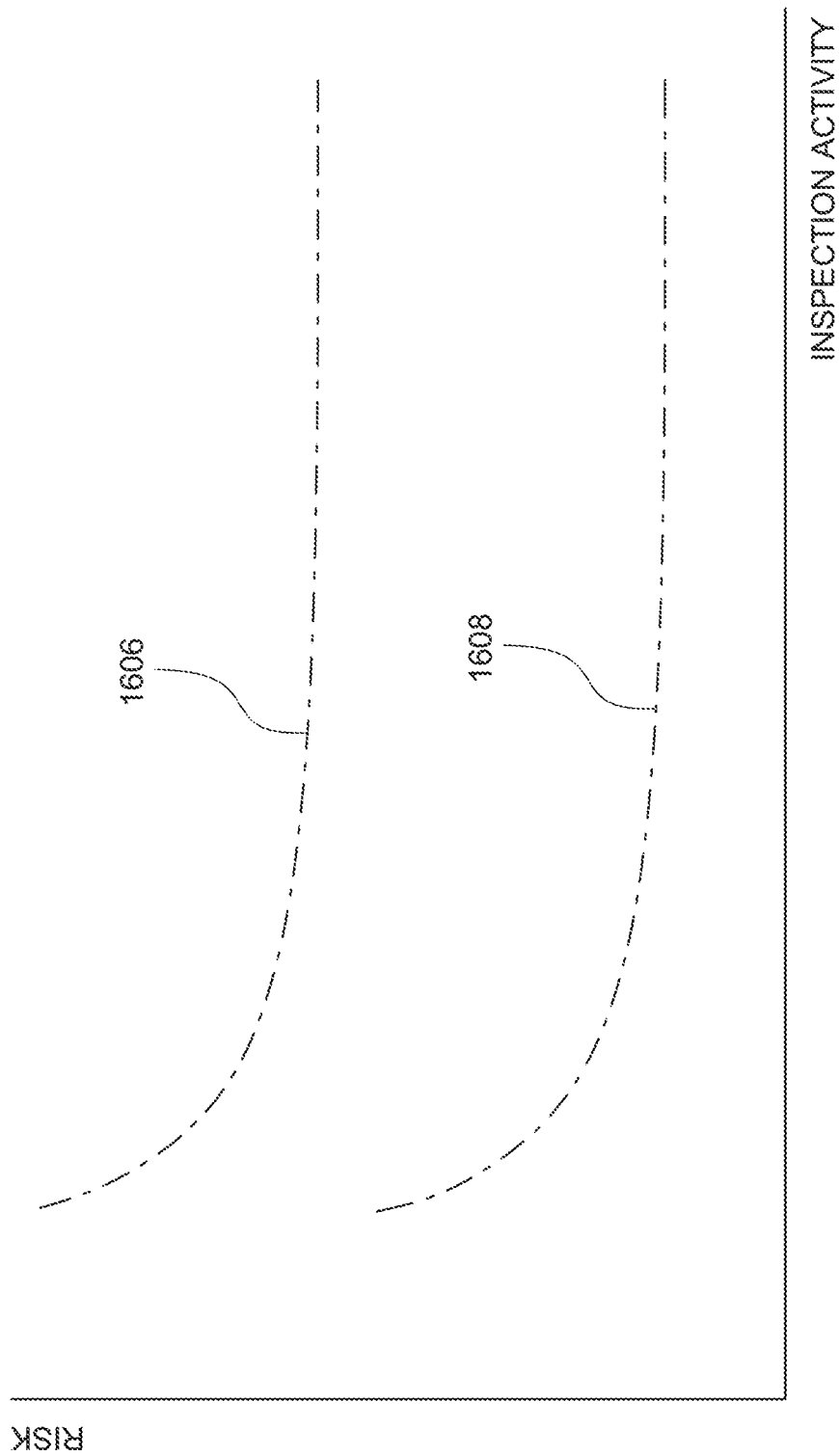

SYSTEM AND METHOD FOR CORROSION AND EROSION MONITORING OF FIXED EQUIPMENT

RELATED APPLICATIONS

This application is a national phase of PCT/IB2021/051697, filed Mar. 1, 2021 which claims the benefit of priority to U.S. provisional patent application Ser. No. 62/982,751, filed Feb. 28, 2020, with title "SYSTEM AND METHOD FOR CORROSION AND EROSION MONITORING OF PIPES AND VESSELS." This application is also a continuation-in-part of international PCT patent application serial no. PCT/US2020/063683, filed Dec. 8, 2020. All the aforementioned patent applications are herein incorporated by reference in their entireties.

TECHNICAL FIELD

This disclosure relates to the field of corrosion and erosion monitoring of fixed equipment (e.g., pipes, vessels, tanks, and others). Specifically, this disclosure relates to a corrosion and/or erosion monitoring system comprising mechanical components, hardware, software, analytics, and/or a combination thereof. In one embodiment, the mechanical components and hardware may comprise one or more ultrasonic transducers, base units, gateways, and/or combination thereof. The system may further comprise a software platform for remote monitoring. The system may further comprise, in some embodiments, analytics tools for front-end services and back-end services for remote monitoring and/or diagnostics. More specifically, in some embodiments, this disclosure may relate to a system and method for corrosion and erosion monitoring of fixed equipment, where the system/method combines ultrasonic thickness monitoring using longitudinal waves with ultrasonic area monitoring using one or more guided waves, whereby representative thickness measurements are complemented by an area monitoring feature to detect localized corrosion/erosion in between representative thickness measurement locations. In another embodiment, a system and method for optimized asset health monitoring that includes an analytics solution is disclosed.

DESCRIPTION OF RELATED ART

The use of ultrasonic transducers for ultrasonically monitoring the condition and integrity of structural assets, including pipes and pressure vessels, such as those used in the oil and gas and power generation industries, is well-known. At present, corrosion and erosion monitoring systems and techniques incorporating/using ultrasonic transducers are known to include thickness monitoring at a location and area monitoring (also known as guided wave inspection). However, these two systems and techniques are typically separate from one another. Moreover, internal corrosion of piping systems is also sometimes monitored using radiographic (RT) thickness testing, in addition to ultrasonic (UT) testing, to measure wall thicknesses for selected components at prescribed intervals, over the life of the system.

Thickness monitoring ultrasonic transducers and systems utilizing same typically measure a thickness of a pipe/vessel wall at the spot where the ultrasonic transducer is provided—in other words, it does not provide any information regarding the thickness of the pipe/vessel wall at locations surrounding the exact spot where the ultrasonic transducer is provided. As such, if corrosion/erosion is occurring at a location other than where the ultrasonic transducer is provided, it is likely that the corrosion/erosion will not be detected, unless thickness monitoring is accompanied by ultrasonic transducer mapping. Of course, ultrasonic transducer mapping increases the inspection cost. These ultrasonic transducers and systems are, however, beneficially permanently installed on pipes/vessels.

Conversely, area monitoring ultrasonic transducers and systems utilizing same typically measure the thickness of a pipe/vessel wall across a larger area of the pipe/vessel wall, which area being measured is typically beyond the location where the thickness monitoring ultrasonic transducers are provided on the pipe/vessel. Such area monitoring ultrasonic transducers and systems utilizing same will typically develop a thickness map of the pipe/vessel wall across the area being measured. In theory, such a generated thickness map is beneficial, but at present, such guided wave inspection is extremely complex as general hardware in that segment generates ten to twenty different guided wave modes, and the high number of wave modes and the complex analysis negatively impacts the confidence in the inspection results. Further, guided wave inspection is typically not permanently installed on pipes and vessels. Additionally, highly localized corrosion cannot be reliably detected with temporarily installed guided wave systems as described in API 574 (API 574, Inspection practices for piping system components, $4^{th}$ edition, 2016).

In addition, existing permanently installed corrosion monitoring systems fail to use adequate data to determine the placement of sensors in an industrial facility, such as an oil refinery and petrochemical plant, that transport fluids using piping systems. The piping system might transport the fluids to one or more tanks and/or chemical processing unit. Some piping systems handle dedicated fluids at prescribed temperatures and/or pressures; these piping systems may transfer highly corrosive fluids at elevated temperatures and pressures.

Moreover, many industrial facilities face health and safety concerns. They might transport fluids that may be flammable and/or toxic. As such, a failure in the piping system may cause leakage to the atmosphere and/or exposure to plant personnel. Moreover, some facilities operate with no scheduled shutdown for several years. Therefore, reliability of the piping system and its components is of importance.

In addition to health and safety concerns, unplanned outages due to piping system failures are problematic from a business consequence standpoint. Given the potential safety, health, environmental, and business risks associated with piping failures, the condition of piping systems is monitored to accurately project their remaining life and determine safe repair or replacement dates.

As a result of the foregoing, certain individuals would appreciate improvements in systems and methods for corrosion and erosion monitoring of fixed equipment (e.g., pipes, vessels, and others).

BRIEF SUMMARY

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure. It is noted that various connections between elements are discussed in the following description. It is noted that these connections are general and, unless specified otherwise, may be direct or indirect, wired or wireless, and that the specification is not intended to be limiting in this respect.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a system for detecting localized corrosion in a vicinity of a longitudinal wave (LW) transducer affixed to a component that transports materials across a distance. The system also sometimes involves a probe assembly that includes the LW transducer and one or more guided wave (GW) transducers affixed to the component at locations in the vicinity of the LW transducer. The one or more GW transducers are activated by analog waveform signals.

The probe assembly may include an intelligent amplified multiplexer of high current, high voltage inputs configured to selectively activate one of: the LW transducer and one of the one or more GW transducers. The system may also include a transmit channel for transmitting signals from a monitoring controller to the probe assembly; the system may also include a receive channel for receiving signals at the monitoring controller from the probe assembly. The monitoring controller may include: a pulser; an analog-to-digital (ADC) converter; an adjustable gain amplifier; a processor and a memory storing computer-executable instructions that, when executed by the processor, cause the monitor controller to perform one or more steps. In some examples, the steps may include: generating, by the pulser, a short spike signal that travels through the transmit channel to activate, by the intelligent amplified multiplexer, the LW transducer; generating, by the same pulser, a smooth low-frequency waveform signal that travels through the transmit channel to activate, by the intelligent amplified multiplexer, a first of the one or more GW transducers; in response to the generating of the short spike signal, receiving by the adjustable gain amplifier and the ADC converter, through the receive channel from the probe assembly, an indication of a spot thickness measurement based on measuring time-of-flight; and in response to the generating of the smooth low-frequency waveform signal, receiving by the adjustable gain amplifier and the ADC converter, through the receive channel, an indication of localized corrosion by a change of signal characteristics next to the time-of-flight (ToF). Other embodiments of this aspect include corresponding computer systems, apparatus, and computer programs recorded on one or more computer storage devices, each configured to perform the actions of the methods.

Implementations may include one or more of the following features. The system may include a digital switch configured to transmit a predetermined number of predetermined voltage level pulses. The pulser may include a high voltage, high frequency pulser with a high voltage capacitor in a range of 0.7 uF to 5.3 uF, and where the predetermined number of predetermined voltage levels is three, and where the predetermined voltage levels are 0V, 50V, and −50V, and where the short spike signal is approximately of 5 MHz frequency routed to a LW transducer, and where the smooth low-frequency waveform signal routed to a GW transducer is approximately of 50-500 kHz frequency.

The intelligent amplified multiplexer of the probe assembly may be configured to receive signals through a channel, filter the received signals, and route the received signals to/from one of the LW transducer and the first of the one or more GW transducers. The intelligent amplified multiplexer may include a switch assembly with a transmit switch, a receive switch, and amplifier. The intelligent amplified multiplexer may include a temperature measuring interface implemented as resistance temperature detector (RTD) interface.

The intelligent amplified multiplexer of the probe assembly may include a low pass filter that switches signals received through the transmit channel to trigger the first of the one or more GW transducers. The probe assembly may include one LW transducer and four GW transducers, where the location of each GW transducer is permanently affixed to the component within about three feet (or some other distance) of the one LW transducer, and where each GW transducer is an area monitoring ultrasonic transducer, and where the one LW transducer is a thickness monitoring ultrasonic transducer. In some examples, the first of the one or more GW transducers, when activated, produces non-dispersive shear horizontal zero waves, and where the monitoring controller detects localized corrosion in the vicinity of the LW transducer. And, in some examples, the aforementioned is performed without storing a thickness map.

The transmit channel may include a first cable wire, and the receive channel may include a second cable wire different from the first cable wire. The transmit channel may include a first cable wire, and the receive channel may include a wireless communications channel. Implementations of the described techniques may include hardware, a method or process, or computer software on a computer-accessible medium.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method for down-selecting from among probe assemblies installed on a piping system. The method also includes setting a grouping_sensitivity hyperparameter, a threshold_measurements hyperparameter, and a group_size hyperparameter for a model, before training the model. The method also includes grouping, by the model executing on a processor, a first set of the probe assemblies based at least on historical pipe wall thickness measurements collected from the probe assemblies installed on the piping system over a period of time. The method also includes assigning a unique groupID to each set of probe assemblies. The method also includes selecting, by the model after training the model, an optimization function from among a plurality of optimization functions for the model. The method also includes identifying, by the model, a single probe assembly corresponding to each groupID for pipe wall thickness monitoring of the piping system. The method also includes sending, by a thickness monitoring controller associated with the piping system, a pipe wall thickness measurement of the single probe assembly from each groupID for inspection. Other embodiments of this aspect include corresponding computer systems, apparatus, and computer programs recorded on one or more computer storage devices, each configured to perform the actions of the methods.

Implementations may include one or more of the following features. The method may include one or more steps to, during the inspection, disregard all remaining probe assemblies in each groupID except the single probe assembly from each groupID. The grouping of the first set of the probe assemblies is further based at least on inspection information provided to the system and historical pipe wall thickness measurements collected over a period of time from the probe assemblies installed on the piping system. The piping system may include a tank, and where a first probe assembly of the probe assemblies is configured to measure a wall thickness of the tank. The method may also include steps for storing, in computer memory communicatively coupled to the processor, historical pipe wall thickness measurements collected over an extended period of time from the probe assemblies installed on the piping system; and for training, by the processor, the model with at least the historical pipe wall thickness measurements stored in the computer memory. The model may include an artificial neural network. Implementations of the described techniques may include hardware, a method or process, or computer software on a computer-accessible medium.

One general aspect includes a system for detecting general corrosion (e.g., a lack of localized corrosion) to a plurality of components that transport materials across a distance. The system may also include a plurality of probe assemblies affixed to one or more of the components, where the probe assemblies may include at least a thickness monitoring ultrasonic transducer and an area monitoring ultrasonic transducer configured to detect corrosion (e.g., general corrosion and/or localized corrosion) to the components. The system may also include a data store configured to store historical wall thickness measurements collected over a period of time from measurements performed by the probe assemblies. The system may also include a model trained on the historical wall thickness measurements in the data store and with hyperparameters may include a grouping_sensitivity hyperparameter, a threshold_measurements hyperparameter, and a group_size hyperparameter. The system may also include a monitoring apparatus may include a processor and a memory storing computer-executable instructions that, when executed by the processor, cause the system to perform steps that may also include: grouping, based on the model, a first set of the probe assemblies; assigning a unique groupid to each set of probe assemblies; selecting, based on the model, an optimization function from among a plurality of optimization functions; identifying, based on the model and selected optimization function, a probe assembly corresponding to each groupid for wall thickness monitoring of the components; and sending, by a thickness monitoring controller associated with the components, a wall thickness measurement of the probe assembly from each groupid for inspection. In another embodiment, the system may output a list of the unique identifiers corresponding to any groupID in lieu of sending the wall thickness measurement for inspection. An inspector may receive the system's output and react accordingly, as discussed in various embodiments disclosed herein. Other embodiments of this aspect include corresponding computer systems, apparatus, and computer programs recorded on one or more computer storage devices, each configured to perform the actions of the methods.

Implementations may include one or more of the following features. The system, where the probe assembly identified from each groupID, may include more than one probe assembly of the plurality of probe assemblies, and where the memory of the monitoring apparatus stores computer-executable instructions that, when executed by the processor, cause the system to perform steps that may include: during the inspection, disregarding all remaining probe assemblies in each groupID except the more than one probe assembly from each groupID; and validating that the wall thickness measurements of the more than one probe assembly from each groupID is general corrosion and not localized corrosion. The wall thickness measurement of the probe assembly from a first groupID may include a thickness of a wall of a pipe component at the probe assembly. The wall thickness measurement of the probe assembly from a first groupID may include a thickness of a wall of a tank component at the probe assembly. The method may include validating that the pipe wall thickness measurement of the single probe assembly is general corrosion (e.g., a lack of localized corrosion) by: (i) generating a probability plot of all pipe wall thickness measurements associated with the piping system, (ii) grouping the plotted pipe wall thickness measurements by nominal thickness, and (iii) identifying a non-linear relationship in the probability plot of pipe wall thickness measurements grouped by nominal thickness to confirm the generalized corrosion (e.g., lack of localized corrosion). The pipe wall thickness monitoring may include steps for, by the probe assemblies, analyzing the original wall thicknesses, wall thickness loss over time, calibration error, and measurement location repeatability error. Implementations of the described techniques may include hardware, a method or process, or computer software on a computer-accessible medium.

Implementations may include one or more of the following features. The method may further include steps for validating that the pipe wall thickness measurement of the single probe assembly is general corrosion (e.g., a lack of localized corrosion) by: generating a probability plot of all pipe wall thickness measurements associated with the piping system, grouping the plotted pipe wall thickness measurements by nominal thickness, and identifying a non-linear relationship in the probability plot of pipe wall thickness measurements grouped by nominal thickness to confirm the general corrosion (e.g., the lack of localized corrosion). The pipe wall thickness monitoring may include steps, by the probe assemblies, for analyzing the original wall thicknesses, wall thickness loss over time, calibration error, and measurement location repeatability error. Implementations of the described techniques may include hardware, a method or process, or computer software on a computer-accessible medium.

BRIEF DESCRIPTION OF THE DRAWINGS

The present disclosure is illustrated by way of example and not limited in the accompanying figures in which like reference numerals indicate similar elements and in which:

FIG. 16A, FIG. 16B, and FIG. 16C (collectively referred to as "FIG. 16") illustrate plots on a graph. FIG. 16A is a graph illustrating probability plot of measurement values for validating general corrosion in contrast to localized corrosion. FIG. 16B is a graph charting level of risk against TMLs in accordance with various aspect disclosed herein. FIG. 16C illustrates a shift in the curve depicting the level of risk against TMLs after down-selection in accordance with various aspect disclosed herein;

Figure 1:
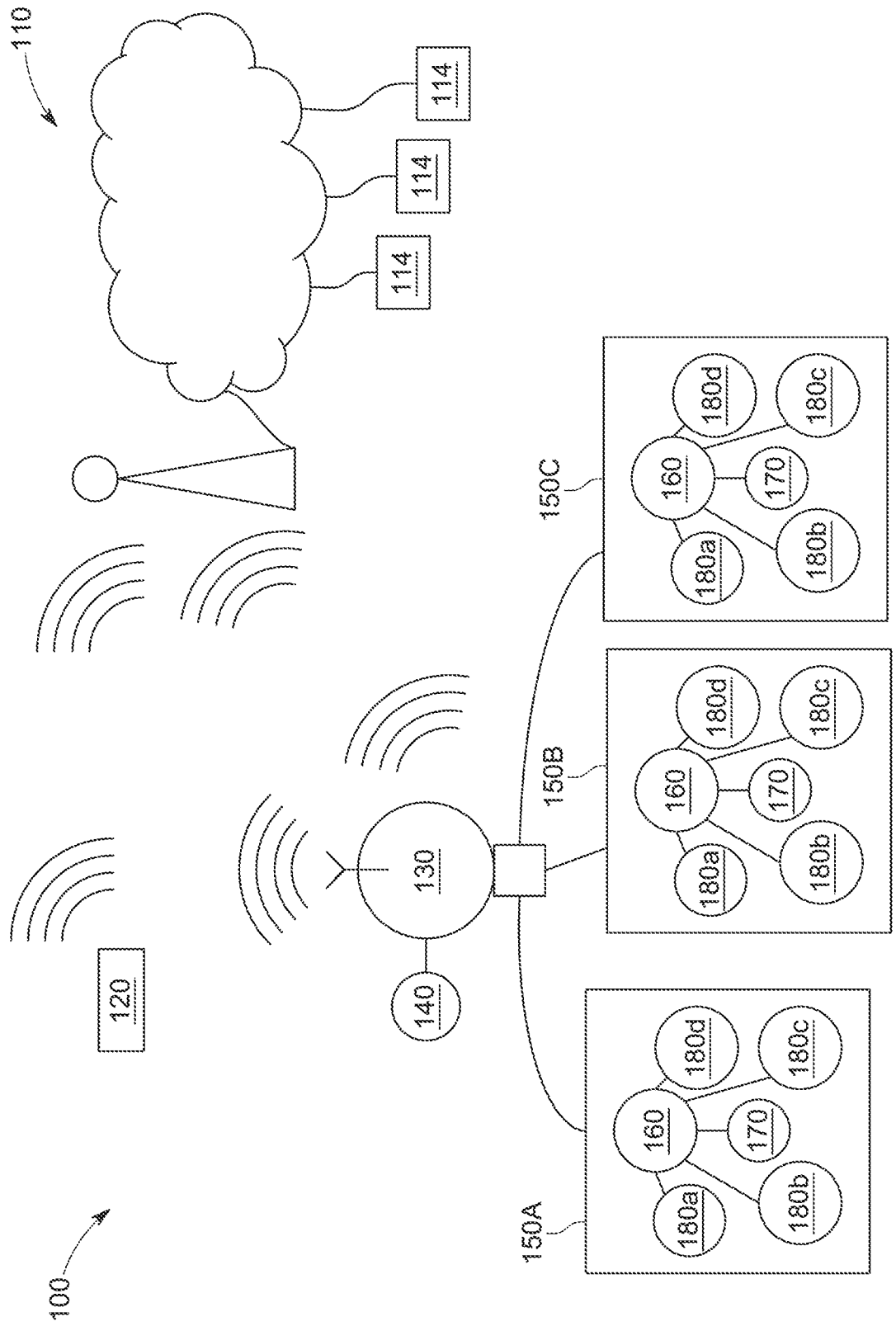
FIG. 1 is an illustration of the system for corrosion/erosion monitoring.

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized and structural and functional modifications may be made, without departing from the scope of the present disclosure. It is noted that various connections between elements are discussed in the following description. It is noted that these connections are general and, unless specified otherwise, may be direct or indirect, wired or wireless, and that the specification is not intended to be limiting in this respect.

DETAILED DESCRIPTION

While the disclosure may be susceptible to embodiment in different forms, there is shown in the drawings, and herein will be described in detail, specific embodiments with the understanding that the present disclosure is to be considered an exemplification of the principles of the disclosure, and is not intended to limit the disclosure to that as illustrated and described herein. Therefore, unless otherwise noted, features disclosed herein may be combined to form additional combinations that were not otherwise shown for purposes of brevity. It will be further appreciated that in some embodiments, one or more elements illustrated by way of example in a drawing(s) may be eliminated and/or substituted with alternative elements within the scope of the disclosure.

Aspects of the disclosure relates to the monitoring and detection of corrosion and/or erosion of pipes, vessels, and other components in an industrial facility. The monitoring system may comprise of an arrangement of a plurality of guided wave (GW) transducers and one or more longitudinal wave (LW) transducers affixed to the piping component to collectively measure for localized corrosion of the piping component without necessarily requiring a thickness map. The monitoring system may use an intelligent amplified multiplexer or intelligent switch to digitally drive and control the operation of the GW transducers and one or more LW transducers. In some embodiments, a shared sensor (e.g., transducer) hardware may controlled and operated to generate waves in the kilohertz range and megahertz range. The monitoring system disclosed herein may further simplify analysis of waves by limiting the number of guided waves, thus improving efficiency of the system.

Using ultrasonic sensors to determine remaining material thickness and, therefore, the on-going integrity of pipelines, pipes, vessels, and tanks is one method for corrosion monitoring. By using such methods, leaks and their consequences such as environmental damage, direct and collateral equipment damage, and process interruptions or slowdowns can be prevented. Previously, corrosion monitoring relied predominantly on manual ultrasonic inspections: inspectors collect thickness measurements with portable ultrasonic equipment at predetermined measurement locations—the so-called condition monitoring locations (CMLs), formerly referred to as thickness monitoring locations (TMLs). Manual thickness measurements tend to be limited in accuracy (deviation from true thickness value) and precision (variation around an average thickness value). These limitations may impact the subsequent analysis and calculated corrosion rates related to the planned retirement or maintenance of an asset. In particular, the limitations of manual thickness measurements when addressing general corrosion usually result in over-monitoring (e.g., too many CMLs, too frequent inspections), uncertainties, and the tendency to force asset owners and corrosion engineers to trade risk against the life cycle cost of a component.

Temporarily or permanently installed thickness monitoring equipment could help to overcome these technical shortcomings and uncertainties and could lead to significantly improved maintenance and asset replacement forecasting. However, the high cost of those systems usually prevents the mass deployment of permanently installed systems. As a result, the industry is forced to continue with the old-fashioned, inaccurate, and imprecise inspection methodology with unnecessarily high safety margins, a lot of uncertainties, and unnecessarily high costs. However, the emergence of the Industrial Internet of Things (IIoT) and NDE 4.0 have enabled a paradigm shift.

When looking at the risk of CMLs as part of a classical inspection plan or an RBI program, it is difficult to distinguish between a majority of low-risk CMLs and a small fraction of high-risk CMLs. Applying one-size fits all hardware-centric solutions has proven to be inadequate and expensive. Instead, the difference in risk and consequently in inspection activities (number of CMLs and number of inspections) requires adaptive hardware and analytics solutions to reduce uncertainties associated with risk and cost while increasing safety in the plants.

Regarding scenarios for low risk CMLs, in general, low risk CMLs are usually only inspected every 5 or 10 years, and the number of CMLs is typically very small. In fact, in the case of general corrosion, a circuit would theoretically require only one CML. However, due to the technical limitations in accuracy and precision, low-risk circuits are usually equipped with an unnecessarily high number of CMLs. Additionally, the low confidence in the inspection results requires extra inspections in addition to the scheduled inspection. This high inspection activity spanning high number of CMLs and high number of inspections results in unnecessarily high inspection costs. Additionally, there are costs associated with the evaluation of the quality of the thickness measurements by asset owners, corrosion engineers, and fixed equipment teams.

Modern analytics tools can help to optimize the inspection activity by reducing waste and costs while not increasing the risk level. The relationship between inspection activity and risk reveals that increasing inspection activity reduces risk, however, from a certain activity level on, further increase of inspection activity does not result in additional reduction of risk; moreover, keep in mind that increasing inspection activity is directly related to increasing cost.

Recall, ultrasonic thickness measurements are based on measuring the time-of-flight (ToF) of an ultrasonic pulse in the material to be inspected. Multiplication with the temperature-dependent material velocity v(T) and division by two provides the actual thickness $t_{actual}$ of the material at the location of the measurements:

$$T_{Actual} = \frac{1}{2} v(T) \times ToF$$

The quality of manual measurements is determined by two factors, called precision and accuracy.

The first limiting factor of precision describes the inherent nature of manual measurements and the subjectivity. In this case it describes the variation of thickness measurement values due to factors such as the influence of different inspectors, their practices and techniques, slight variations in the measurement location, slightly different instrumentation, and others. Therefore, one usually determines an average thickness reading for further analysis. When calculating an average value, it also requires the calculation of the variation or the standard deviation. Therefore, a correct thickness reading would imply several thickness measurements and its standard deviation, as for example 0.32±0.03 inch. Permanently installed ultrasonic systems improve the precision of thickness measurements tremendously as the factors which influence thickness measurements negatively have been eliminated. While manual inspection thickness measurements have a standard deviation of around 0.03 inch (0.762 mm), permanently installed systems usually improve the precision to 0.001 inch (0.0254 mm) This is an improvement of around 97%.

The second limiting factor of accuracy describes the deviation of the average thickness value from the true thickness value. This deviation could be the result of incorrect time-of-flight measurements ToF or due to the use of incorrect temperature dependent material velocities v(T). While time-of-flight measurements are highly accurate with resolutions in the nanosecond range, it is still common practice to use reference literature values for the material velocities, which may differ significantly from the actual material velocities of the fixed equipment in the field.

Improving the accuracy of a thickness measurement therefore requires determining the actual material velocity. This is achieved by measuring the actual material velocity at the time of the thickness measurement or by measuring the material velocity once and by using a temperature correction coefficient to compensate the change of material velocity with temperature. For the latter, reference literature provides a typical value of 1% per 55° C. Temperature coefficients determined based upon actual measurements in the field can differ significantly from the literature values. The values range from 0.4% to 1.2%, depending on the material composition, material age, and the number and amplitudes of the experienced temperature cycles.

Sophisticated permanently installed ultrasonic monitoring systems lead to precise and accurate thickness measurements for high risk CMLs. The accuracy is important if one considers how the thickness measurements are used by inspectors and fixed equipment owners to plan repairs or replacement of assets.

Thickness measurements are used, in some scenarios, to calculate short-term and long-term corrosion rates. The long-term corrosion rate is then used to determine the remaining life, respectively the retirement date of the equipment based on information such as the corrosion allowance and the minimum allowable thickness. Uncertainties in the thickness measurements propagate through the calculations for corrosion rates and therefore retirement dates. The Gaussian error propagation law can be used to determine the uncertainties for corrosion rate and retirement date based on the uncertainty of the thickness measurements. Using typical field values from manual inspections, one will see that maintenance dates come with uncertainties to the tune of plus or minus a few years. Repair work or replacement at the beginning of the maintenance window will lead to higher than necessary lifecycle costs, whereas scheduling repairs for later times in the maintenance window increases risk of a leak. In one example, the dilemma is whether to repair or replace in either 2021 or 2023. The decision depends mainly on the experience of the inspector or asset owner and is therefore more of an art than a science leading to a data-driven decision. Using sophisticated permanently installed systems improves the situation significantly as they reduce the maintenance window to more a precise, data-driven window. Those smaller maintenance windows lead to an unambiguous data-driven decision to repair or replace in 2024.

A holistic approach using permanently installed sensor systems and analytics tools enables a shift from experience-based decision-as-an-art to data-driven decision-as-a-science. It also improves safety as it reduces the amount and frequency of inspectors in hazardous areas. The shift to optimize corrosion monitoring with sensors and software leads to further opportunities. The evolution of models with machine learning and artificial intelligence can further refine corrosion monitoring without compromising safety.

Figure 2:
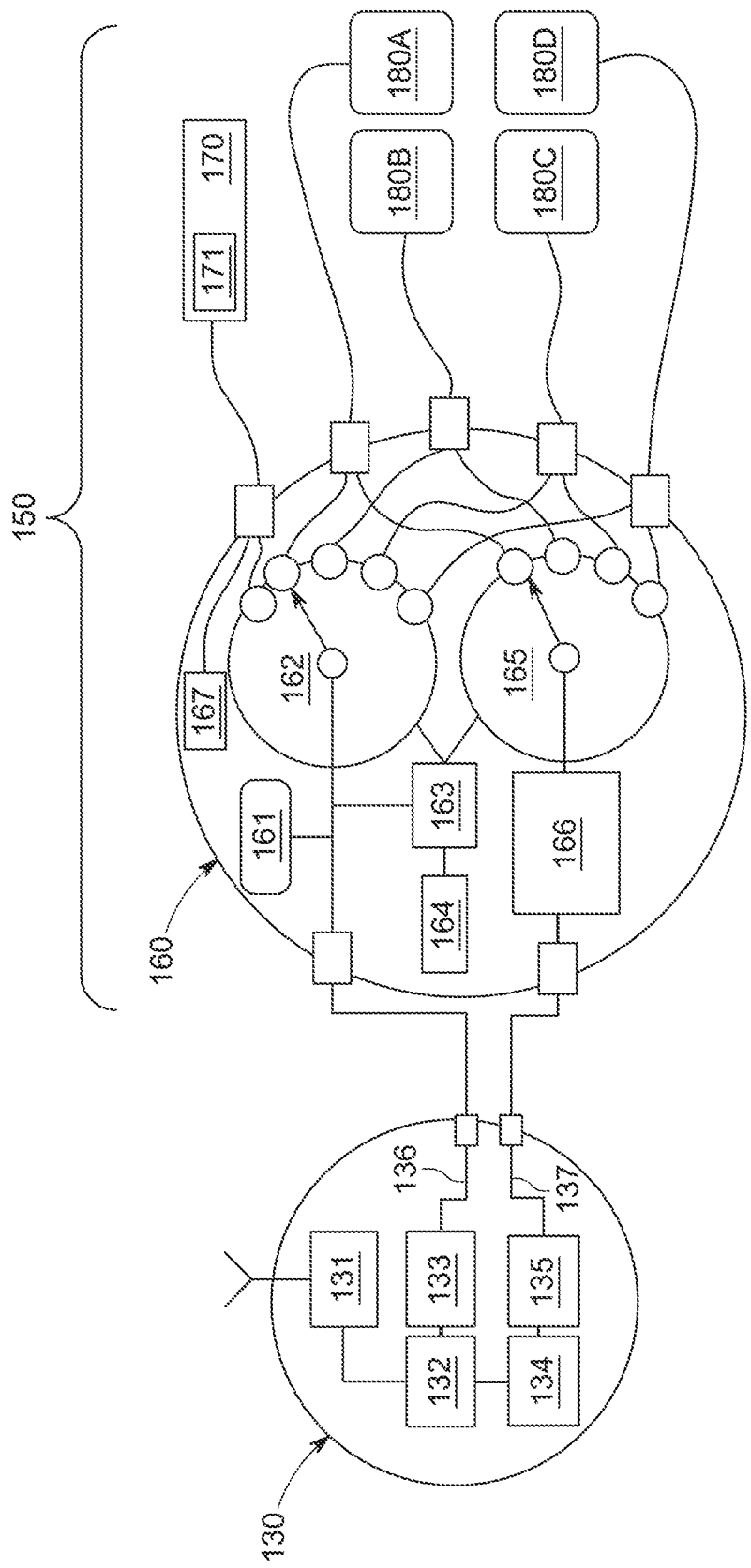
FIG. 2 is an illustration of a thickness monitoring controller and a piezo assembly of the system of FIG. 1.

FIG. 1 and FIG. 2 illustrate a system 100 for monitoring corrosion and erosion of fixed equipment (e.g., pipes/vessels). The system 100 includes a data analytics and visualization platform 110, an optional gateway 120, a thickness monitoring controller 130, a thickness monitoring ultrasonic transducer 140 that is used for standardization purposes, and at least one probe assembly 150. Each probe assembly 150 includes a switch assembly 160, at least one thickness monitoring ultrasonic transducer 170, and at least one area monitoring ultrasonic transducer 180.

The data analytics and visualization platform 110 includes a data analytics portion 112 and a visualization portion 114. 1 The data analytics portion 112 is typically a cloud-based powered software that is configured to receive signals, typically wirelessly, from one or both of the gateway 120 or the thickness monitoring controller 130. These signals are analyzed by the data analytics portion 112 to translate them into visuals for display on the visualization portion 114. The visualization portion 114 may be any suitable device, e.g., a computer monitor, a tablet, a phone, etc., that are of a type that will aid an individual monitoring the platform 110 in understanding the information regarding corrosion/erosion identified by the system 100. The individual may also be able to change the images/information on the visualization portion 114 by providing further inputs to the software.

The gateway 120 may be provided to receive signals, typically wirelessly, from the thickness monitoring controller 130, and to send such signals, typically wirelessly, to the platform 110. For instance, it may be more economical to use the gateway 120 to establish cellular connection instead of having each thickness monitoring controller 130 at a facility having its own data plan. In such a case, the thickness monitoring controllers 130 would use, e.g., the XBee protocol, to communicate with the gateway 120. In another example, if there is no good cellular connection at the location of the thickness monitoring controller 130, the gateway 120 could be installed at a higher location to establish cellular connection and the thickness monitoring controller 130 would submit data to the gateway 120 using, for example, the XBee protocol.

Figure 3:
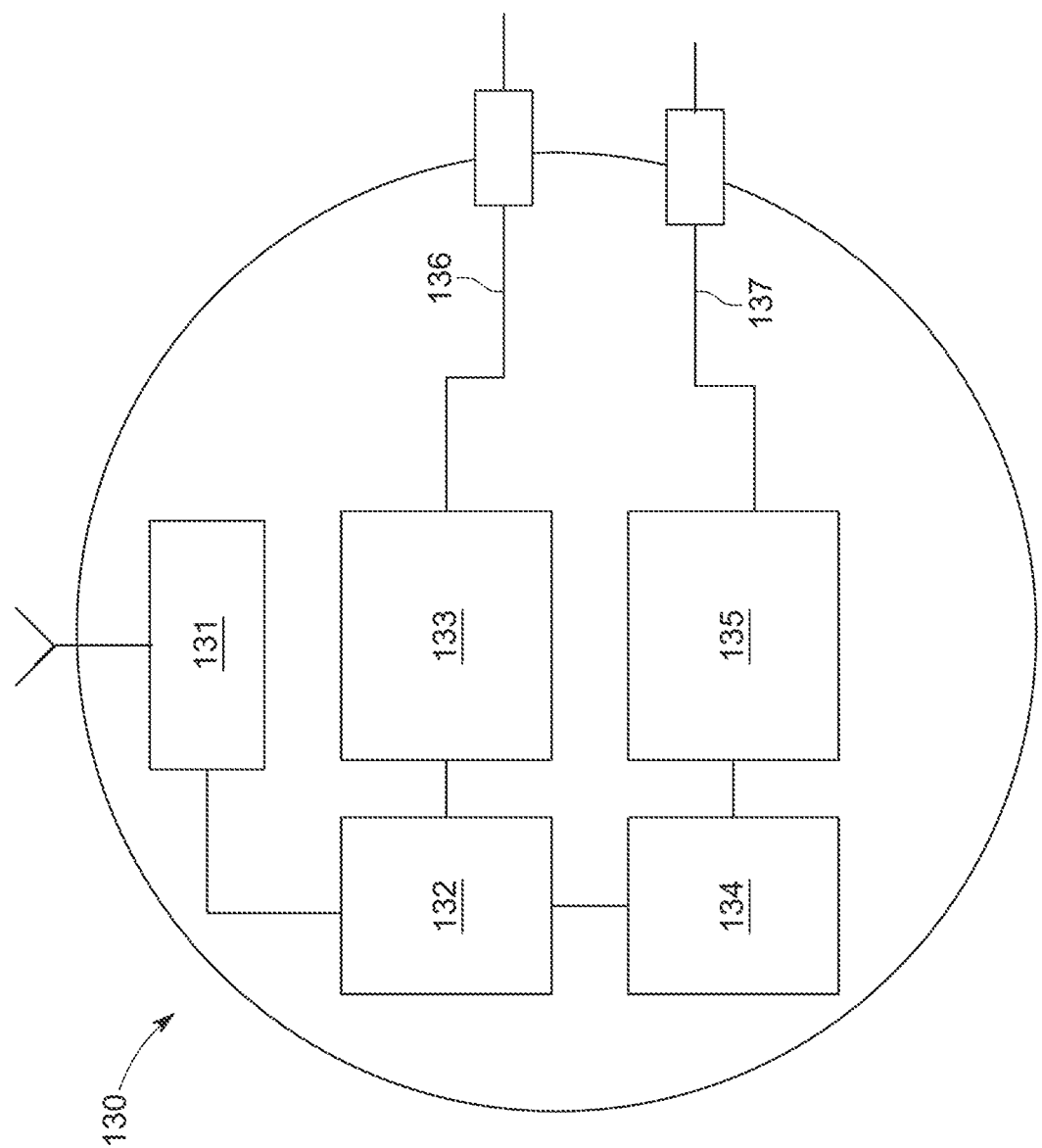
FIG. 3 is an illustration of the thickness monitoring controller of FIG. 2.

As best illustrated in FIG. 3, the thickness monitoring controller 130 includes a modem 131, a microprocessor 132, a pulser 133, an analog-to-digital converter (ADC) 134, an adjustable gain amplifier 135, a transmit channel 136, and a receive channel 137. The modem 131 is configured to communicate with one or both of the platform 110 and the gateway 120. The modem 131 may use any appropriate communication option, including, but not limited to XBee 915 MHz and LTE-M/NB. The modem 131 is configured to communicate with the microprocessor 132. The microprocessor 132 may be any type of microprocessor which will provide the desired functions. One such microprocessor 132 is the LPC4370 that is manufactured and sold by NXP Semiconductors. The microprocessor 132 is configured to communicate with both the pulser 133 and the ADC 134. The pulser 133 is preferably a high voltage, high frequency pulser with a high voltage capacitor. The ADC 134 is preferably a 16-bit, 2 msps (million samples per second), but other ADC types may also be provided as appropriate. The ADC 134 is configured to communicate with the adjustable gain amplifier 135 (sometimes also commonly known as a variable gain amplifier). The adjustable gain amplifier 135 preferably has a decibel range of 26-54 dB and a frequency range of 10 kHZ to 300 kHz, but other ranges may also be provided as appropriate. The pulser 133 is configured to communicate with the transmit channel 136 to transmit signals to the transmit channel 136. The adjustable gain amplifier 135 is configured to communicate with the receive channel 137 to receive signals from the receive channel 137. The monitoring controller 130 is preferably configured to accommodate a desired number of amplitude scans ("A-scans") (or waveform displays). In the embodiments illustrated, the controller 130 is configured to accommodate sixteen A-scans (one from the thickness measurement ultrasonic transducer 140 and five each from the three different probe assemblies 150). Of course, it is to be understood that as the number of probe assemblies 150 change and/or the number of ultrasonic transducers 170/180 are included in each probe assembly 150 (as will be discussed in further detail below), the controller 130 can be configured to accommodate more or less than sixteen A-scans as appropriate.

The thickness monitoring ultrasonic transducer 140 is configured to receive signals from the transmit channel 136 of the thickness monitoring controller 130 and is further configured to transmit signals to the receive channel 137 of the thickness monitoring controller 130. As noted, the thickness monitoring ultrasonic transducer 140 is used for standardization purposes and, thus, functions to calibrate the measurement system when a group of ultrasonic transducers are utilized (in this instance, the at least one thickness monitoring ultrasonic transducer 170, and the at least one area monitoring ultrasonic transducer 180). The standardization thickness monitoring ultrasonic transducer 140 works to ensure that the system 100 always performs the same way and functions properly, which is required by industrial standards. In the illustrated embodiment, the standardization thickness monitoring ultrasonic transducer 140 is configured to perform a single A-scan. In practice, the thickness monitoring ultrasonic transducer 140 is typically placed on a standardization block or a thickness calibrated metal piece to serve as a standardization transducer.

As illustrated in FIG. 1, the system 100 includes three different/distinct probe assemblies 150A, 150B, 150C (each also referred to as probe assembly 150). Depending on the system 100, the number of probe assemblies 150 provided in the system 100 can be less than three (e.g., one or two) or can be more than three (e.g., four, five, etc.), as appropriate. Depending on the number of probe assemblies 150 provided in the system 100, minor variations/modifications may need to be made to the system 100 as would be understood by one of ordinary skill in the art.

Figure 4:
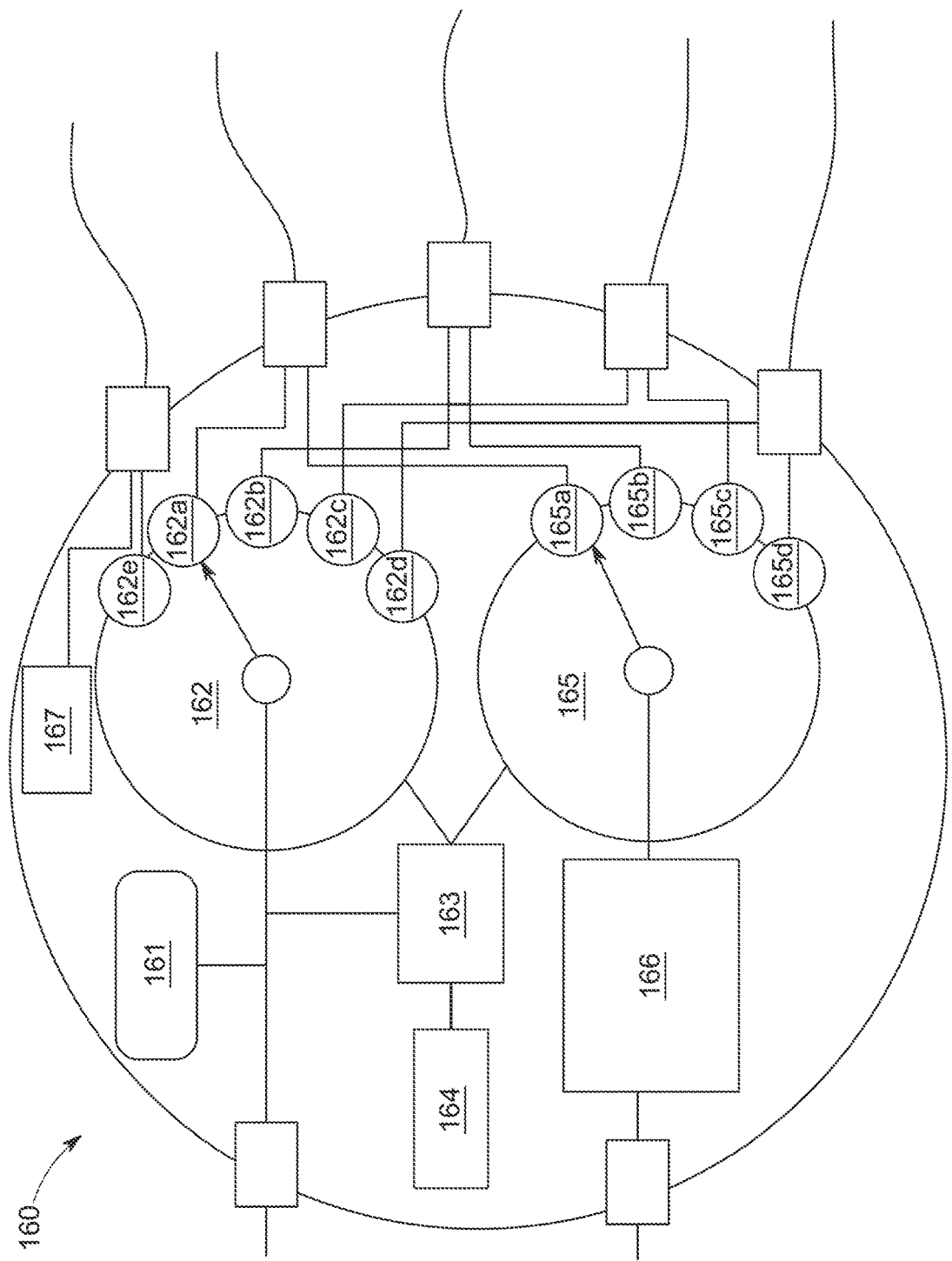
FIG. 4 is an illustration of a switch assembly forming part of the piezo assembly of FIG. 2.

As discussed above, each probe assembly 150 includes a switch assembly 160. As best illustrated in FIG. 4, the switch assembly 160 includes a power supply 161, a transmit switch 162, a microcontroller 163, a memory 164, a receive switch 165, an amplifier 166, and an optional resistance temperature detector (RTD) interface 167. The power supply 161 is in communication with the transmit channel 136 of the thickness monitoring controller 130. The transmit switch 162 is in communication with the transmit channel 136 of the thickness monitoring controller 130. The transmit switch 162 preferably has five "switch" channels 162a, 162b, 162c, 162d, 162e, the purpose and function of each will be discussed herein. The microcontroller 163 is in communication with the transmit channel 136 of the thickness monitoring controller 130, the transmit switch 162, the memory 164, and the receive switch 165. The microcontroller 163 may be any type of microcontroller which will provide the desired functions. One such microcontroller 163 is the PIC18 that is manufactured and sold by Microchip Technology. The memory 164 is preferably a non-volatile memory. The receive switch 165 preferably has four "switch" channels 165a, 165b, 165c, 165d, the purpose and function of each will be discussed hereinbelow. The amplifier 166 is in communication with the receive channel 137 of the thickness monitoring controller 130 and the receive switch 165. The amplifier 166 may have, in some examples, an amplification of 26 to 48 dB and a frequency range of 10 kHz to 300 kHz, but other levels/ranges may also be provided as appropriate. In some examples, the amplifier 166 is a two-stage amplifier, where 26 dB amplification is provided for a single stage option and 48 dB amplification is provided for a two-stage option, which can be selectable by populating or depopulating components on an amplification board. The optional RTD interface 167 is provided if the at least one thickness monitoring ultrasonic transducer 170 incorporates an RTD 171 (as discussed below). In the illustrated embodiment, each switch assembly 160 is instructed by controller 130 to collect five A-scans (one from the thickness monitoring ultrasonic transducer 170 and one from each of the four area monitoring ultrasonic transducers 180).

As discussed above, each probe assembly 150 includes at least one thickness monitoring ultrasonic transducer 170. As illustrated in FIG. 1, each probe assembly 150 includes one thickness monitoring ultrasonic transducer 170. Depending on the system 100 and the probe assembly 150, the number of thickness monitoring ultrasonic transducers 170 provided in each probe assembly 150 can be more than one (e.g., two, three, four, etc.), as appropriate. Depending on the number of thickness monitoring ultrasonic transducers 170 provided in each probe assembly 150, minor variations/modifications may need to be made to the probe assembly 150 and/or system 100 as would be understood by one of ordinary skill in the art. Each thickness monitoring ultrasonic transducer 170 may optionally have an RTD 171 associated therewith to measure the temperature of the pipe/vessel at or near where the thickness measurement is occurring. Each thickness monitoring ultrasonic transducer 170 is in communication with the fifth "switch" channel 162e of the transmit switch 162 and, if the thickness monitoring ultrasonic transducer 170 includes the RTD 171, is also in communication with the RTD interface 167.

The thickness monitoring ultrasonic transducer 170 (as well as the 140) operates by generating high frequency ultrasonic waves (e.g., 5 MHz). These ultrasonic waves are commonly referred to as longitudinal waves (LW) and, as such, the thickness monitoring ultrasonic transducers 170 may also be referred to as LW transducers. In the illustrated embodiment, each thickness monitoring ultrasonic transducer 170 is configured to perform a single A-scan. Unlike the thickness monitoring ultrasonic transducer 140, the thickness monitoring ultrasonic transducer 170 is not placed on a standardization block or a thickness calibrated metal piece, but rather is placed on the pipe/vessel to measure the thickness of the pipe/vessel at the location where it is installed.

As discussed above, each probe assembly 150 includes at least one area monitoring ultrasonic transducer 180. As illustrated in FIG. 1, FIG. 2, FIG. 3, FIG. 4, and FIG. 5, each probe assembly 150 includes four area monitoring ultrasonic transducers 180A, 180B, 180C, 180D (each also referred to as area monitoring ultrasonic transducer 180). Depending on the system 100 and the probe assembly 150, the number of area monitoring ultrasonic transducers 180 provided in each probe assembly 150 can be less than four (e.g., one, two or three) or more than four (e.g., five, six, etc.), as appropriate. Depending on the number of area monitoring ultrasonic transducers 180 provided in each probe assembly 150, minor variations/modifications may need to be made to the probe assembly 150 and/or system 100 as would be understood by one of ordinary skill in the art. The first area monitoring ultrasonic transducer 180A is in communication with the first "switch" channel 162a of the transmit switch 162 and the first "switch" channel 165a of the receive switch 165. The second area monitoring ultrasonic transducer 180B is in communication with the second "switch" channel 162b of the transmit switch 162 and the second "switch" channel 165b of the receive switch 165. The third area monitoring ultrasonic transducer 180C is in communication with the third "switch" channel 162c of the transmit switch 162 and the third "switch" channel 165c of the receive switch 165. The fourth area monitoring ultrasonic transducer 180D is in communication with the fourth "switch" channel 162d of the transmit switch 162 and the fourth "switch" channel 165d of the receive switch 165.

In an embodiment, the probe assembly 150 may comprise a thickness transducer 170 and a set of area transducers 180 individually wired to switch/preamp assembly 160. In a different embodiment, thickness and area transducers 170, 180 can be combined in a single, larger probe wired via a single multiconductor cable into switch/preamp assembly 160. In another embodiment, it also can be a set of larger probes (thickness+2 area, area+area etc.)

The area monitoring ultrasonic transducers 180 operate by generating low frequency ultrasonic waves (e.g., 50 kHz to 500 kHz). These ultrasonic waves are commonly referred to as guided waves (GW) and, as such, the area monitoring ultrasonic transducers 180 may also be referred to as GW transducers. One such type of guided wave, namely shear horizontal zero waves (called $SH_0$ in plates or $T(0,1)$ in piping), from GW transducers are of interest due to their non-dispersive behavior. In the illustrated embodiment, each area monitoring ultrasonic transducer 180 is configured to perform a single A-scan.

Figure 5:
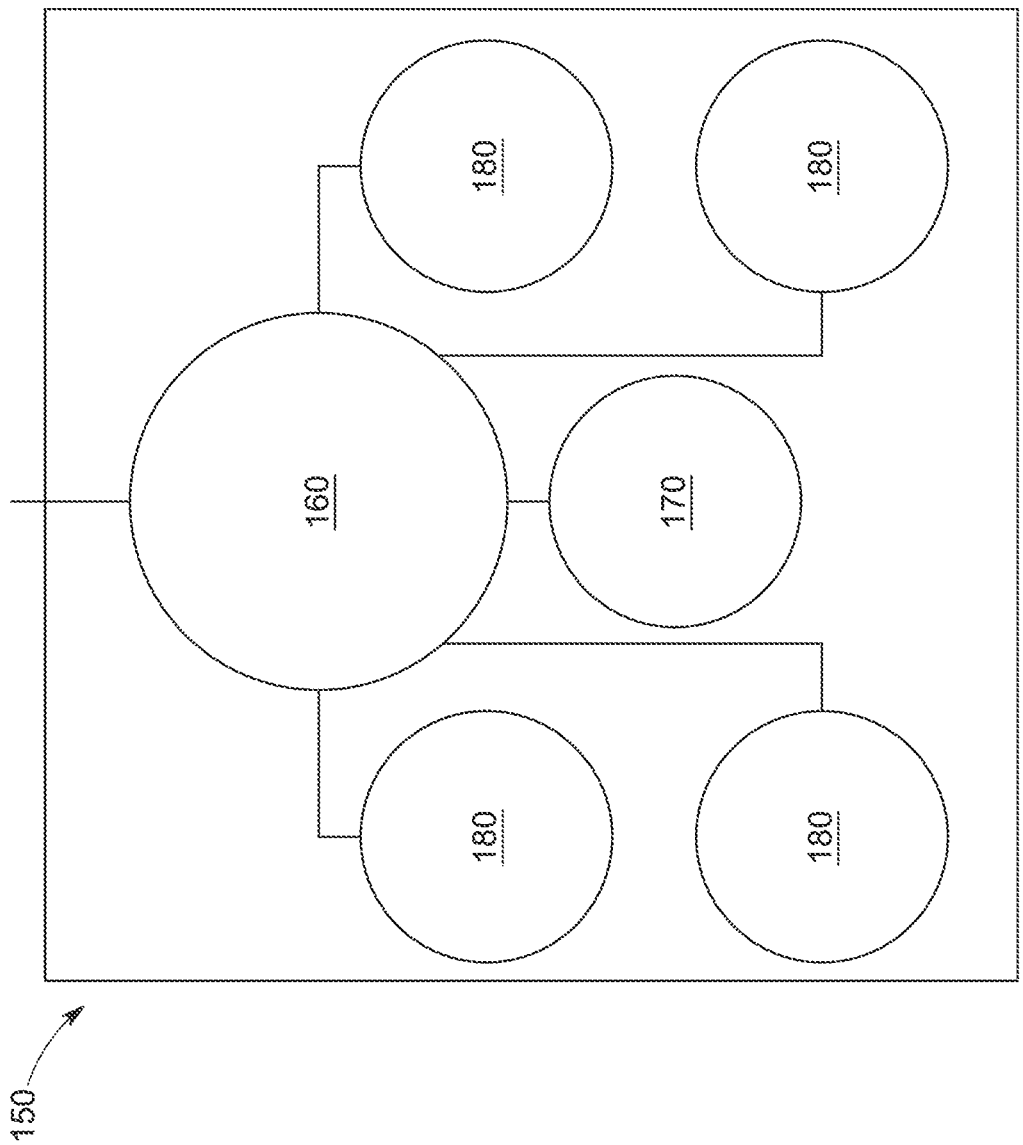
FIG. 5 is an illustration of the piezo assembly of FIG. 2.

The GW transducers 180 may be in the form of piezo patch transducers, but may alternatively be in other forms, such as, for instance, face-shear piezo elements. In some embodiments, a patch transducer may be used instead of or in addition to stacked face-shear piezo elements to provide higher signal amplitudes. Meanwhile, in some embodiments, as best illustrated in FIG. 1 and FIG. 5, the GW transducers 180A, 180B, 180C, 180D are positioned in a rectangular configuration around the LW transducer 170, where GW transducer 180A is positioned above and to the left of LW transducer 170, GW transducer 180B is positioned below and to the left of LW transducer 170, GW transducer 180C is positioned below and to the right of LW transducer 170, and GW transducer 180D is positioned above and to the right of LW transducer 170. When applied to a pipe/vessel, a straight line from GW transducer 180A to GW transducer 180B is parallel to a straight line from GW transducer 180C to GW transducer 180D, and a straight line from GW transducer 180A to GW transducer 180D is parallel to a straight line from GW transducer 180B to GW transducer 180C. Further, when applied to a pipe/vessel, a straight line from GW transducer 180A to GW transducer 180C intersects LW transducer 170, and a straight line from GW transducer 180B to GW transducer 180D intersects LW transducer 170, such that an "X-shape" configuration is provided.

Figure 8:
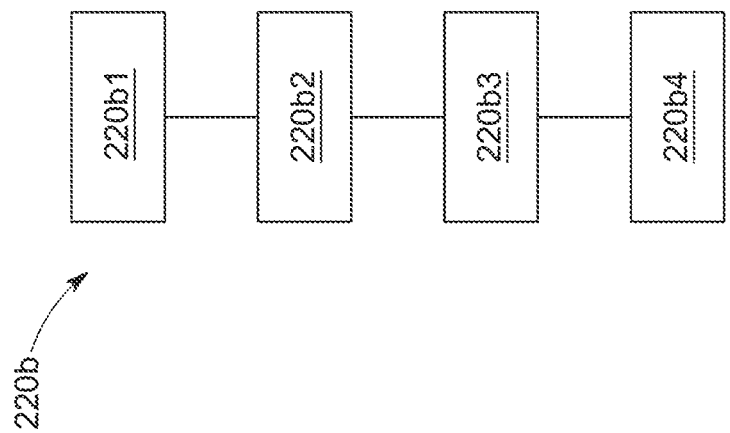
FIG. 6, FIG. 7, and FIG. 8 are illustrations of the method for corrosion/erosion monitoring.
Figure 7:
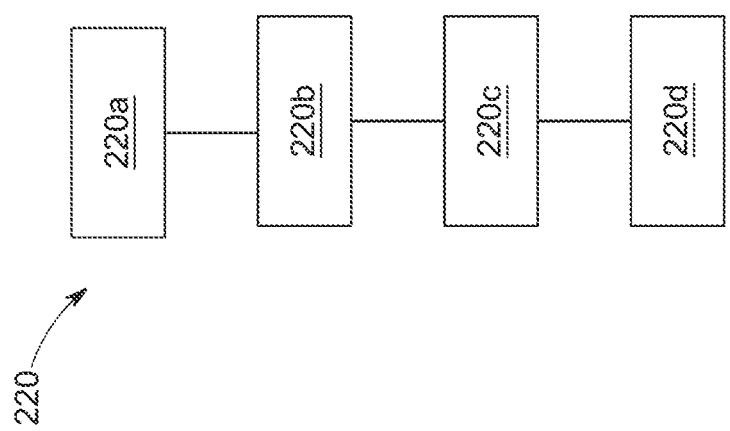
Figure 6:
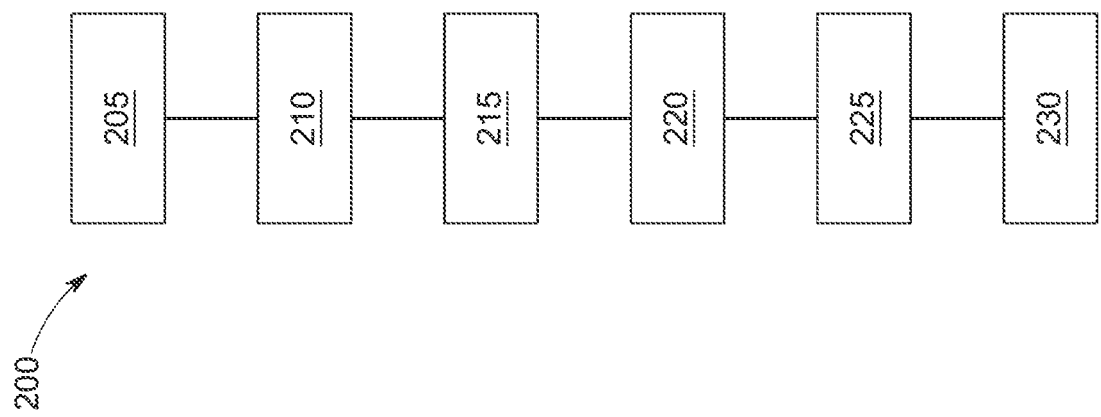

The system 100, when associated with a pipe/vessel, may be utilized to measure the corrosion/erosion of the pipe/vessel. In an embodiment, one method 200 of measuring the corrosion/erosion of the pipe/vessel is described below and illustrated in FIG. 6, FIG. 7, and FIG. 8.

The method 200 includes the step 205 of manually measuring the actual longitudinal velocity and the temperature of the pipe/vessel to be inspected.

The method 200 includes the step 210 of manually measuring the actual guided wave velocity and the temperature of the pipe/vessel to be inspected.

The method 200 includes the step 215 of performing a thickness standardization measurement with the standardization thickness monitoring ultrasonic transducer 140 and the RTD 171 (it is to be understood that, like the thickness monitoring ultrasonic transducer 170, the standardization thickness monitoring ultrasonic transducer 140 could also optionally incorporate the RTD 171).

The method 200 includes the step 220 of performing measurements using the probe assembly 150A. Step 220 includes the sub-step 220a of performing a thickness measurement with the thickness monitoring ultrasonic transducer 170 and the RTD 171. Step 220 includes the sub-step 220b of performing an area thickness monitoring with the area monitoring ultrasonic transducers 180A, 180B, 180C, 180D at a first frequency. Sub-step 220b includes the sub-step 220b1 of performing axial scanning whereby area monitoring ultrasonic transducer 180A is excited and data is recorded with area monitoring ultrasonic transducer 180B. The measurement taken in sub-step 220b1 is repeated as often as specified in configuration setting and average A-scans. Sub-step 220b includes the sub-step 220b2 of performing axial scanning whereby area monitoring ultrasonic transducer 180C is excited and data is recorded with area monitoring ultrasonic transducer 180D. The measurement taken in sub-step 220b2 is repeated as often as specified in configuration setting and average A-scans. Sub-step 220b includes the sub-step 220b3 of performing circumferential scanning whereby area monitoring ultrasonic transducer 180A is excited and data is recorded with area monitoring ultrasonic transducer 180D. The measurement taken in sub-step 220b3 is repeated as often as specified in configuration setting and average A-scans. Sub-step 220b includes the sub-step 220b4 of performing circumferential scanning whereby area monitoring ultrasonic transducer 180C is excited and data is recorded with area monitoring ultrasonic transducer 180C. The measurement taken in sub-step 220b4 is repeated as often as specified in configuration setting and average A-scans. Thus, channels 162a, 162c (which are associated with GW transducers 180A, 180O) act as guided wave transmit channels while channels 162b, 162d (which are associated with GW transducers 180B, 180D) act as guided wave receive channels. The receive path further goes via the amplifier 166 to the receive channel 137 of the thickness monitoring controller 130.

Step 220 includes the sub-step 220c of repeating sub-step 220b at a second frequency, which second frequency is different from the first frequency.

Step 220 includes the sub-step 220d of repeating sub-step 220b at a third frequency, which third frequency is different from both the first frequency and the second frequency.

The method 200 includes the step 225, which comprises repeating step 220 to perform measurements using the probe assembly 150B.

The method 200 includes the step 230, which comprises repeating step 220 to perform measurements using the probe assembly 150C.

Thus, the method 200 combines ultrasonic thickness monitoring using longitudinal waves with ultrasonic area monitoring using guided waves; and, in various embodiments, just one special non-dispersive shear wave mode ($SH_0$ or $T(0,1)$). The method 200 takes representative thickness measurements, rather than trying to develop a thickness map, which will be complemented by an area monitoring feature to detect localized corrosion/erosion in-between representative thickness measurement locations. The system 100 utilizes new electronics which use a single circuitry to deliver two distinctive, different excitation signals, e.g., high frequency ultrasonic waves for thickness monitoring (5 MHz) and low frequency ultrasonic waves for area monitoring (50-500 kHz), from two different types of ultrasonic transducers, e.g., LW transducer 170 and GW transducers 180. Each excitation signal needs to be generated and processed differently. More specifically, pulser 133 of the controller 130 is a digital switch capable of delivering only predetermined fixed voltage level pulses: high voltage, low voltage, and zero voltage. High and low voltage levels are normally adjustable in a range of 5V to 90V and −5V to −90V but different voltage levels are permissible as well. Microprocessor 132 signals pulser 133 to output to transmit channel 136 one of the fixed voltage levels: ex. high voltage for a specified period of time. Example of a pulse used to excite LW transducer 170: processor 130 instructs pulser 133 to output 0V, then high voltage for a period of 100 ns, then low voltage for a period of 100 ns, then 0V. Described sequence would generate bipolar square wave of 5 MHz frequency suitable to excite LW transducer 170. For GW transducers 180, different frequencies and signals amplitudes are required.

Figure 9:
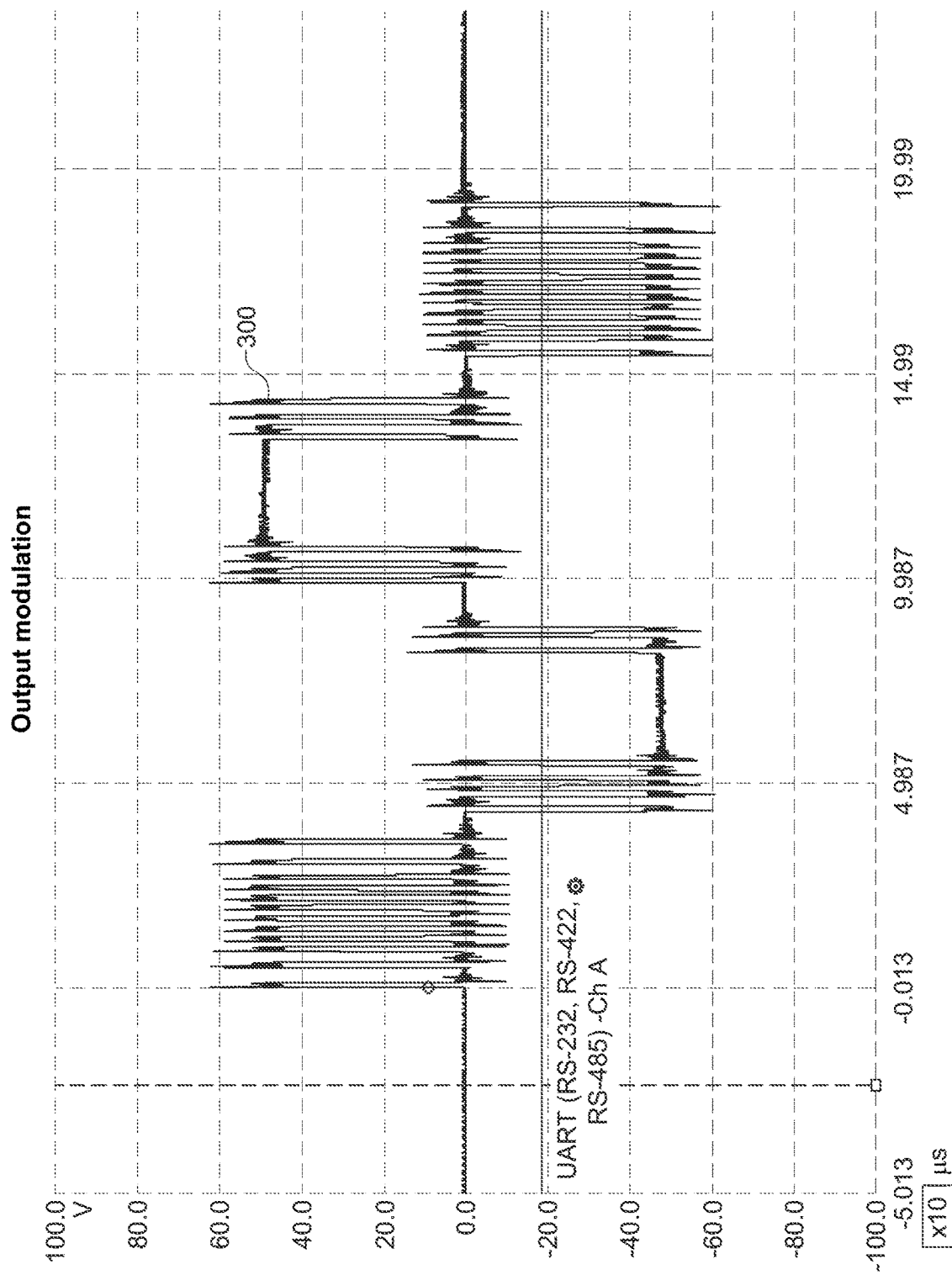
FIG. 9, FIG. 10, FIG. 11, and FIG. 12 are illustrations to display the signal modulation.
Figure 10:
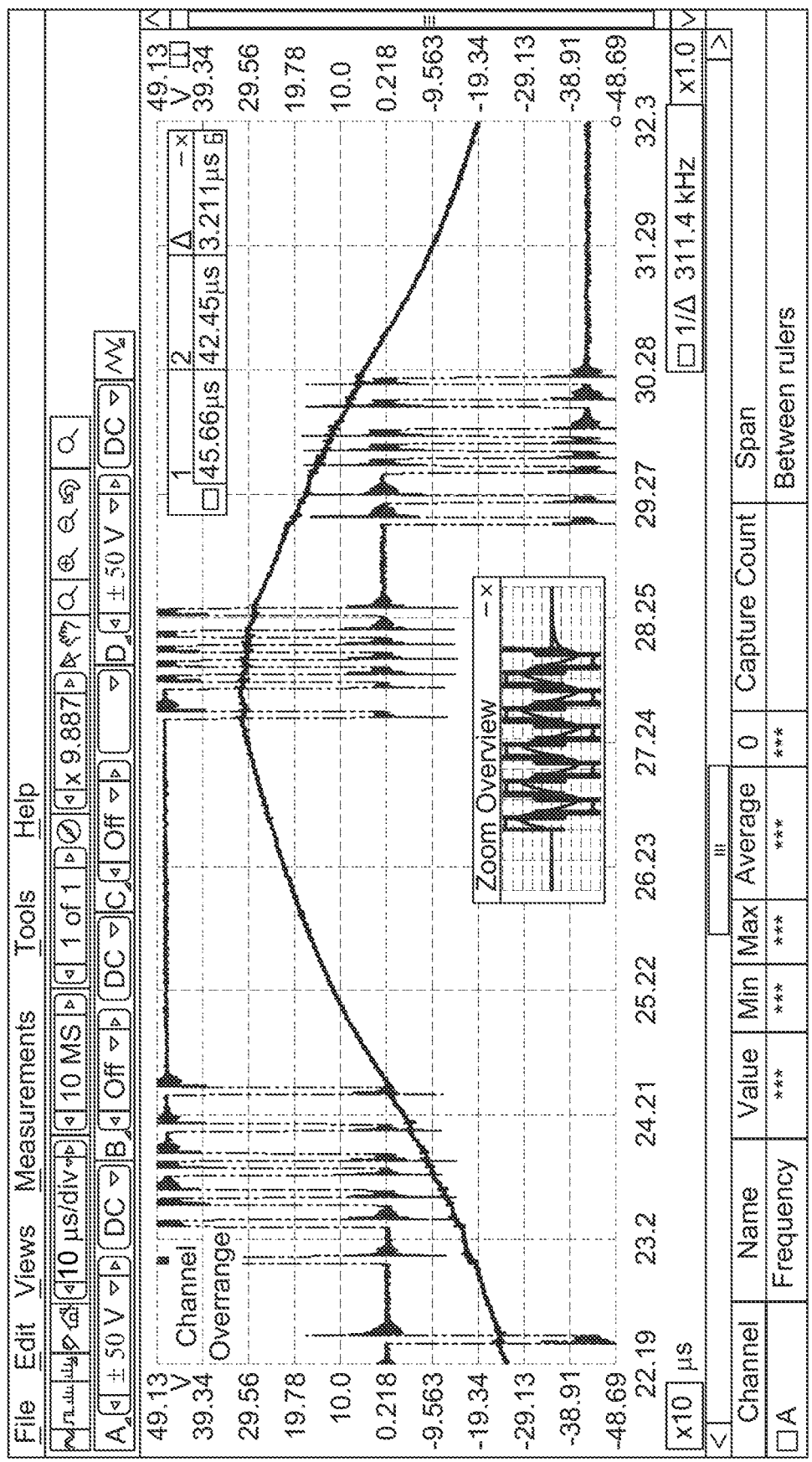
Figure 11:
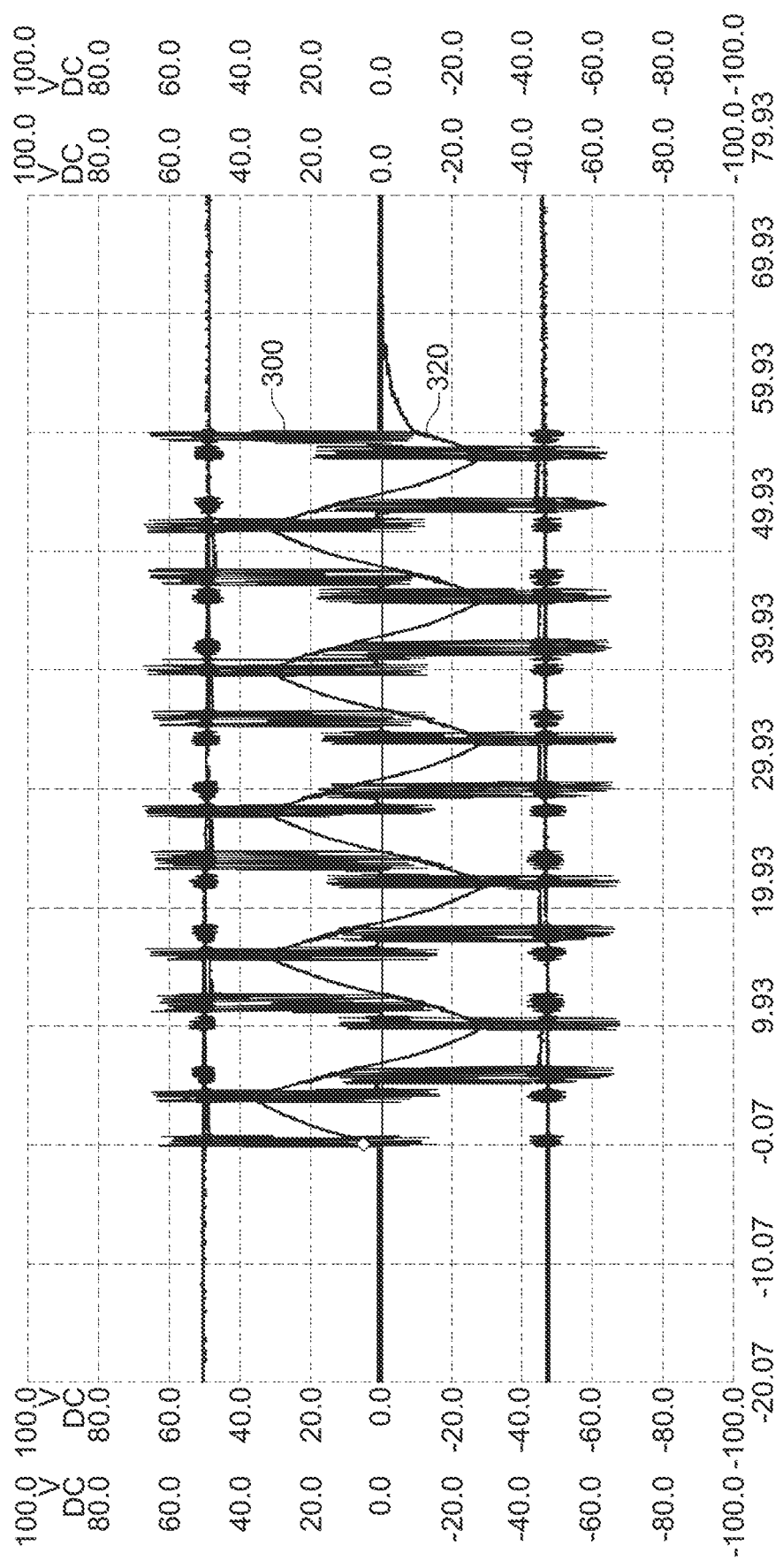
Figure 12:
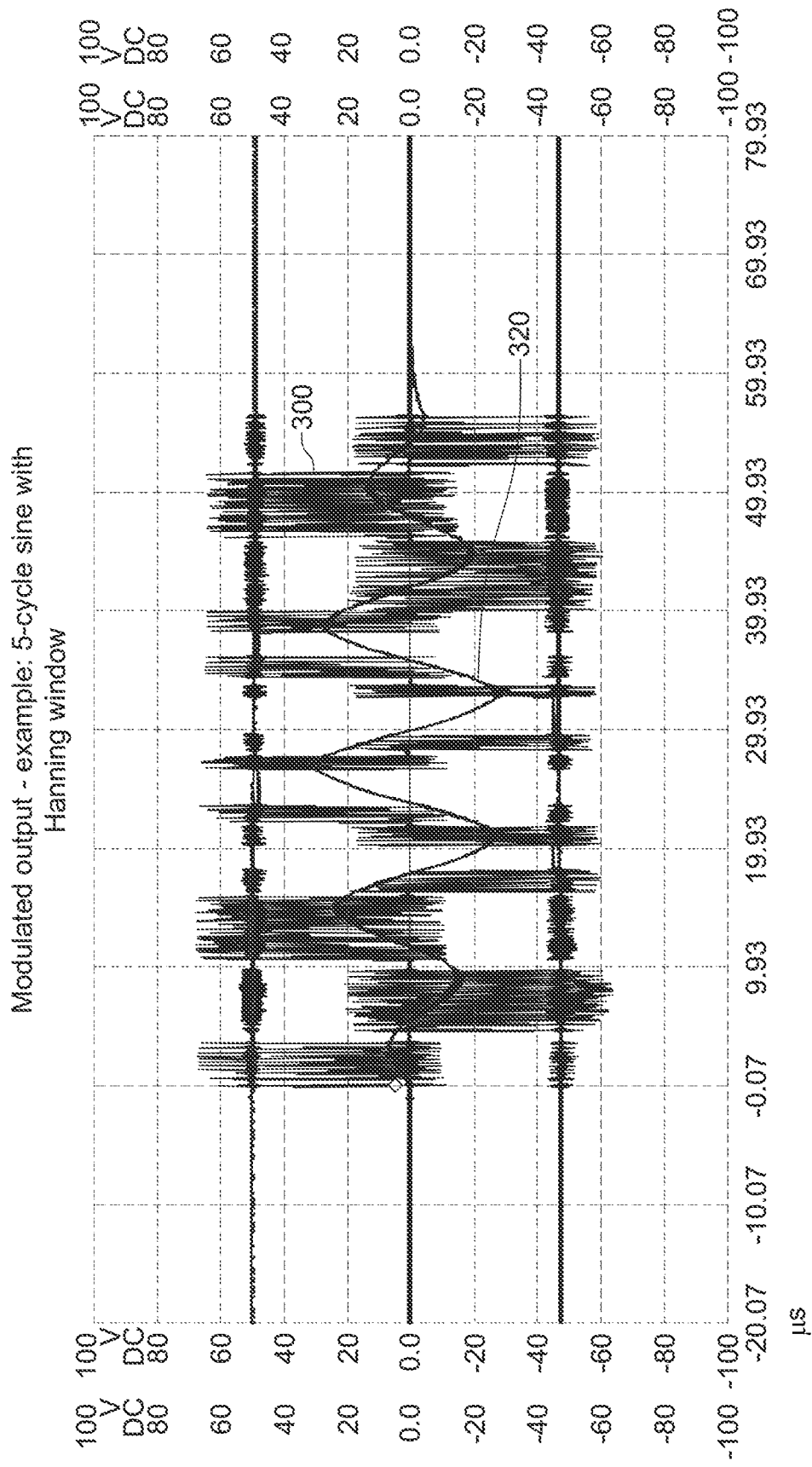

As best illustrated in FIG. 9, FIG. 10, FIG. 11, and FIG. 12, waveforms needed to excite GW transducers 180 can have rather complex shapes like, ex: 5 cycle sinusoid wave superimposed on Hanning window signal (ex. half cycle cosine) shown as 330 in FIG. 12 that would allow for a smoother transition from no-signal to signal condition. To generate GW transducer 180 suitable waveforms combination of a pulser 133 digital output shown as waveform 300 in FIG. 9, FIG. 10, FIG. 11, and FIG. 12, in-series resistance of the transmit channel 136 and impedance of the GW transducer 180 are used. GW transducer 180 impedance in a frequency range used to generate GW waves (50-500 kHz) is usually in majority composed of capacitance. This capacitance and mentioned in-series resistance of the transmit channel 136 form a low pass filter. Pulser 133 under instructions from the microprocessor 132 generates a high frequency (usually in range of tens of MHz) digital waveform 300 that when passed thru the transmit channel 136 and GW transducer 180 capacitance results in a different waveform 310 than originally outputted from the pulser 133 (as illustrated in FIG. 10). Varying high frequency digital waveforms from the pulser 133 can generate, once passed thru the transmit channel 136 in-series resistance and transducer 180 capacitance, a range of analog waveforms, ex: sinusoids without Hanning windows, shown as 320 in FIG. 11 or sinusoids with Hanning windows, shown as 330 in FIG. 12, chirp (frequency changes during duration of the pulse), ramp-up, seesaw and other. Of course, other waveforms than those as described and illustrated could also be generated.

Referring to FIG. 9, in one example, the monitoring controller 130 may include a low frequency (e.g., 50-300 kHz) receiver path, available on all channels (e.g., sixteen channels) in parallel for guided waves. One or more of the receive paths may also be used, for example, for legacy signals. Internal (e.g., protective) in-series resistor may be combined with transducer capacitance on all channels. And, the combination may act as a low pass filter and convert high frequency modulation into low frequency waveform signal.

As shown in FIG. 9, a low frequency wavelet output may be possible using a modulating pulser 133. A person having skill in the art after review of the entirety disclosed herein will recognize that improvements in measurements appear with increasing number of cycles. For example, measurements taken at GW transducers 180A, 180B, 180C, 180D after two (or three, five, or other quantity) cycles and different frequencies may show deviations from intended frequency between −4% up to −7% and deviations from intended voltage range between −8.5% to +12.5%.

In an embodiment, a chirp signal can be used to excite multiple frequencies at the same time from a single channel. Proper software filtering can decode the individual frequency response from a single A-scan.

By using the system 100 and method 200, the time of flight and the amplitude of the echo reflected at a defect on the pipe/vessel can be evaluated. More specifically, by sending excitation signals from GW transducer 180C and receiving by GW transducers 180B, 180D, the reflection echo will be earlier in time trace in the GW transducer 180B, 180D that is closer to the damage, e.g., GW transducer 180B if the damage is to the left of both GW transducers 180B, 180D, or GW transducer 180D if the damage is to the right of both GW transducers 180B, 180D, where GW transducers 180B, 180D are appropriately positioned. Defects as pittings or corrosion/erosion patches usually increase in size over time. Therefore, the amplitude of the echoes reflected at the defects will increase over time. Permanently installed systems therefore allow one to monitor the change of amplitude next to the time-of-flight. Monitoring changes in A-Scans after for example baseline subtraction and digital filtering reduces the complexity of the analysis and increases confidence in the inspection results. Next to baseline subtraction additional digital signal processing tools or machine learning algorithms can be used for feature extraction or pattern recognition which additionally increase confidence levels and help to detect changes earlier in time. The collected signals and/or filtered measurements may be stored in a data analytics platform 112 for analysis and display on a visualization platform 114. Examples of graphical user interfaces and analysis performed by a data analytics and visualization platform 110 are disclosed throughout the disclosure herein, including remote alert device 1410 in FIG. 14.

Further to the preceding example involving GW transducers 180B, 180C, 180D, in various embodiments, the GW transducer 180C produces shear horizontal zero waves (called $SH_0$ in plates or $T(0,1)$ in piping) with a non-dispersive behavior. A wave is non-dispersive when the velocity of a wave is independent of its frequency, so that a wavelet consisting of several waves with different frequencies will not spread out as it propagates through the material. With the GW transducer 180C in a non-dispersive shear wave mode, the system can detect and locate localized corrosion in the vicinity of the GW transducer. Therefore, the system 100 can detect localized corrosion/erosion in-between representative thickness measurement locations, complemented by area monitoring. The GW transducers may be area monitoring ultrasonic transducers, and the LW transducers may be thickness monitoring ultrasonic transducer.

Referring to FIG. 2, a system is disclosed for detecting localized corrosion occurring near a longitudinal wave (LW) transducer affixed to a component that transports materials across a distance. In some examples, the component is piping that transports gaseous materials, liquid materials, or other state of materials. Meanwhile, in other examples, the component may be a tank, a vessel, or other type of component that transports materials including storing materials before transporting. The system includes a probe assembly 150 comprising an LW transducer and one or more guided wave (GW) transducers affixed to the component at locations in proximity to the LW transducer. In one embodiment, a probe assembly 150 comprises one LW transducer 170 and four GW transducers 180A, 180B, 180C, 180D arranged so that the location of each GW transducer is permanently affixed to the component within about three feet (or other distance, such as six inches, one foot, four feet, six feet, or other distance) of the LW transducer. In some embodiments, the four GW transducers may be arranged along a circumference of a circle-like shape (e.g., a circle, ellipse, oval, or other circular shape) with the LW transducer at or near a center of the circle-like shape. In other embodiments, the GW transducers may be more or less than four and may be arranged in a pattern other than a circle-like shape, such as a rectangular pattern, square pattern, triangular pattern, or other pattern. In any event, the GW transducers in the other embodiments are affixed in a permanent or near-permanent manner such that a thickness map is not required to precisely measure for localized corrosion on the component (e.g., piping, plate, or other material).

In the embodiment illustrated in FIG. 2, the GW transducers 180A, 180B, 180C, 180D may be activated by analog waveform signals. As a result, the probe assembly 150 comprising the GW transducers may comprise an intelligent amplified multiplexer 162, 165 that is configured to selectively activate either the LW transducer 170 or one of the GW transducers 180A, 180B, 180C, 180D, but not simultaneously both the LW and GW transducers. The intelligent amplified multiplexer may receive, in some embodiment, inputs that comprise high current and/or high voltage. These input are received through a transmit channel 136 that transmits signals from a monitoring controller 130 to the probe assembly 150. In contrast, a receive channel 137 is provided for receiving signals at the monitoring controller 130 that are sent from the probe assembly 150.

The monitoring controller 130 may comprise one or more electrical components to assist in its operation, such as a pulser 133, an analog-to-digital (ADC) converter 134, an adjustable gain amplifier 135, a processor 132, and/or a memory storing computer-executable instructions that, when executed by the processor, cause the monitoring controller to perform operational steps. The monitoring controller 130 may generate one or more output signals that travel through the transmit channel 136 of the system. The output signal modulation may be dependent on transducer impedance, as illustrated in FIG. 10. In some embodiments involving other types of transducers, the system may be modified to generate separate waveforms for these different types of transducers. Moreover, in some embodiments, additional combinations of in-series resistance and in-parallel capacitance may be appropriate to generate smooth waveforms by the monitoring controller 130 based on the transducer capacitance.

In one example, the monitoring controller 130 may generate, by the pulser 133, a short spike signal that travels through the transmit channel 136 to activate, by the intelligent amplified multiplexer (162, 165), the LW transducer in the probe assembly 150. In another example, the monitoring controller 130 may generate, by the same pulser 133, a smooth low-frequency waveform signal that travels through the same transmit channel 136 to activate, by the intelligent amplified multiplexer (162, 165), a GW transducer. The same pulser 133 is used to selectively generate a short spike signal or a smooth low-frequency waveform signal, as appropriate. In some examples, the pulser is able to selectively generate these signals using a digital switch configured to transmit a predetermined number of predetermined voltage level pulses. For example, the pulser may comprises a high voltage, high frequency pulser with a high voltage capacitor in a range of 0.7 µF to 5.3 µF. But, in other examples, the pulser may have an upper range even higher than 5.3 µF. The predetermined number of voltage levels may be any number capable of allowing the pulser to selectively generate the appropriate waveform signals. In one example, the pulser may transmit three predetermined voltage level pulses, wherein the predetermined voltage levels are 0V, 50V, and −50V. However, in other examples, the predetermine voltage levels may be other preset values to which the system is tuned to operate. For example, the aforementioned short spike signal generated by the pulser 133 may be approximately 5 MHz and the aforementioned smooth low-frequency waveform signal may be approximately 50-500 kHz. In other example, the signals generated by the pulser 133 may be different or adjusted to accommodate activation of LW transducers and GW transducers in a probe assembly 150. However, the monitoring controller 130 is configured to selectively generate signal waveforms in both the kHz and Mhz ranges with one set of shared hardware. The system 100 utilizes a single, electrical circuitry that delivers two distinctive, different excitation signals, e.g., high frequency ultrasonic waves for thickness monitoring (5 MHz) and low frequency ultrasonic waves for area monitoring (50-500 kHz), from two different types of ultrasonic transducers, e.g., LW transducer 170 and GW transducers 180. Each excitation signal needs to be generated and processed differently. An alternate design may be to multiplex and then demultiplex, but that would need two different hardware/circuitry. Instead, the system 100 provides the functionality with a single, electrical circuitry.

In addition, the monitoring controller 130 may store computer-executable instructions that, when executed by the processor, cause the monitoring controller to process signals received on a receive channel 137. In one example, in response to the generating of the short spike signal, the monitoring controller 130 may receive by the adjustable gain amplifier 135 and the ADC converter 134, through the receive channel 137 from the probe assembly 150, an indication of a spot thickness measurement based on measuring time-of-flight. Time-of-flight (ToF) is often a measurement of time taken by a wave to travel a distance through the component in which the material (e.g., liquid, gas, or other form) is being transported across a distance. The spot thickness measurement provides the location measurement performed by the activated LW transducer 170 installed on a component, such as the pipe illustrated in FIG. 13B. In another example, in response to the generating of the smooth low-frequency waveform, the monitoring controller 130 may receive by the adjustable gain amplifier 135 and the ADC converter 134, through the receive channel 137 from the probe assembly 150, an indication of localized corrosion by a change of signal characteristics (e.g., amplitude) next to the ToF. The existence/detection of an echo (e.g., amplitude) indicates the presence of localized corrosion. The ToF may be used to determine the location of the localized corrosion.

The intelligent amplified multiplexer 162, 165 of the probe assembly 150 may comprise one or more electrical components to assist in its operation, such as a transmit switch 162 and a receive switch 165 (collectively a "switch assembly"), amplifier 166, resistance temperature detector (RTD) interface 167, a controller 163, and/or a memory 164 storing computer-executable instructions that, when executed by the controller 163, cause the intelligent amplified multiplexer to perform operational steps. The intelligent amplified multiplexer may be configured to receive signals through a transmit channel 136, filter the received signals, and then route the received signals to one of the LW transducer 170 and one of the GW transducers 180A of the plurality of GW transducers 180B, 180C 180D. In some examples, the transmit channel 136 and receive channel 137 may comprises a cable wire. In another example, the transmit channel 136 may be one cable wire while the receive channel 137 is a different cable wire than the transmit channel 136. In other examples, one or both of the transmit channel 136 and receive channel 137 may be a wireless communications channel that enables the monitoring controller 130 to communicate without a tether to the probe assembly 150. At least one benefit of such an arrangement is that the monitoring controller may be reusable and operable with more than one probe assembly 150. Of course, given the nature of the high voltage and/or high current signal waveforms being generated and/or received by the monitoring controller 130, there may also be benefits to the transmit channel 136 and receive channel 137 including a pluggable/un-pluggable hardwire cable interface with a probe assembly 150 such that the monitoring controller 130 may be unplugged and reused at a plurality of probe assembly installations. For example, the probe assembly 150 may comprise a wireless communications module, such as a Bluetooth module, that transmits measurements, such as thickness and area monitoring A-scans.

In one example, the intelligent amplified multiplexer 162, 165 of the probe assembly 150 may comprises a low pass filter that switches signals received through the transmit channel 136 to trigger either the LW transducer 170 or one of the GW transducers 180A of the plurality of GW transducers 180B, 180C, 180D, but not both the LW and GW transducers. In some examples, the received signal may trigger two or more GW transducers 180A, 180B, 180C, 180D (e.g., a pair of GW transducers 180A, 180C, or other grouping of GW transducers) and one or more transducers may be configured to read the signal through the component/fixed equipment. The intelligent pre-amplifier switch 160, in some examples, may comprise five switch channels: a first channel for thickness measurement (by LW transducer 170) with transmit and receive; two (e.g., channel 2 and channel 4) guided wave transmit channels; and two (e.g., channel 3 and channel 5) guided wave receive channels, where the receive path goes via a pre-amplifier/amplifier 166 to a monitoring controller's 130 receive channel 137. The received signals can be averaged, in some examples, up to eight times with a 26 dB pre-amplifier 166 and, in other examples, up to six times for 48 dB pre-amplifier 166. In other examples, multiples of 6 or 8 averages may be used depending on the aforementioned configuration and channels. In some examples, a time scale may be adjusted automatically to account for different sampling frequencies. Samples of each waveform type may be received and stored in one or more memories 164. The intelligent amplified multiplexer 162, 165 of the probe assembly 150 may operate by producing non-dispersive shear horizontal zero waves from a GW transducer 180B, when activated, as described herein. As a result, the monitoring controller 130 detects localized corrosion occurring in the proximity of a LW transducer 170 near the GW transducer 180B without necessarily needing or storing a thickness map.

Referring to FIG. 2, the system includes a probe assembly 150 comprising a memory 164 storing computer-executable instructions that, when executed by a controller 163 of the probe assembly 150, cause the probe assembly to perform one or more method steps. In one embodiment, a probe assembly 150 may comprises one LW transducer 170 and a plurality of GW transducers 180A, 180B, 180C, 180D. After receiving a smooth low-frequency waveform signal through the transmit channel 136, the intelligent amplified multiplexer 162, 165 activates a first GW transducer 180A. In response to the activating, a different GW transducer 180B in the probe assembly 150 may measure a first echo signal received through the component material shared by the GW transducers 180A, 180B. The first echo signal has a particular time of flight and signal characteristics (e.g., amplitude) that is detected by the GW transducer 180B. Moreover, to improve the accuracy of the localized corrosion detection, in some embodiments, another GW transducer 180C on the same component may also measure an echo signal. This echo signal may be different than the echo signal received by the other GW transducer 180B given their distance from the GW transducer 180A activated by the waveform signal. The echo signal received by the GW transducer 180C has its own time of flight and signal characteristics (e.g., amplitude).

An amplifier 166 and controller 163 in the probe assembly 150 processes the signals detected by the GW transducers 180B, 180C by baseline subtracting and digital filtering them into a combined echo signal. In some examples, digital filtering comprises band pass filtering to reduce high frequency noise. The combined echo signal is transmitted through the receive channel 137 to the monitoring controller 130.

Figure 24A:
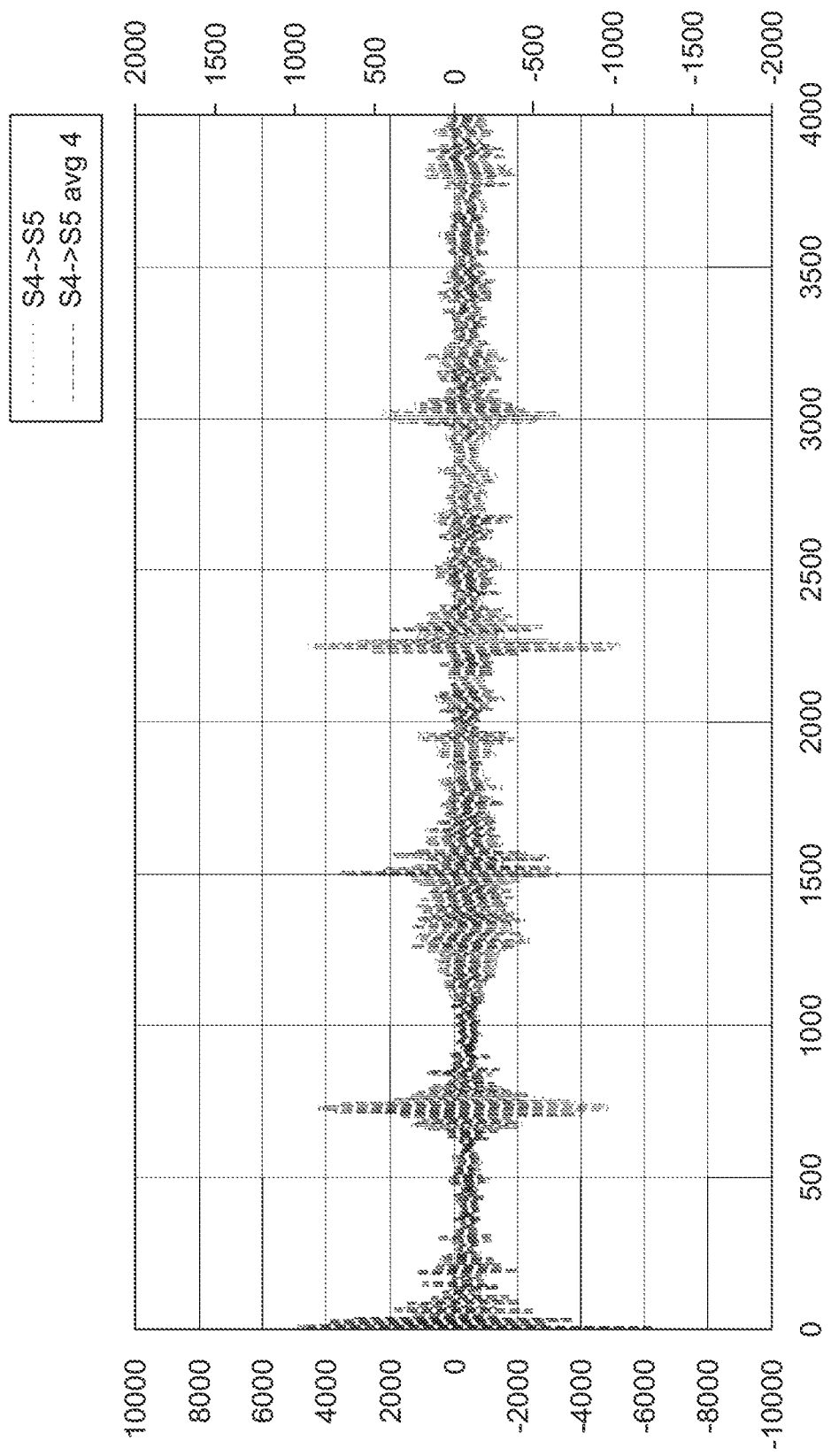
FIG. 24A and FIG. 24B (collectively referred to as "FIG. 24") are illustrative waveforms generated with a low frequency guided waves (GW) transducer, in accordance with some embodiments disclosed herein.
Figure 24B:
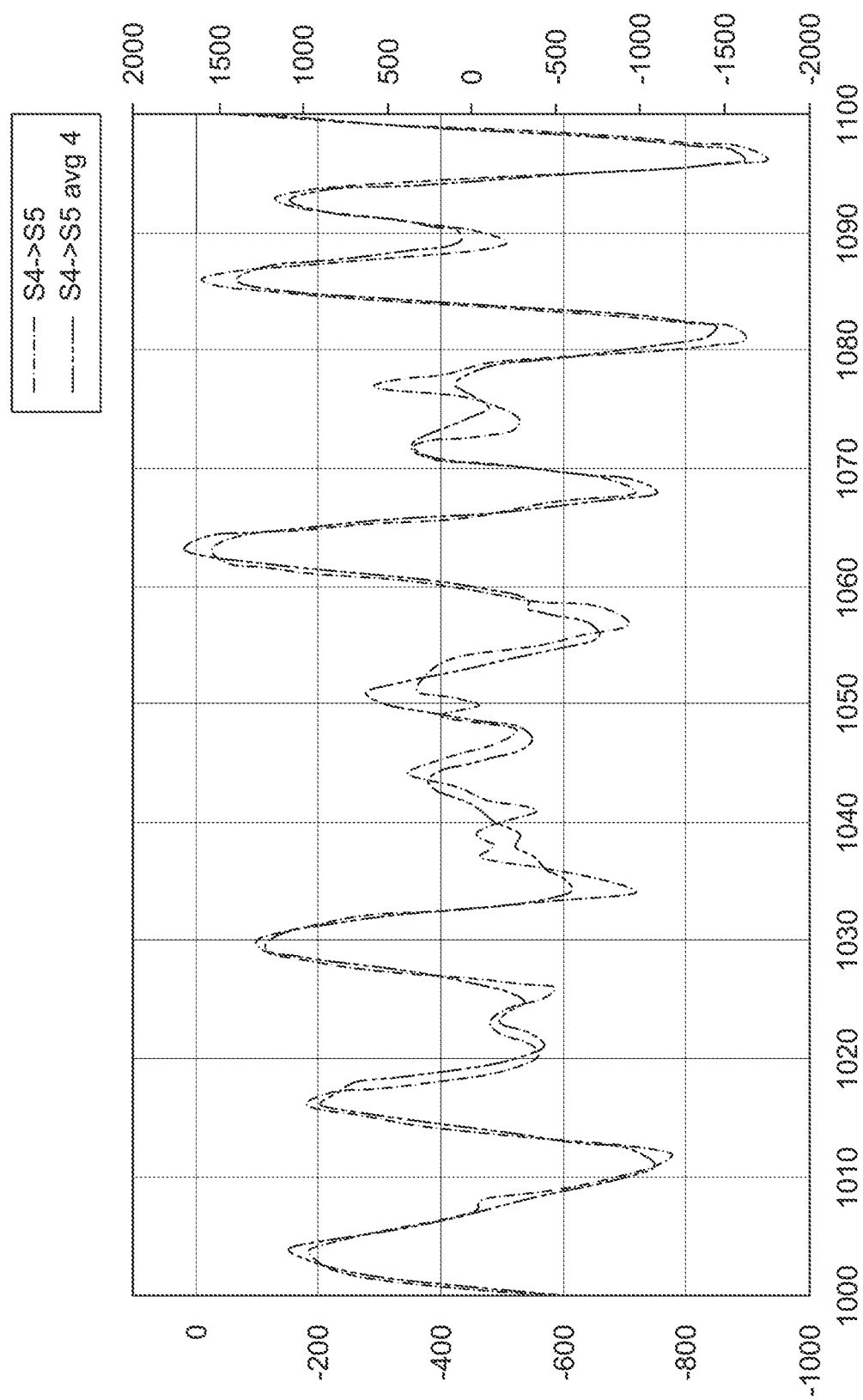

FIG. 24A and FIG. 24B illustrate waveforms generated with a low frequency guided waves (GW) transducer, in accordance with various embodiments disclosed herein. In particular, FIG. 24A shows illustrative measurements on channel 5 with a GW transducer (e.g., Fraunhofer IKTS transducer) at 120 kHz, 16-bit, sampled at 2 MSPS, in accordance with various embodiments disclosed herein. Similarly, FIG. 24B shows illustrative measurements on channel 5 with a GW transducer (e.g., Fraunhofer IKTS transducer) at 120 kHz, 16-bit, sampled at 2 MSPS, in accordance with various embodiments disclosed herein. FIG. 24A and FIG. 24B show various advantages of signal averaging. In an enlarged area, as shown in FIG. 24B, the waveforms compare the result with and without signal averaging. For example, the blue line in FIG. 24A correspond to a waveform without averaging, and the orange line correspond to a waveform with four times averaging. As shown in FIG. 24A, the signal averaging assists in reducing background noise in the system of FIG. 2.

Figure 25A:
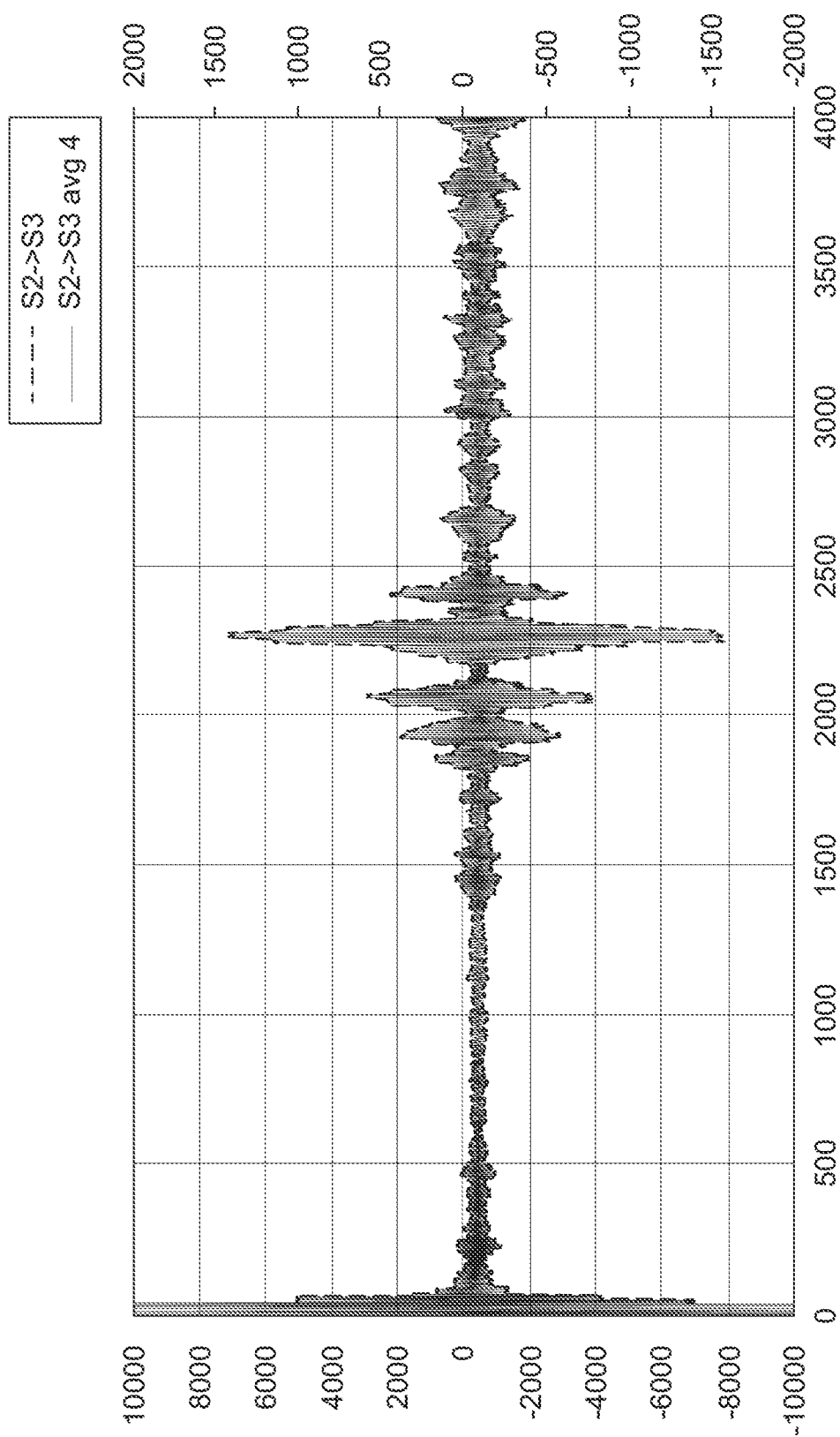
FIG. 25A and FIG. 25B (collectively referred to as "FIG. 25") are also illustrative waveforms generated with a low frequency guided waves (GW) transducer, in accordance with some embodiments disclosed herein.
Figure 25B:
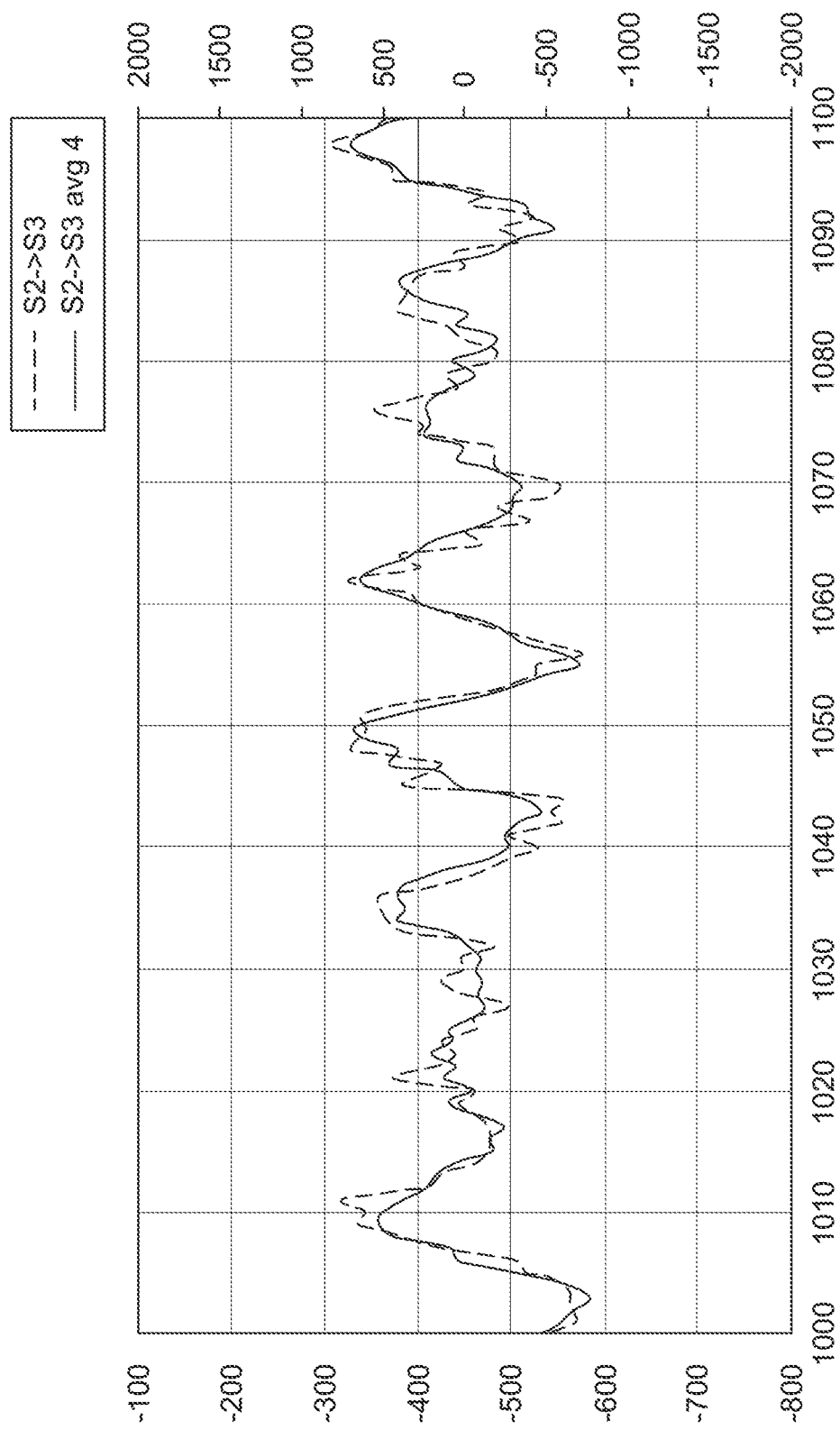

FIG. 25A and FIG. 25B also illustrate waveforms generated with a low frequency guided waves (GW) transducer, in accordance with various embodiments disclosed herein. In particular, FIG. 25A shows illustrative measurements on channel 3 with a GW transducer (e.g., PI transducer) at 120 kHz, 16-bit, sampled at 2 MSPS, in accordance with various embodiments disclosed herein. Similarly, FIG. 24B shows illustrative measurements on channel 3 with a GW transducer (e.g., PI transducer) at 120 kHz, 16-bit, sampled at 2 MSPS, in accordance with various embodiments disclosed herein. Similar to FIG. 24, the waveform signals shown in FIG. 25A and FIG. 25B may assist in reducing background noise in the system of FIG. 2 by using signal averaging.

Figure 26A:
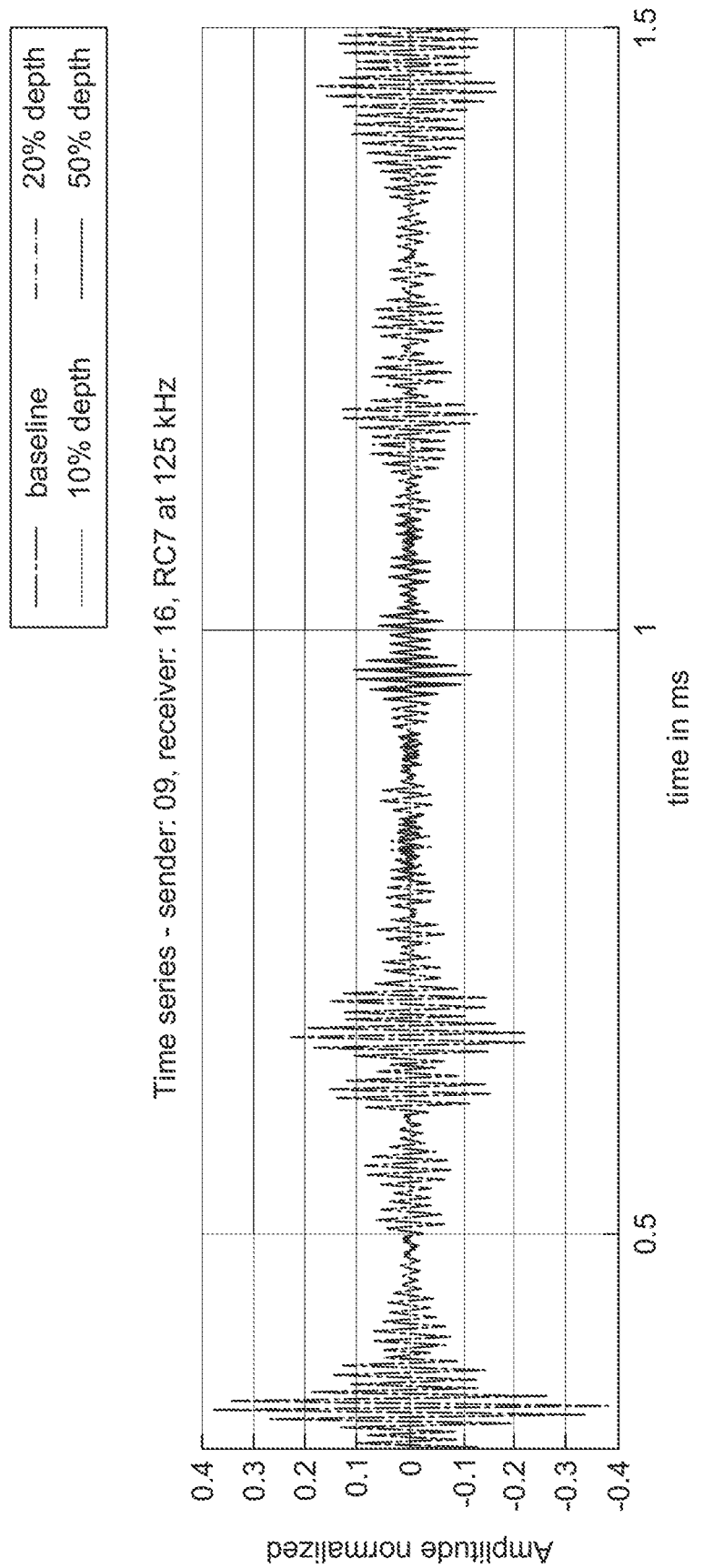
FIG. 26A and FIG. 26B (collectively referred to as "FIG. 26") illustrate a difference between a baseline pipe and a pipe with a defect of different depths, in accordance with some embodiments disclosed herein.
Figure 26B:
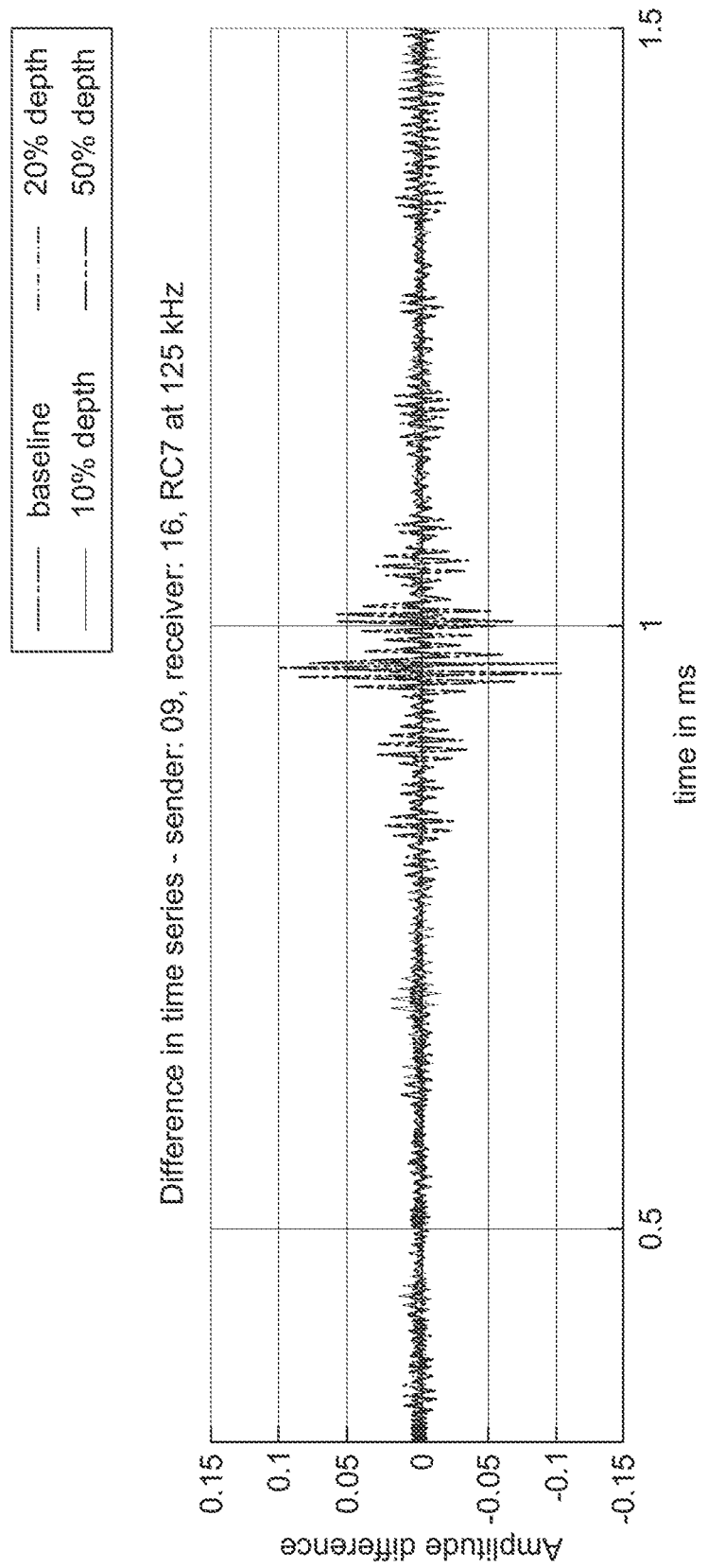

FIG. 26A and FIG. 26B illustrate a difference between a baseline pipe and a pipe with a defect of different depths, in accordance with some embodiments disclosed herein. FIG. 26A illustrates a time series in which a GW transducer (e.g., "sender 9" which may correspond to GW transducer 180A) produces 125 kHz non-dispersive shear horizontal zero waves that are read by another GW transducer on the same pipe (e.g., "receiver 16" which may correspond to GW transducer 180B). The baseline wave signal (represented in black-colored wave) corresponds to the signal received on a baseline piping component; meanwhile, the juxtaposed wave signal corresponding to a piping component with a defect of 10% depth (represented in blue-colored wave) size, a defect of 20% depth (represented in red-colored wave) size, and a defect of 50% depth (represented in green-colored wave) size are illustrated alongside the baseline wave signal. The pitting (e.g., localized corrosion) results in an additional echo in the time-series illustrated in FIG. 26A. The larger the size/depth of the localized corrosion, the larger in magnitude is the echo.

Similarly, FIG. 26B illustrates a time series in which a GW transducer (e.g., "sender 9" which may correspond to GW transducer 180A) produces 125 kHz non-dispersive shear horizontal zero waves that are read by another GW transducer on the same pipe (e.g., "receiver 16" which may correspond to GW transducer 180B). However, the baseline wave signal (represented in black-colored wave) in FIG. 26B is juxtaposes as a difference in time series against the signals corresponding to a piping component with a defect of 10% depth (represented in blue-colored wave) size, a defect of 20% depth (represented in red-colored wave) size, and a defect of 50% depth (represented in green-colored wave) size. As such, the baseline subtraction is more clearly visualized in FIG. 26B to show the echoes resulting from localized corrosion on the piping.

As explained in international PCT patent application serial no. PCT/US2020/063683, filed Dec. 8, 2020, which was already incorporated by reference herein, aspects of the disclosure relate to the monitoring and detection of corrosion and/or erosion of pipes, vessels, and other components in an industrial facility. The monitoring system may comprise a software platform for remote monitoring and analytics of historical measurements collected by a plurality of sensors affixed to the pipes and components. The monitoring system may include analytics tools for monitoring, diagnostics, and/or prediction of localized corrosion and/or general corrosion. By using the analytics systems disclosed herein, the thickness monitoring locations (TML) may be optimized to, among other things, reduce the number of measurement locations without compromising risk—i.e., down-selecting. Through down-selecting, by strategically reducing the number of probe assemblies that need to be sampled during an inspection, the amount of time/cost of an inspection is reduced while simultaneously maintaining (or even reducing) the risk profile of the industrial facility, as explained in this disclosure.

Figure 23:
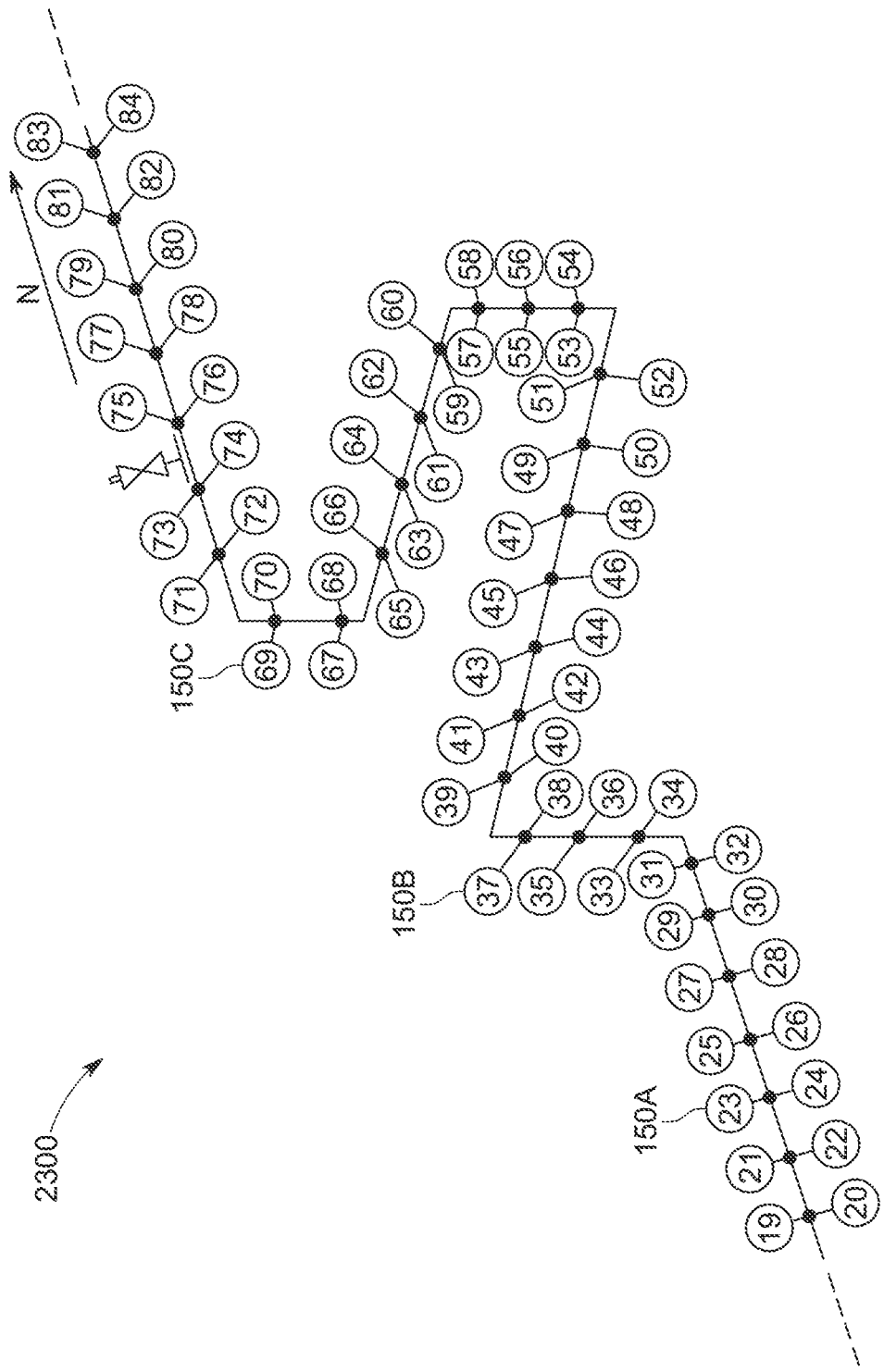
FIG. 23 is an illustration of a simplified pipe and instrumentation diagram (PID) corresponding to an illustrative corrosion/erosion monitoring system, as illustrated in FIG. 1, in accordance with some embodiments disclosed herein.

FIG. 23 illustrates a simplified pipe and instrumentation diagram (PID) corresponding to an illustrative corrosion/erosion monitoring system, as illustrated in FIG. 1, in accordance with some embodiments disclosed herein. The simplified PID 2300 includes numerous probe assemblies depicted as circles numbered nineteen to eighty-four. For example, three different/distinct probe assemblies 150A, 150B, 150C are illustrated. Of course, the number of probe assemblies in the PID 2300 can be any number, as appropriate. In one example, a human operator/inspector may focus the inspection on a down-selected list of TMLs, as explained herein. These down-selected TMLs may represent more efficient candidate measuring locations to capture general corrosion behavior of the entire asset, while still being able to inspect for localized corrosion. For example, substantial amount of time/energy and cost may be saved by down-selecting the number of TMLs so that only those probe assemblies with the highest probability of detecting localized corrosion are examined by the human operator/inspector. Rather than checking all of probe assemblies nineteen to eighty-four, or even randomly checking less than all of probe assemblies nineteen to eighty-four, the down-selected TMLs are a more optimal identification of which TMLs to measure. In some examples, the inspector may use a handheld or other manual device to measure wall thickness at the numbered locations on the simplified PID 2300. In other examples, a rig or harness of sorts may be pre-installed at the numbered location on the simplified PID 2300 to allow the inspector to measure wall thickness at each thickness measuring location. In yet another example, the inspector may be an automated machine that takes measurements at the down-selected TMLs at particular time intervals. Even in an automated measuring system, down-selecting TMLs is advantageous because it reduces the amount of processing power and network bandwidth consumed by measurement data generated by a measuring device at each numbered location on the simplified PID 2300. For example, some large industrial facilities may have thousands upon thousands of probe assemblies that could result in a prohibitive amount of generated data. In addition, once any localized corrosion has been confirmed and repaired, a human operator may indicate as much so that any model can be updated to reflect the new wall thickness values. In addition, in some examples, if a localized corrosion is erroneously identified, then supervised human input into a machine learning or neural network, which is executing in a digital analytics platform, may refine its alerts and model accordingly.

Figure 13A:
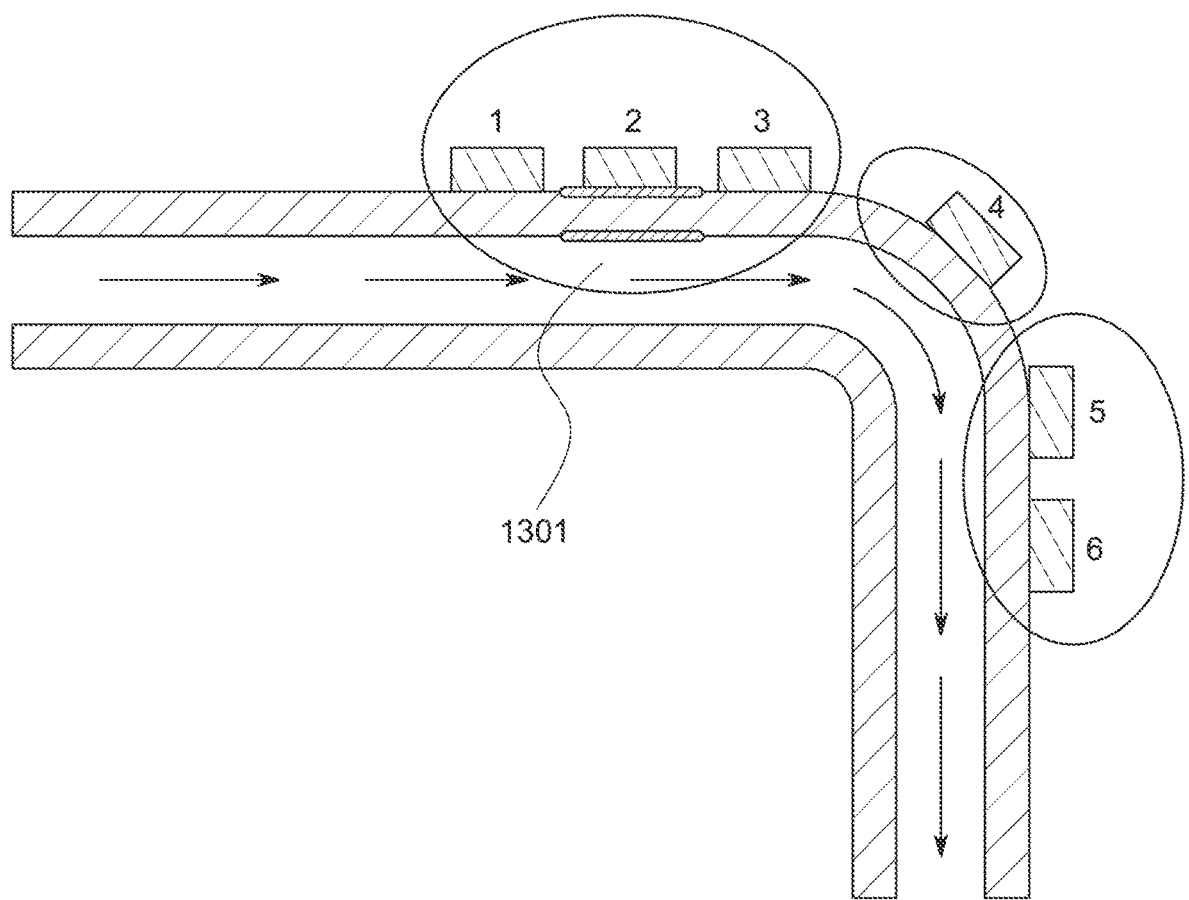
FIG. 13A and FIG. 13B (collectively referred to as "FIG. 13") are drawings of one illustrative piping with installed MUT sensors in accordance with one or more aspects of the features disclosed herein.

FIG. 13A illustrates an illustrative piping with sensors 1301 installed on the pipe in accordance with one or more aspects of the features disclosed herein. The pipe may have a flow of liquid in the direction depicted by the arrows. During an inspection, one approach may be to inspect and take measurements from each and every sensor 1 to 6 depicted in FIG. 13A. In another example, a random selection of sensors may be inspected and measured. In accordance with several of the systems and methods disclosed herein, in another example, the plurality of thickness monitoring locations (TMLs) shown at each sensor 1 to 6 may be intelligently considered and a smaller/narrower set of TMLs may be down-selected for inspection. Moreover, in accordance with several of the systems and methods disclosed herein, the TMLs may be grouped based on one or more criteria in the process of down-selecting the TMLs. The down-selecting criteria may, in one simplified example, identify and exclude those sensors (e.g., sensors 1 and 3) that historically measured only general corrosion in its area. Thus, by down-selecting the system 100 avoids using clustering, but instead uses grouping to down-select some sensors as being superfluous to the assessment of the health of the mechanical component. Thus, saving time and resources. In contrast, some prior systems attempted to reduce risk by adding more TMLs and inspections of those TMLs. However, the risk-based inspection (RBI) approach described in various aspects of this disclosure provides a superior process and system. An RBI approach may also use a model that takes into consideration other criteria such as the type of fluid being transported in the piping system, the temperature inside and outside of the pipes/components, elbow/configuration of the piping components, and other criteria. For example, the measurements at an elbow may be weighted to be more likely to be selected as part of down-selecting in a group because historically, the locations near an elbow in piping is a place that will have more turbulence and friction, thus a possibility of higher corrosion and acidity.

Figure 13B:
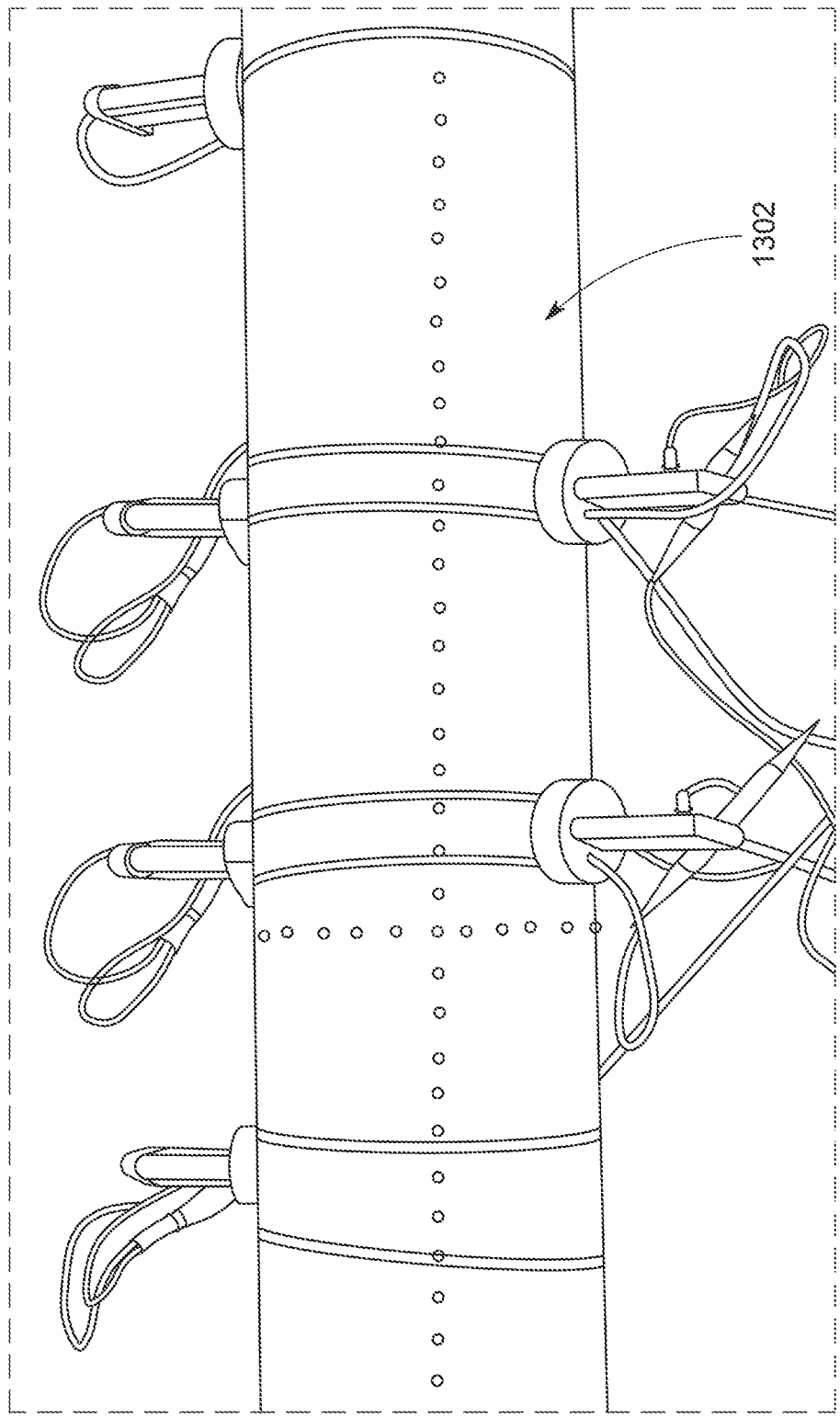

Referring to FIG. 13B, probe assemblies 1302 may comprise a tethered device that captures accurate spot measurements of thickness of components. In another embodiment, probe assemblies may comprise a tethered device that captures accurate spot measurements and area monitoring. For example, the device in FIG. 13B or comparable devices may be used to capture area monitoring of the thickness of a pipe component. In yet another embodiment, the probe assembly may comprise a wireless device that captures accurate spot measurements without necessarily being in direct contact with a piping component that requires thickness monitoring. The probe assemblies may comprise one or more of thickness monitoring ultrasonic transducers, area monitoring ultrasonic transducers, and/or a combination thereof that are configured to validate general corrosion (e.g., confirm no detection of localized corrosion) in the piping system.

FIG. 13B is a drawing of an illustrative piping with installed sensors. The sensors 1302 may be any of various types of sensors configured to measure a thickness of the piping at or near the vicinity of the point of its installation on the pipe. The sensors 1302 are typically installed in a permanent location and remains affixed to the pipe for an extended period of time (e.g., for the lifespan of that circuit of the piping, for over five years, for over three years, or other period of time). Although the sensors 1302 displayed in FIG. 13B are installed to the outside of the piping and tethered with wires, in some examples in accordance with one or more aspects of the disclosure, the sensors may be untethered and wirelessly communicate data to one or more wireless receiver/transceiver devices. In addition, although the sensors displayed in FIG. 13B are illustrated in a straight linear pattern along the longitude of the pipe, the disclosure contemplates sensors installed in any of several different patterns. For example, the density of installed sensors may be based on the direction of gravity and the type of substance being transported in the piping. For example, assuming in one example that the piping in FIG. 13B is transporting a liquid along the length of pipe from the left to the right when the bottom of the pipe is the portion of the pipe on which sensor 1302 is installed. In such an example, the sensors installed on the piping may be distributed around the circumference of the piping taking into consideration that climate conditions (e.g., rain, hail, sun) may expose portions of the pipe to greater possibility of deterioration while internal conditions in the piping (e.g., more liquid contacts the bottom of the pipe than the top of the pipe) may expose inner portions of the pipe to greater possibility of deterioration.

Figure 14:
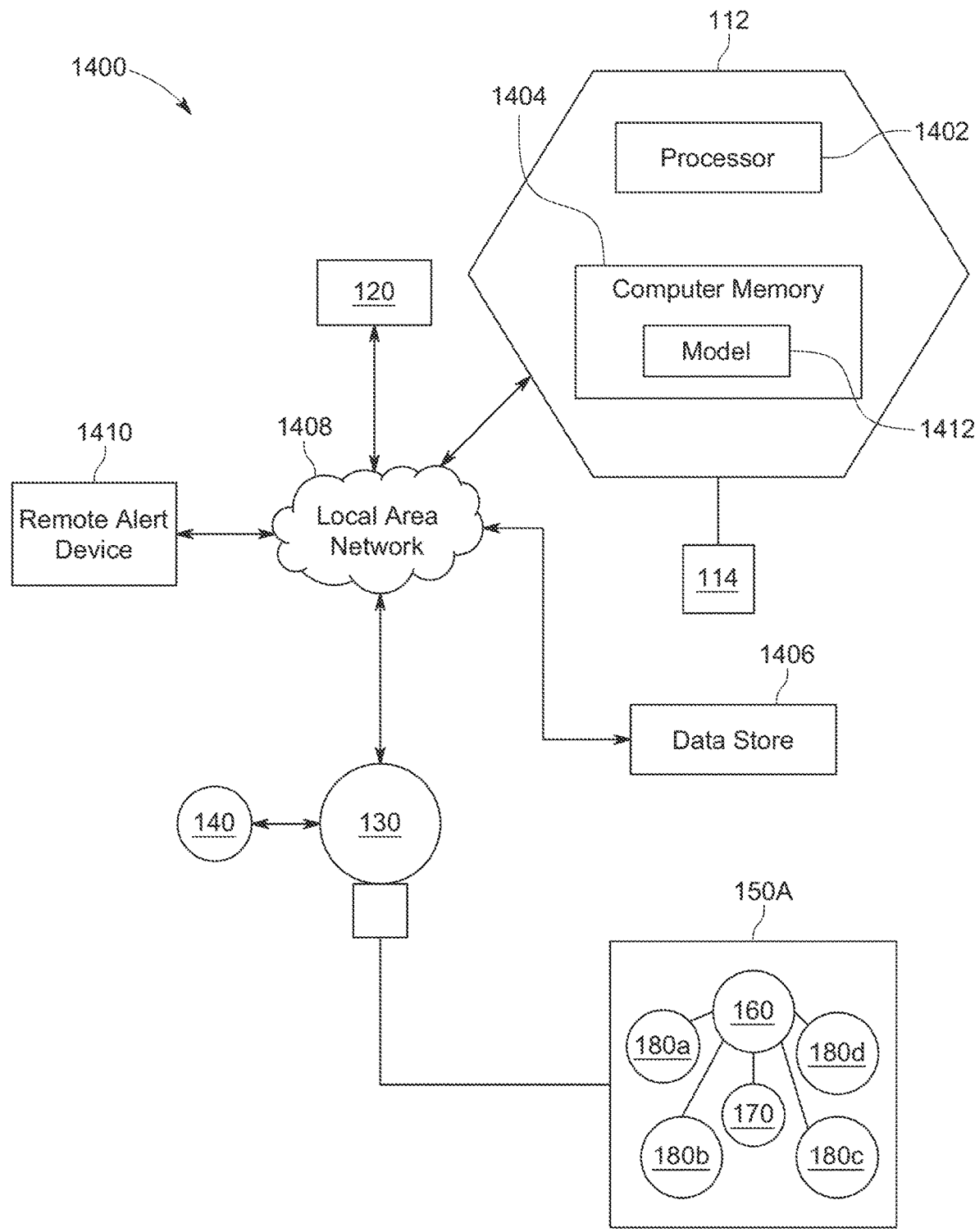
FIG. 14 is an illustrative network architecture of an industrial facility in accordance with various aspects of the disclosure.

FIG. 14 is an illustrative network architecture of an industrial facility with sensors, communication components, and other components in accordance with various aspects of the disclosure. The data analytics platform 112 may be communicatively coupled over a network, such as a local area network 1408, to one or more networked components. For example, the data analytics platform 112 may output to a visualization platform 114 for generation of one or more of the illustrative graphs included herein. A monitoring system may comprise the software platform 112 to remotely monitor and analyze historical measurements collected by a plurality of sensors affixed to the pipes and components. The monitoring system may include analytics tools for monitoring, diagnostics, and/or prediction of areas that are candidates for localized corrosion (e.g., because the system was unable to confirm general corrosion to the area). By using the analytics systems disclosed herein, the TML may be optimized to, among other things, reduce the number of measurement locations without compromising risk—i.e., down-selecting.

In another example, the data analytics platform 112 may trigger an alert to be generated at a remote alert device 1410. The remote alert device 1410 may result in an immediate inspection of one or more components, or may result in particular piping components being prioritized for a subsequent inspection of the facility.

As measurements and other data are collected by the system 1400, the data may be stored in a data store 1406 that is communicatively coupled and accessible to the data analytics platform 112. In some examples, the data may be stored in computer memory 1404, however, the amount of computer memory required may be high. Instead, in some examples, a model 1412, such as a machine learning artificial neural network, may be stored at the computer memory 1404 for execution by a processor 1402, while historical data and other data may be stored at a data store 1406. In some examples, the data store may be moved into the platform 112 although it is shown for illustrative purposes as communicating over the local area network 1408 with the platform 112.

Figure 15:
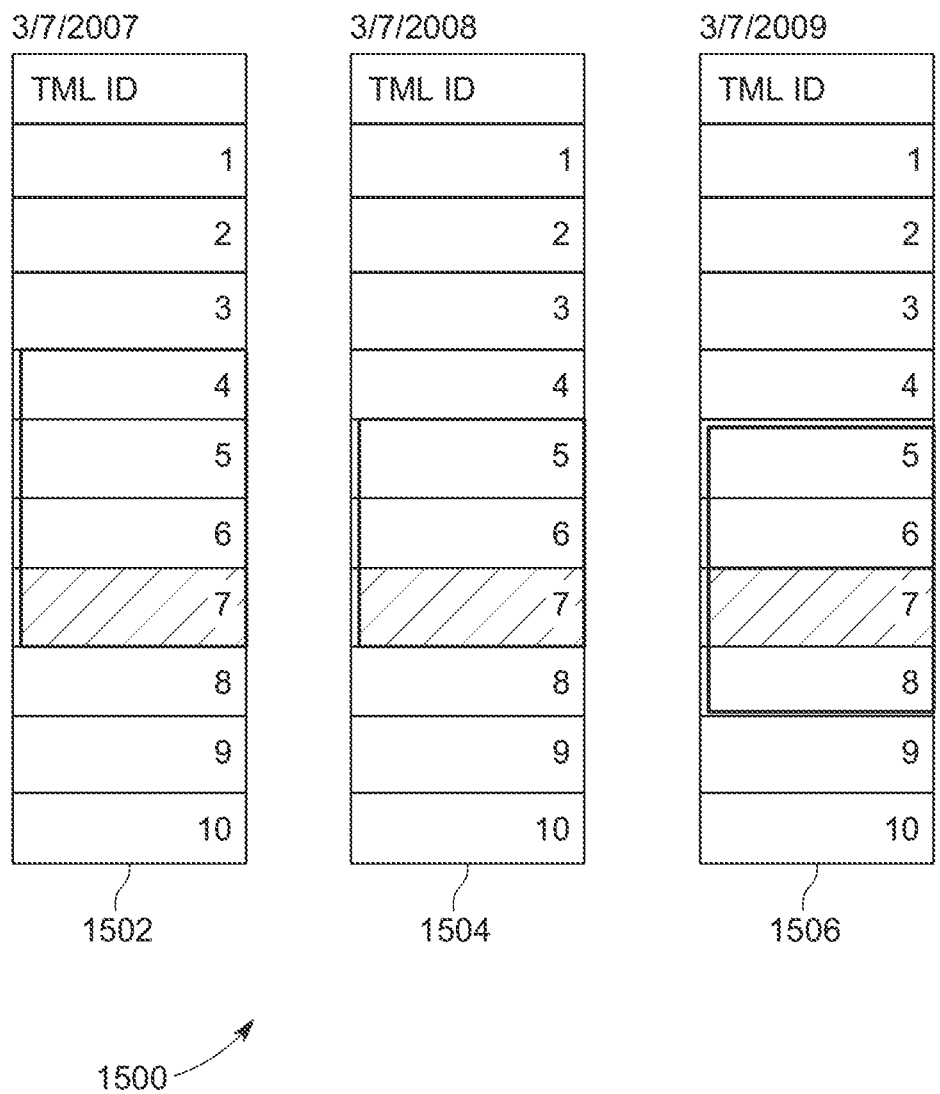
FIG. 15 is an illustrative diagram of probe assembly groupings in one embodiment of the disclosure.

FIG. 15 is an illustrative diagram of a plurality of sensor (e.g., probe assembly) groupings in one embodiment of the disclosure. Each probe assembly may be assigned a unique TML identifier (TML ID) as illustrated in FIG. 15. The TML ID may be any unique letter, character, or other identifier that uniquely identifies each TML (i.e., probe assembly). In FIG. 15, the thick-lined rectangular box around select TML ID numbers shows probe assembly groupings. In 1502, on Mar. 7, 2007, the system has grouped probe assemblies 4, 5, 6, and 7 into one grouping based on or more rules. In 1504, on Mar. 7, 2008, the graphical representation of the data stored in the computer memory 1404 shows that the system 1400 has adjusted the grouping to include/exclude one or more TMLs. In 1504, the model may recommend that the probe assembly corresponding to TML ID number four should no longer be a part of the groupID corresponding to the thick-lined rectangular box in 1504. As a result, the one or more probe assembly down-selected for that groupID may also change. Finally, in 1506, on Mar. 7, 2009, the graphical depiction shows that the system 1400 has further adjusted the grouping to now group probe assemblies 5 and 6 into a first groupID and probe assemblies 7 and 8 to a different/separate second groupID. As a result, the down-selecting and risk profile, as illustrated discussed below in FIG. 16, will change for the overall system 100.

In one example, the grouping of TMLs into a groupID may be done in one of several different methods. For example, the initial grouping for each circuit of components at a facility may be based on the measurement data level. For every date on which measurements were taken by the probe assemblies, a new group may be triggered if a probe assembly satisfies any of the following conditions: (i) if the probe assembly is the first TML of the circuit; (ii) if the (absolute) difference between the measurement value and the preceding TML's measurement value is greater than about 0.5 to about 3.0 standard deviation of all measurements for that date, then the value of this parameter may be reduced for more conservative grouping, or increased for more aggressive grouping; (iii) if the TML's nominal wall thickness measurement is different as compared to the preceding TML's nominal wall thickness measurement; or if the TML has only one measurement historically (across all dates). In another example, the grouping of TMLs may be done in a multi-step process. In a first step, all measurements taken in a group of connected components (e.g., a circuit) on a particular date (or any other predefined time period—e.g., within a one-hour window of time, within the same week, or other) may be compared to determine how many pairs (or tuples) were measured on the particular date. In one example, any TML pairs that have less than a predetermined percentage (e.g., 70%, 80%, 60%, 75%, or other percent) of the total measurements within that survey year (or other time period) are deleted. Next, the minimum measurement value of all the TMLs may be identified and all TMLs that were paired in an earlier (e.g., first) step with that TML are assigned to the same groupID. Other examples of rules for grouping the TMLs would be apparent to a person having skill in the art after review of the entirety disclosed herein.

Additional other illustrative rules for grouping the TMLs are contemplated in this disclosure. For example, in some rules the grouping may be reassigned based on TML pairing percentage. For a circuit of components that has at least two measurement dates, TML pairs that are grouped together at least a predetermined threshold percentage of times may be retained in the same group, but TMLs that do NOT meet this threshold may be individually assigned to separate groups using one or more rules. In yet another example, measurement dates that do not have sufficient TMLs may be dropped. For every circuit of components, the system 1400 may consider, in some examples, only those measurement dates which have at least a predetermined threshold percentage of the maximum number of TMLs for any date. TMLs that appear in dates that do not meet this threshold may be individually assigned to separate groups.

In some examples, the system 1400 may discard (e.g., drop) seemingly invalid measurements based on a lack of historical data, and proceed to re-group TMLs based one or more of the rules described herein. The thresholds used are hyperparameters that can be adjusted based on data set diversity and quality. This adjustment may occur at the end of the process upon data confirmation and validation. In one example, threshold percentage may be set to 75%, but with some TMLs the prior measurement might not have occurred in the past, many years. In some embodiments, a hyper-grid may be generated and used to adjust the parameters and/or hyperparameters of the system 1400. In some examples, the threshold setting may be strongly correlated to how many TML measurements a system 1400 has collected for each TML ID. Thus, the threshold may be adjusted up or down based on how much data is made available to the system 1400.

Figure 16A:
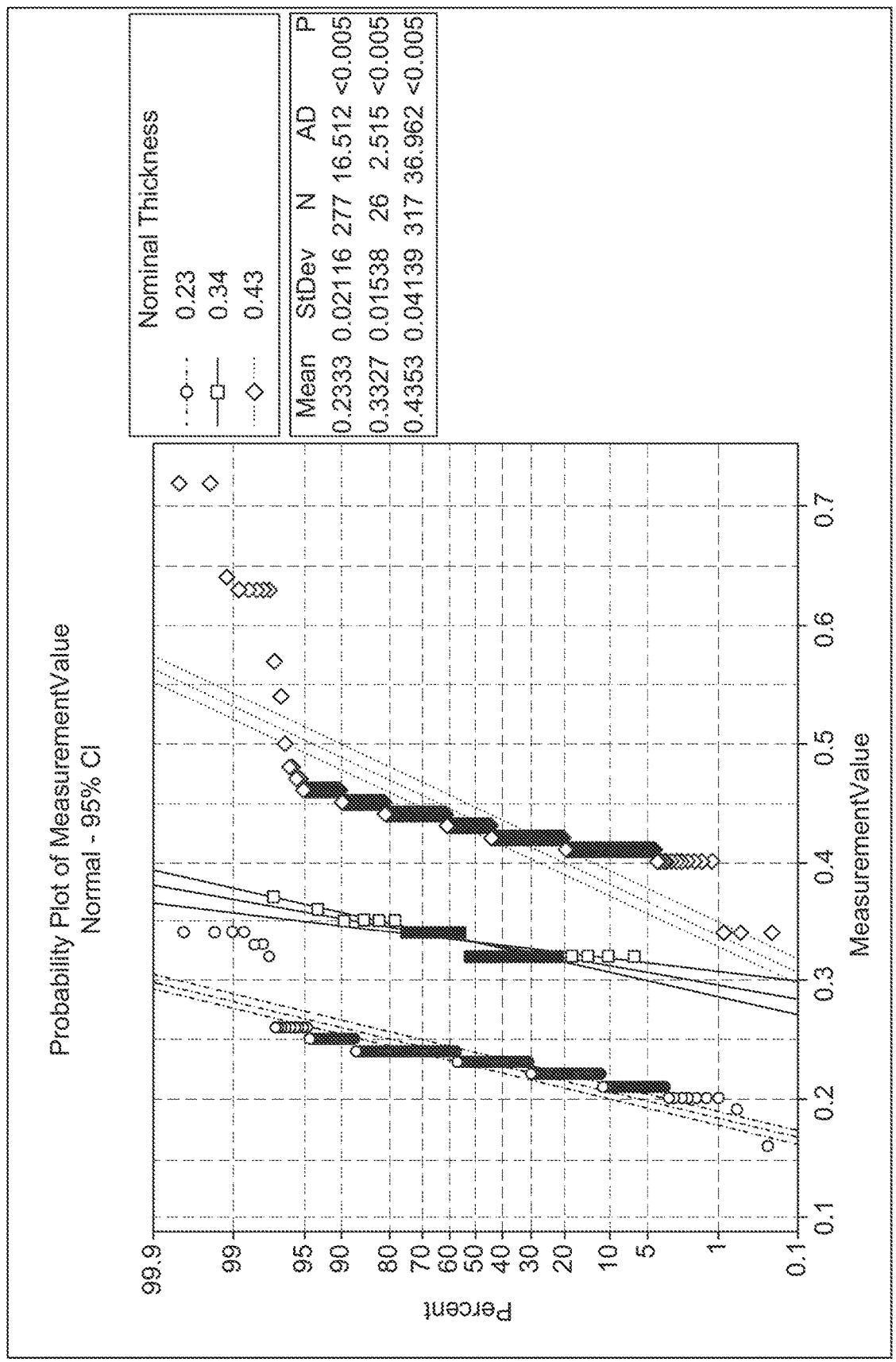
Figure 16B:
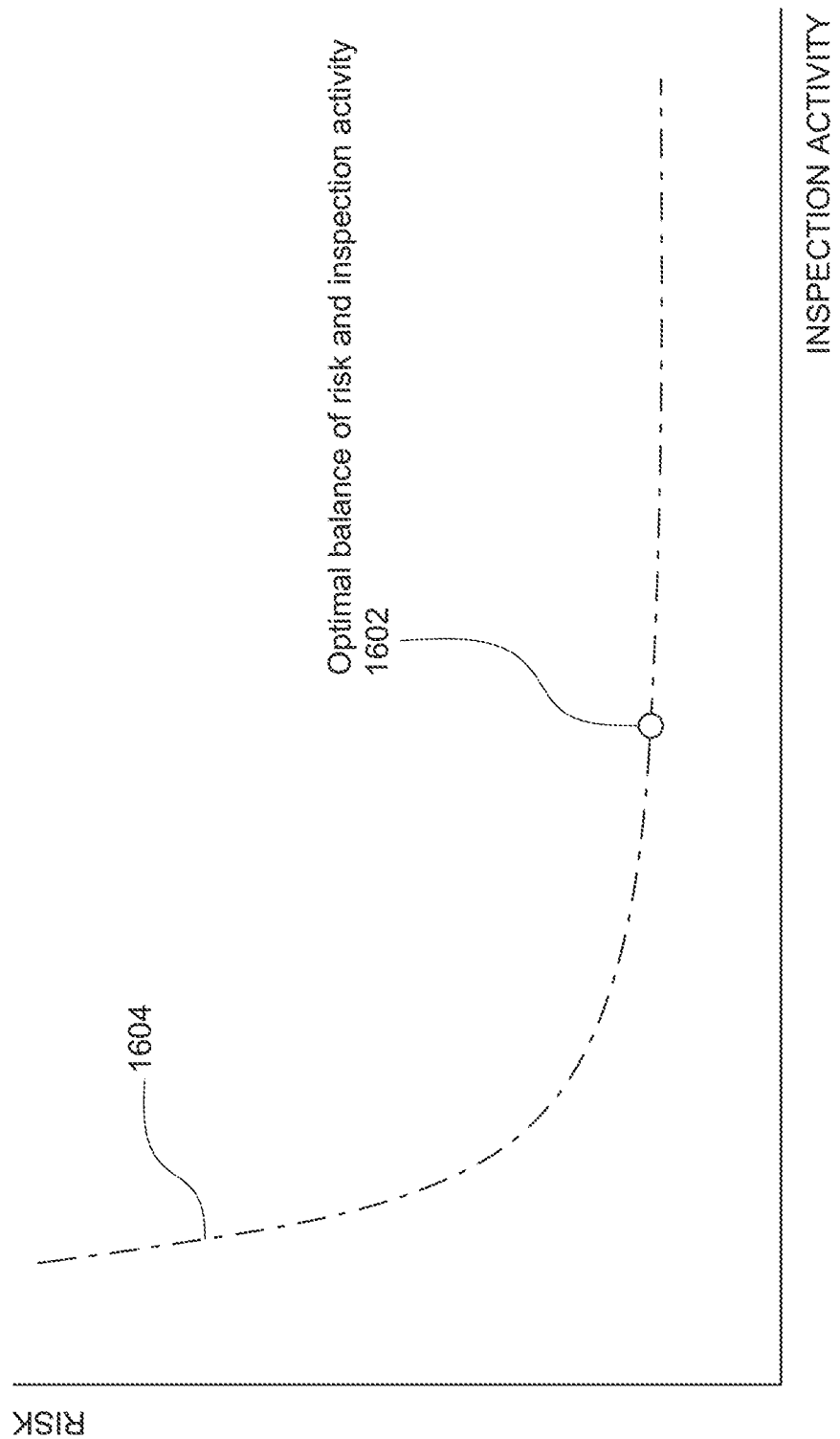
Figure 17:
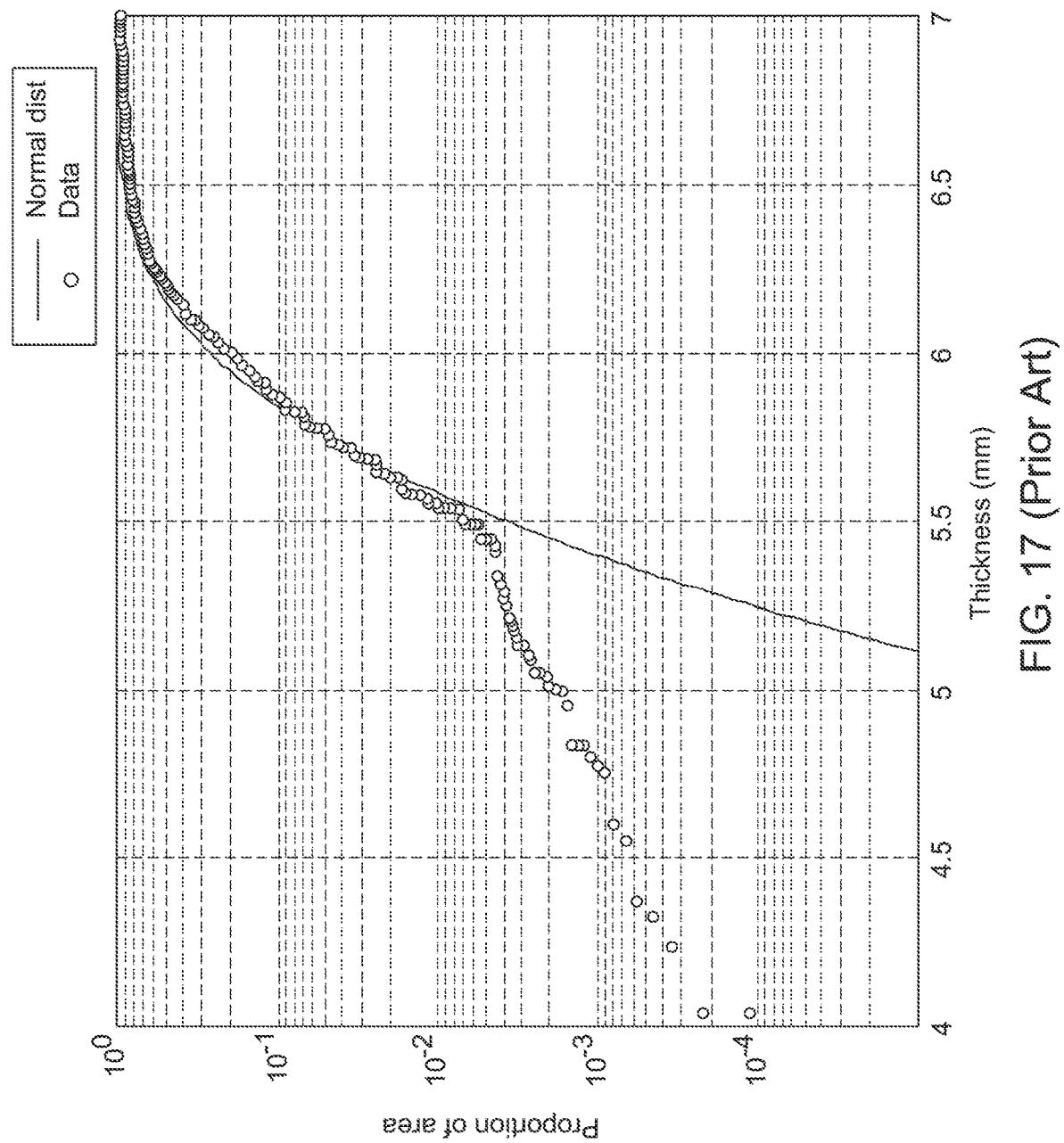
FIG. 17 is a graph plot of illustrating cumulative thickness distribution for tubes with naphthenic acid corrosion.

FIG. 16 and FIG. 17 show graph plots of various data collected and/or analyzed by the system 1400. FIG. 16A shows a probability plot graph of measurements values (normal is 95%) where percentage is on the Y-axis and measurement value is on the X-axis. The system 1400 defaults to assuming that general corrosion has been detected, except when the plot shows that the tail is not running vertical, such as shown near the top of the graph in FIG. 16A. The data analytics platform 112 may validate that the pipe wall thickness measurement of the probe assembly is general corrosion and not localized corrosion by performing one or more steps. For example, in some embodiments, the validating may be performed by generating a probability plot of all pipe wall thickness measurements associated with the piping system, then grouping the plotted pipe wall thickness measurements by nominal thickness, and identifying a non-linear relationship in the probability plot of pipe wall thickness measurements grouped by nominal thickness to confirm that the corrosion is likely not general corrosion. Meanwhile, where the graph shows a linear relationship, then the TMLs corresponding to those data points in the graph are exhibiting general corrosion. This approach is an advancement over systems that may have used standard deviation to build normal probability plots. Moreover, the validating step adds further assurance that the system 1400 is accurately detecting general corrosion and acting accordingly to down-select the appropriate probe assemblies installed on the components in the facility. The system 1400 should not generate an alert (e.g., from device 1410) for general corrosion because general corrosion is pervasive and is typically not of primary interest during inspections. Rather, general corrosion is accounted for in the scheduling and planning for bulk replacement of components in a facility.

Referring to FIG. 16B and FIG. 16C, those graphs illustrate the relationship between a risk of mis-identifying general corrosion and the quantity of thickness measurement locations (TMLs). Although the amount of risk is asymptotic to a threshold minimum amount of risk 1602 regardless of the number of measurement locations. FIG. 16B shows that the level of risk charted against the quantity of probe assemblies (i.e., TMLs) decreases as more TMLs are added. Meanwhile, the effects of the system and method disclosed herein are shown in FIG. 16C, which illustrates a shift in the curve depicting the level of risk charted against the quantity of TMLs after down-selection. FIG. 16B and FIG. 16C are described in more detail below in conjunction with the method steps illustrated in the flowchart of FIG. 22. Meanwhile, FIG. 17 is a graph illustrating cumulative thickness distribution for tubes with naphthenic acid corrosion in existing systems known in the art.

Figure 18A:
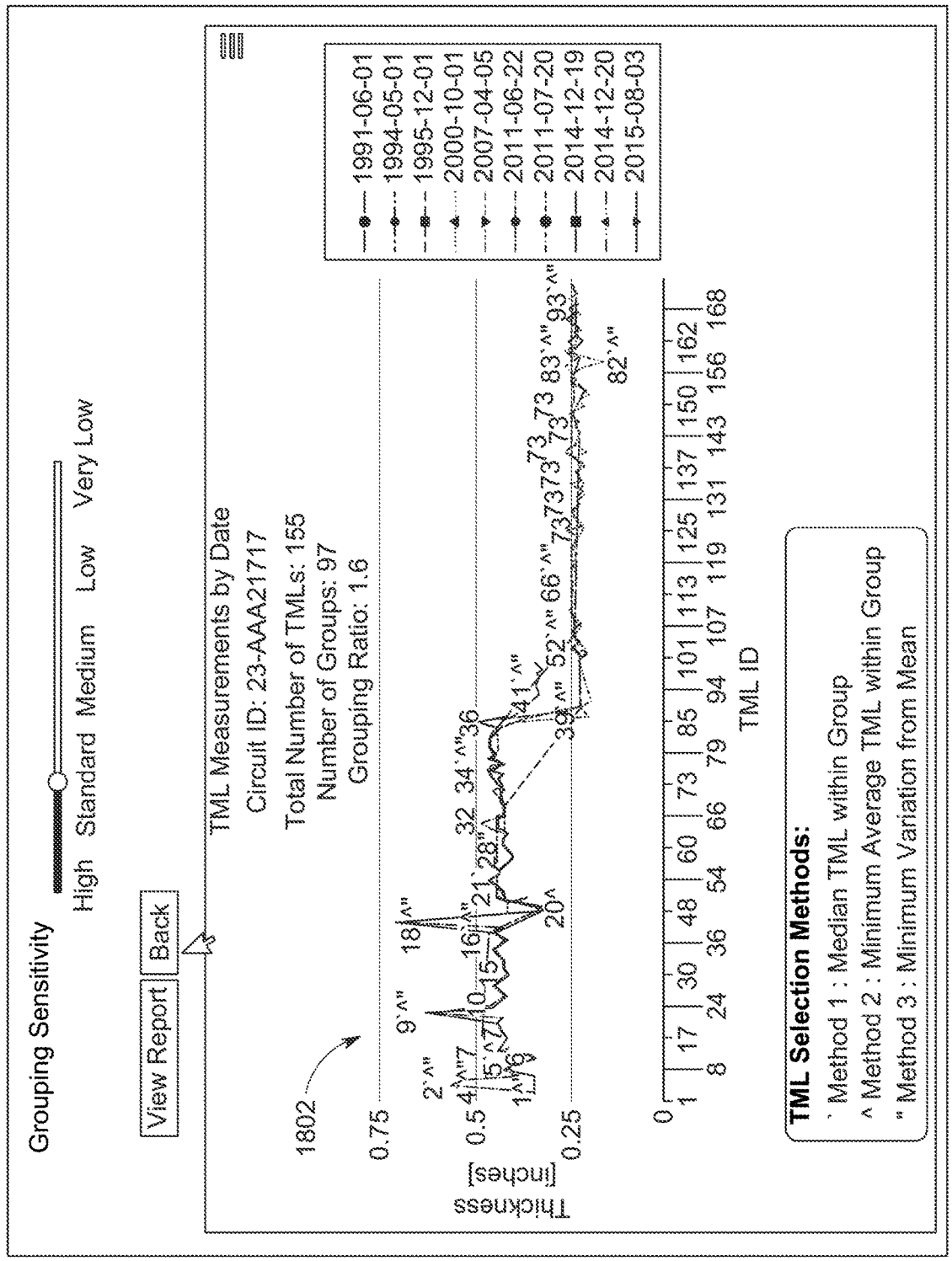
FIG. 18A is a corrosion sensor analytics graph illustrating TML measurements by date in one embodiment of the disclosure.

FIG. 18A is a corrosion sensor analytics graph illustrating TML measurements by date for a specific circuit ID (or asset ID). The X-axis corresponds to TML identifiers. For practical purposes, the probe assemblies installed on a piping system may be assigned identifiers in a sequential or otherwise ordered sequence along the circuit formed by the piping system. Each TML might have an ID that shows its position upstream or downstream on the pipe. Other data cleaning and/or scrubbing of the TMLs based on positional data may be performed to harmonize/standardize the measured data for analysis. Each TML might be assigned a nominal thickness from when the pipe was first installed. One or more publicly available databases (e.g., Meridian database) may provide data, including nominal thickness measurements and specifications. Meanwhile, as the legend on the right-hand side of FIG. 18A shows, measurements may be taken over a period of time so that historical data spanning at least a few years (i.e., an extended period of time) may be stored and analyzed. In this example, almost twenty-five years of wall thickness measurement data is stored, analyzed, and plotted in FIG. 18A. Graph plot 1802 in FIG. 18A corresponds to measurements taken on 2015, Aug. 3. Meanwhile, the other plots in the graph correspond to thickness measurements taken for each TML on the corresponding date spanning back almost twenty-five years (e.g., an extended period of time).

Figure 18B:
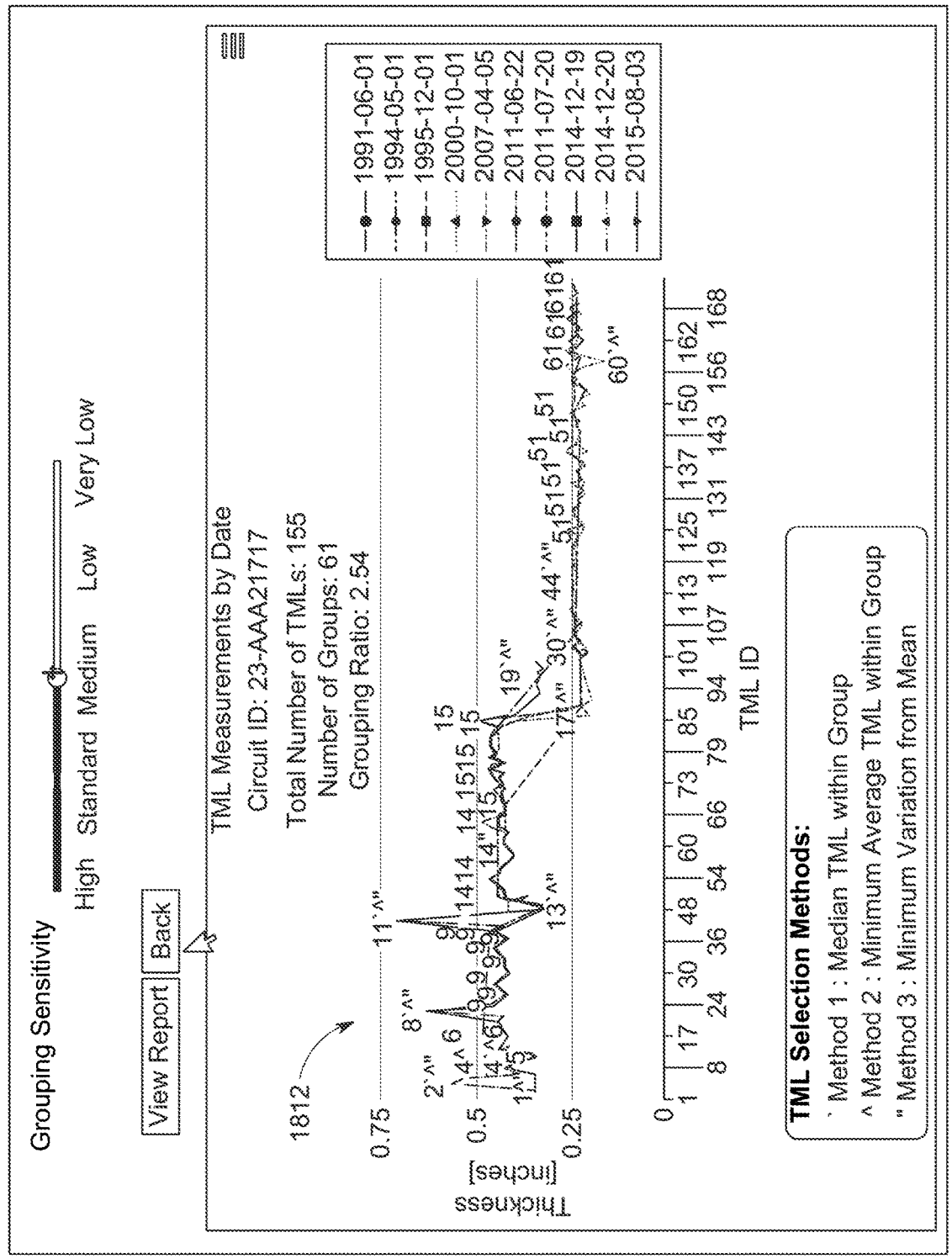
FIG. 18B is another corrosion sensor analytics graph illustrating TML measurements by date as in FIG. 18A, but with a higher grouping sensitivity setting.
Figure 18C:
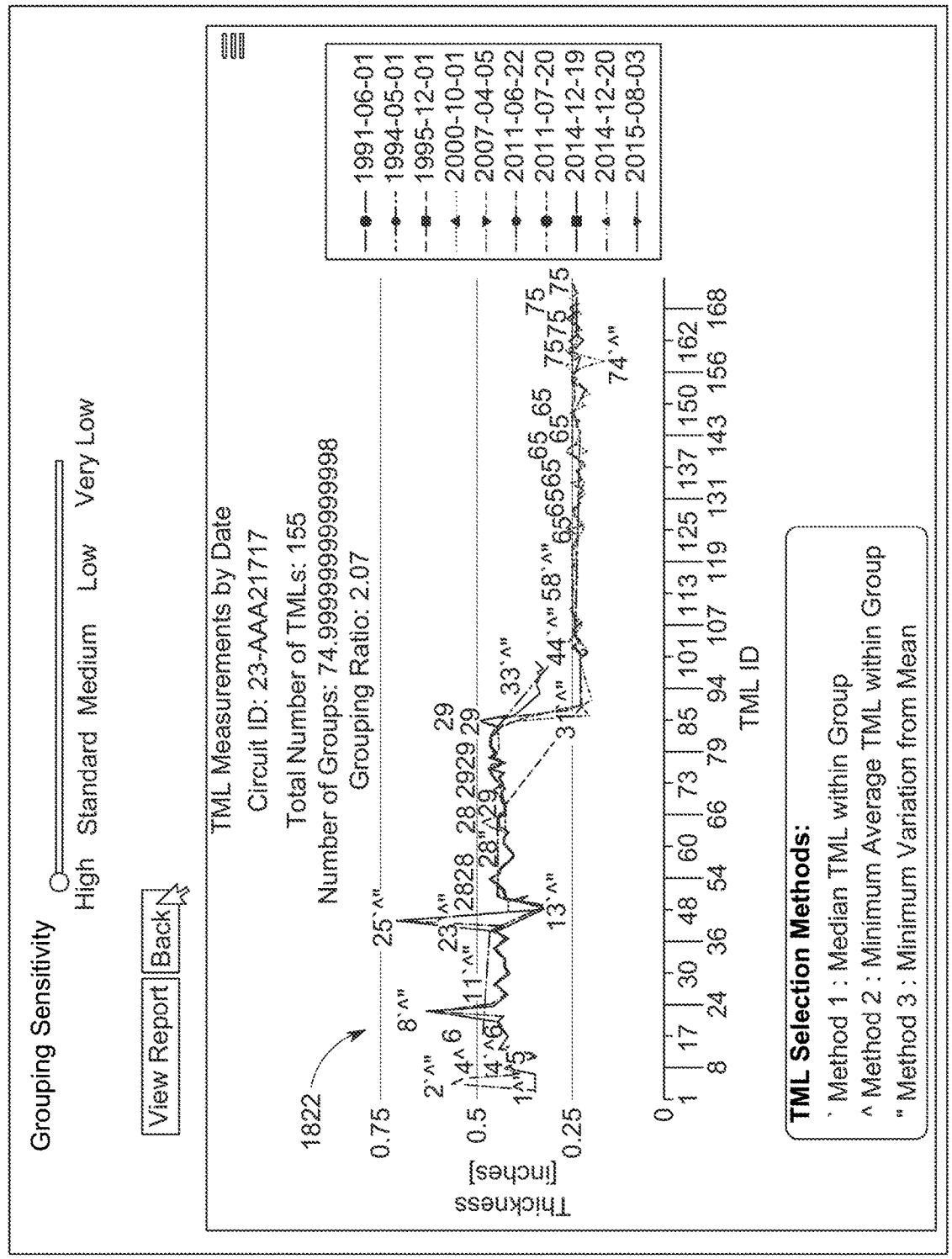
FIG. 18C is yet another corrosion sensor analytics graph illustrating TML measurements by date as in FIG. 18A, but with an even higher grouping sensitivity setting.

The data analytics platform 112 may set one or more hyperparameter for the model 1412 corresponding to the graph plotted in FIG. 18A. A hyperparameter is typically set before the training/learning process begins on a model; in contrast, the values of other parameters are derived through training of the model. In FIG. 18A, a graphical user interface for adjusting the grouping_sensitivity hyperparameter is displayed at the top. The visual platform 114 may include a graphical tool/slider through which the hyperparameter may be adjusted. In FIG. 18A, the grouping_sensitivity hyperparameter is shown set to a "standard" setting. Meanwhile, in FIG. 18B, which shows another illustration of the model 1412, the grouping_sensitivity hyperparameter is shown set to a "medium" setting. As a result, the number of groups is only sixty-one in FIG. 18B instead of ninety-seven groups in FIG. 18A. In addition, the graph plotted 1812 in FIG. 18B is slightly different than the graph 1802 in FIG. 18A due to the change in hyperparameter settings and TML selection methods. Furthermore, with the grouping_sensitivity hyperparameter set to "high" in FIG. 18C, the graph plotted 1822 in FIG. 18C is even more different from FIG. 18A and FIG. 18B. The number of groups is about seventy-five while the total number of TMLs remains constant at one hundred fifty-five.

The grouping_sensitivity hyperparameter refers to the sensitivity or aggressiveness of TML grouping, and may be applied at the initial grouping stage. In some examples, a TML may be assigned to a new group when the (absolute) difference between the measurement value and the preceding TML's measurement value is greater than 1 standard deviation (SD) of all measurements for that date. This threshold can be adjusted for more conservative or aggressive grouping. A threshold less than 1 SD will result in the grouping being more sensitive to changes in measurements and will lead to a more conservative grouping. On the other hand, a threshold greater than 1 SD will cause the grouping being less sensitive to changes in measurements and will lead to more aggressive grouping (e.g., higher grouping ratios). In one example, five different grouping sensitivities may be implemented, as shown in FIG. 18C, in decreasing sensitivity—from most conservative to most aggressive as follows: High (0.5 SD), Standard (1 SD), Medium (1.5 SD), Low (2 SD), and Very Low (3 SD). In another example, more or less than the aforementioned five groupings may be used to provide more granular or coarse sensitivity. As the grouping_sensitivity hyperparameter is applied at the initial grouping stage, as is the case hyperparameters, all subsequent grouping steps may be re-run based on the initial grouping results—i.e., the entire grouping cycle is repeated five times, once for each of the five grouping sensitivity levels.

Notably, FIG. 18A, FIG. 18B, and FIG. 18C (collectively referred to as "FIG. 18") list a plurality of TML selection methods that may be applied to the measurement to optimize the grouping and plotting of the data points. Although FIG. 18 lists three optimization functions—namely median_TML_within_groupID, minimum_average_TML_within_groupID, and minimum_variation_from_mean—other optimization functions may be used in accordance with one or more aspects of the disclosure. For example, a TML_position optimization function may be used where if one TML is to be selected, the TML at the center of the group is chosen. If two TMLs are to be selected, the group is split into two subgroups and the TMLs at the center of each subgroup are chosen, and so on. Other examples of TML selection methods are contemplated herein. For example, the optimization function may be a minimum_average_TML_within_groupID optimization function. In minimum_average_TML_within_groupID method for deciding which TML(s) to pick from each group, the method selects the TML(s) having the lowest average measurement within each group (across dates). For example, in one illustrative system using the minimum_average_TML_within_groupID optimization function, the system may calculate average measurement of each TML (across dates), rank TMLs in each group by (e.g., ascending) average measurement, and based on number of TMLs to be picked (n) from each group, pick first n TMLs. Likewise, the median_TML_within_groupID optimization function is similar to the minimum_average_TML_within_groupID optimization function, but based on the median instead of the minimum average.

In another example the optimization function may be a minimum_variation_from_mean_optimization function. In a minimum_variation_from_mean method for deciding which TML(s) to pick from each group, the method selects the TML(s) having the lowest average variation from the mean measurement of the group. For example, in one illustrative system using the minimum_variation_from_mean optimization function, the system may calculate the mean group measurement for each date. Then, for each TML, for each date calculate the absolute difference from mean, and for each TML, calculate the average variation (e.g., absolute difference from mean). Next, the minimum_variation_from_mean optimization function ranks TMLs in each group by (e.g., ascending) average variation, and based on number of TMLs to be picked (n) from each group, pick first n TMLs.

After finalizing groupings, the system 1400 determines a TML candidate selection method and a desired number of probe assemblies per group. The number of candidates per group may be another hyper-parameter. By default, the system 1400 may use the greater of 1% or one for each TML group. If more than one TML candidate is to be selected, then the TML group may be divided into equally big sub-groups while preserving the TML ordering. Then, the system 1400 may apply a TML candidate selection method based on the one or more scenarios described herein.

Figure 19A:
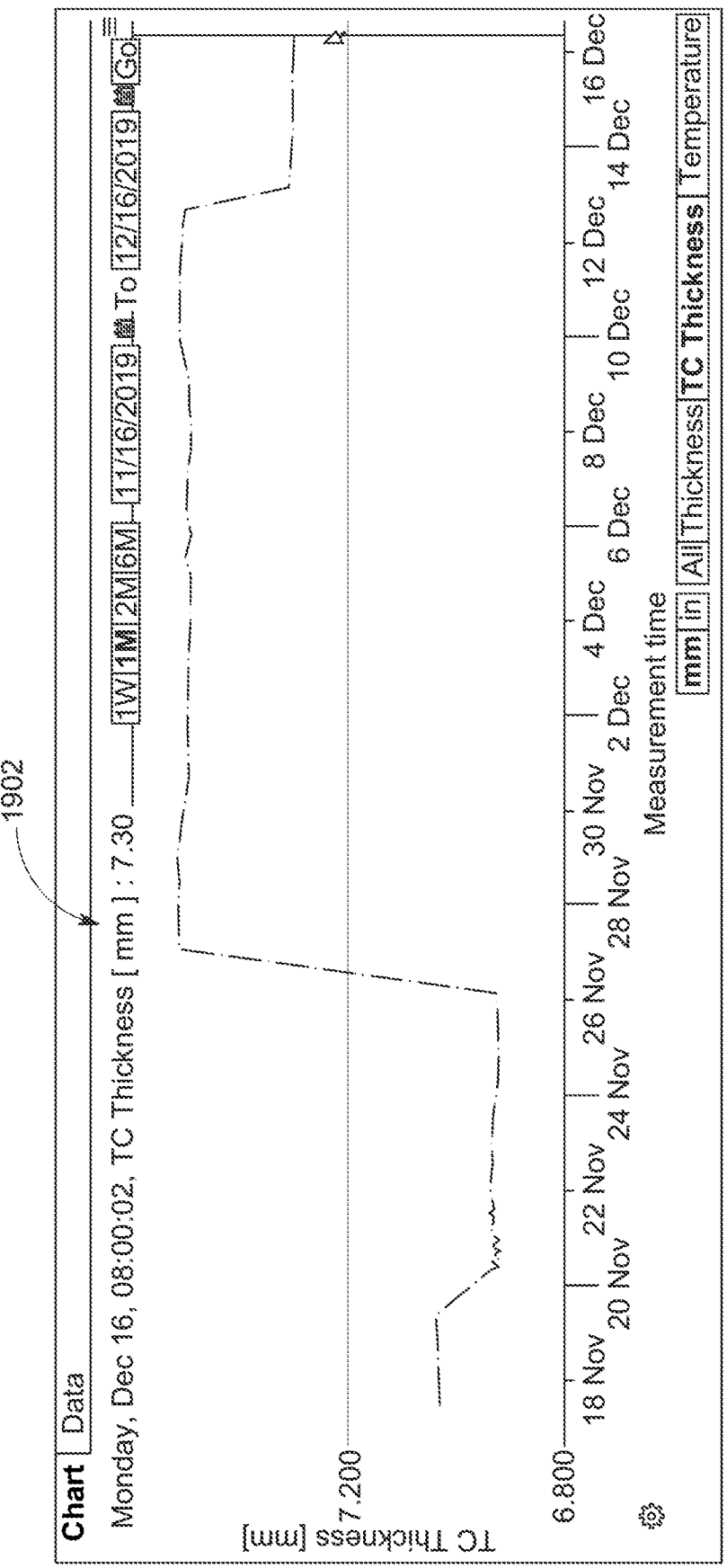
FIG. 19A and FIG. 19B are graphs in accordance with one or more aspects of the disclosure.

FIG. 19A is a graph 1902 showing the measured TC thickness in millimeters of a component over time. Alternatively, the graph may show the values of temperature calibration (in Celsius), temperature coefficient (e.g., 1%), corrosion rate ST (in millimeters per year), corrosion rate LT (in millimeters per year), remaining life of the component (in years), remaining half life (also in years), and the actual thickness (in millimeters).

Figure 19B:
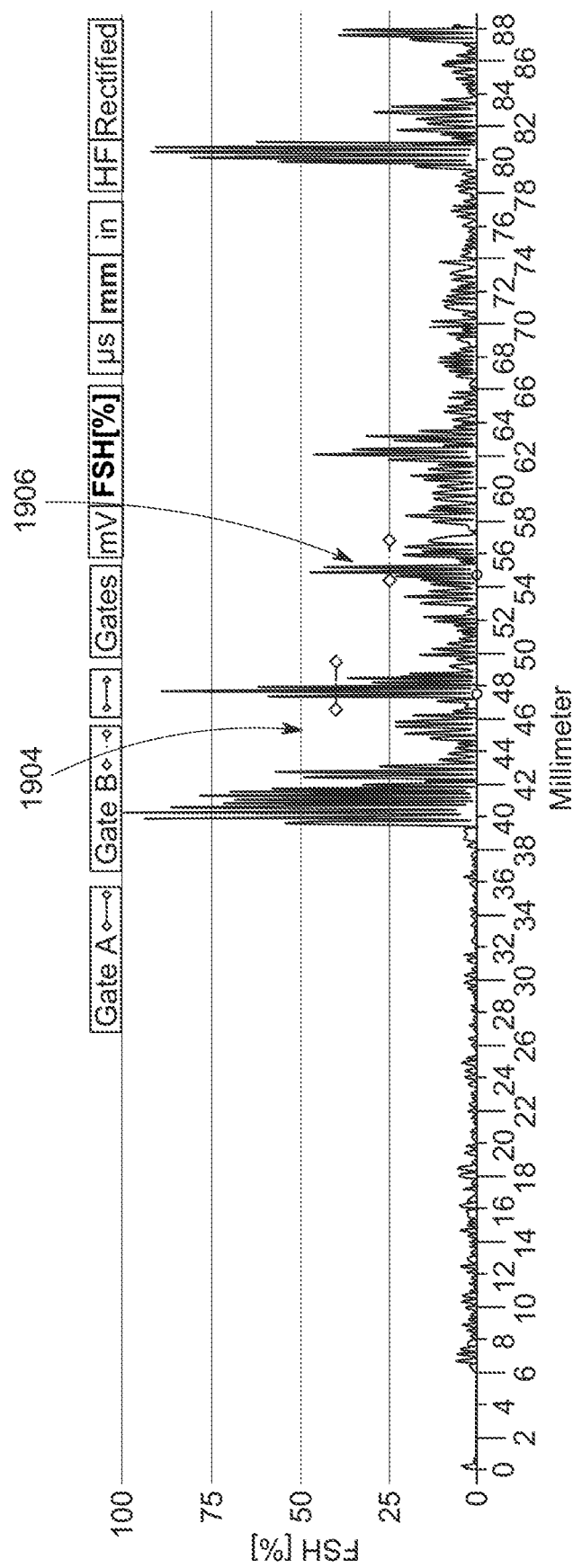

In addition, FIG. 19B is a rectified graph showing FSH (in percentage) values over thickness values (in millimeters or other units). The graph also illustrates the thickness range of Gate A 1904 and Gate B 1906. Alternatively, the graph may chart the mV value as a substitute for FSH. Moreover, in some examples, the graph may be displayed as HF instead of rectified.

Figure 20A:
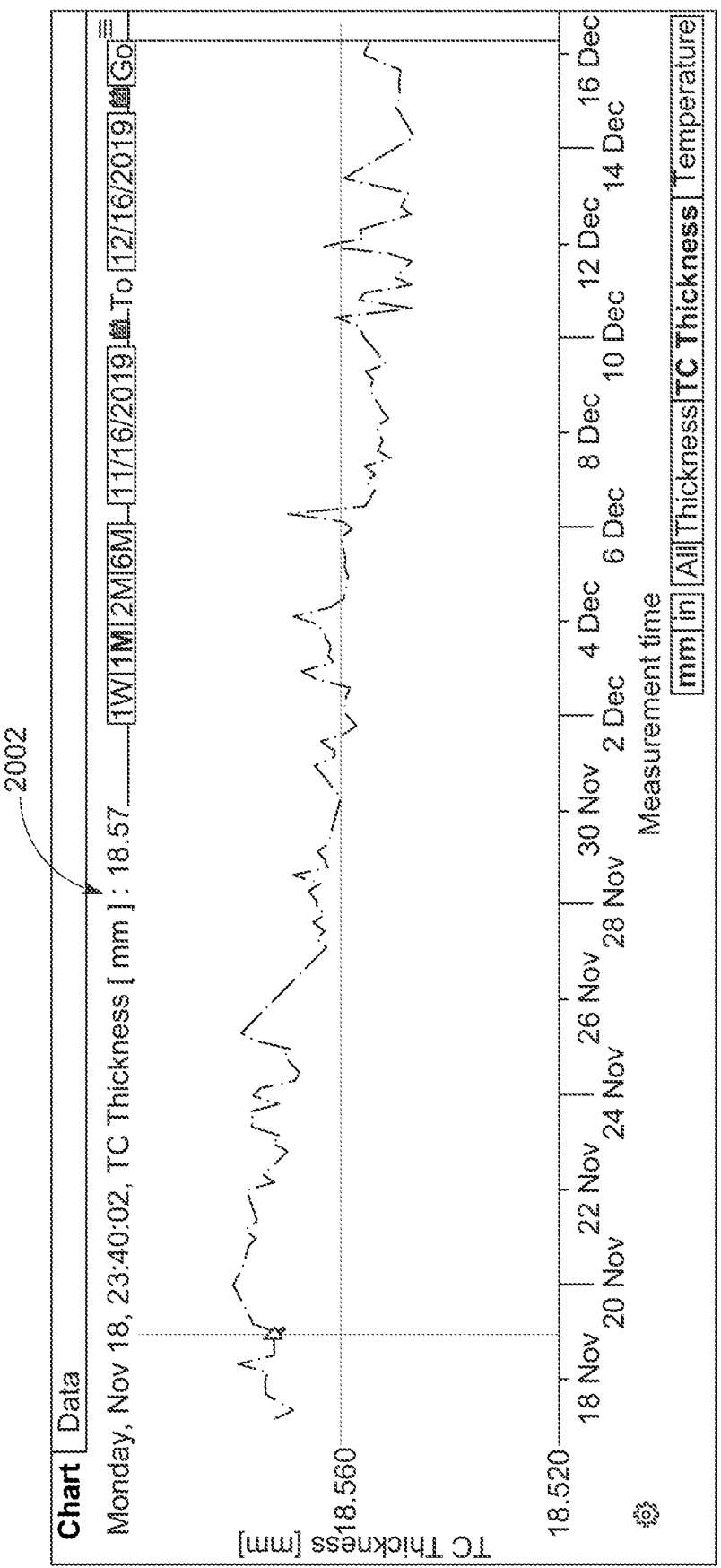
FIG. 20A and FIG. 20B are also graphs in accordance with one or more aspects of the disclosure.
Figure 20B:
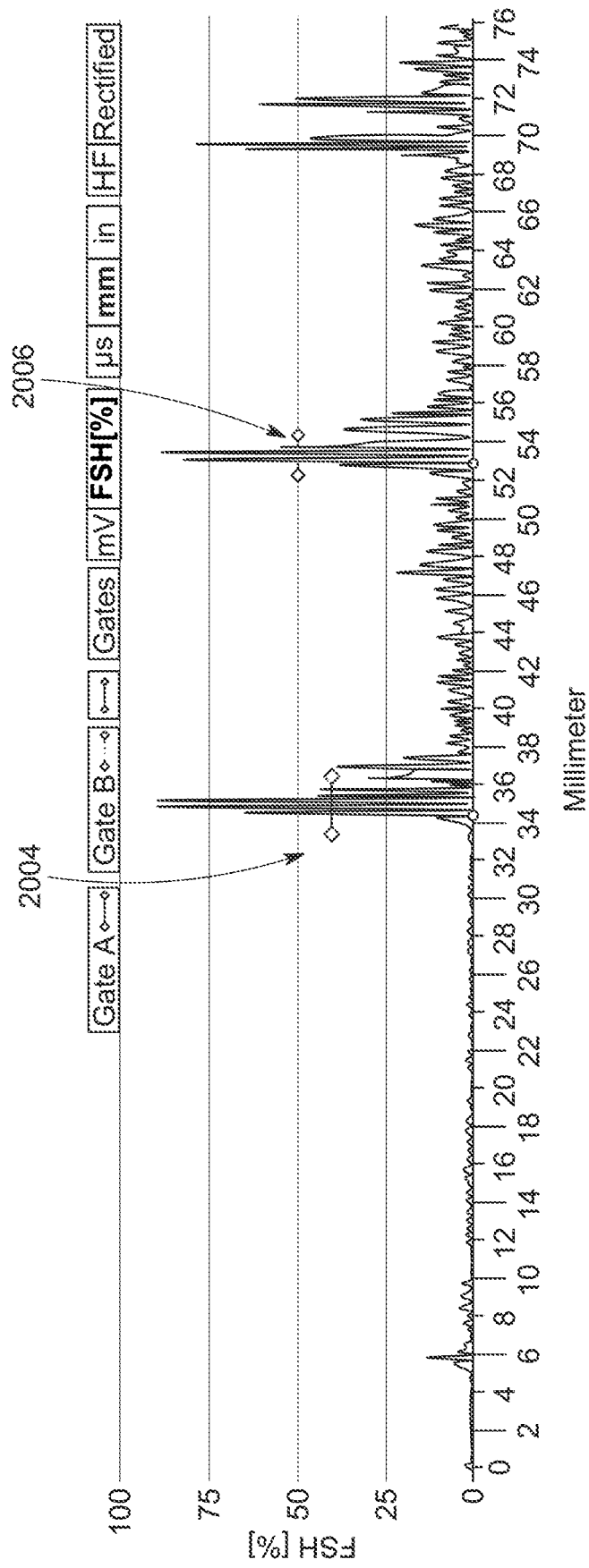

FIG. 20A is a graph 2002 of an acid battery facility showing the measured TC thickness in millimeters of a component over time. Alternatively, the graph may show the values of temperature calibration (in Celsius), temperature coefficient (e.g., 1%), corrosion rate ST (in millimeters per year), corrosion rate LT (in millimeters per year), remaining life of the component (in years), remaining half life (also in years), and the actual thickness (in millimeters). In addition, FIG. 20B is a rectified graph of an acid battery facility showing FSH (in percentage) values over thickness values (in millimeters or other units). The graph also illustrates the thickness range of Gate A 2004 and Gate B 2006. Alternatively, the graph may chart the mV value as a substitute for FSH. Moreover, in some examples, the graph may be displayed as HF instead of rectified.

Figure 21:
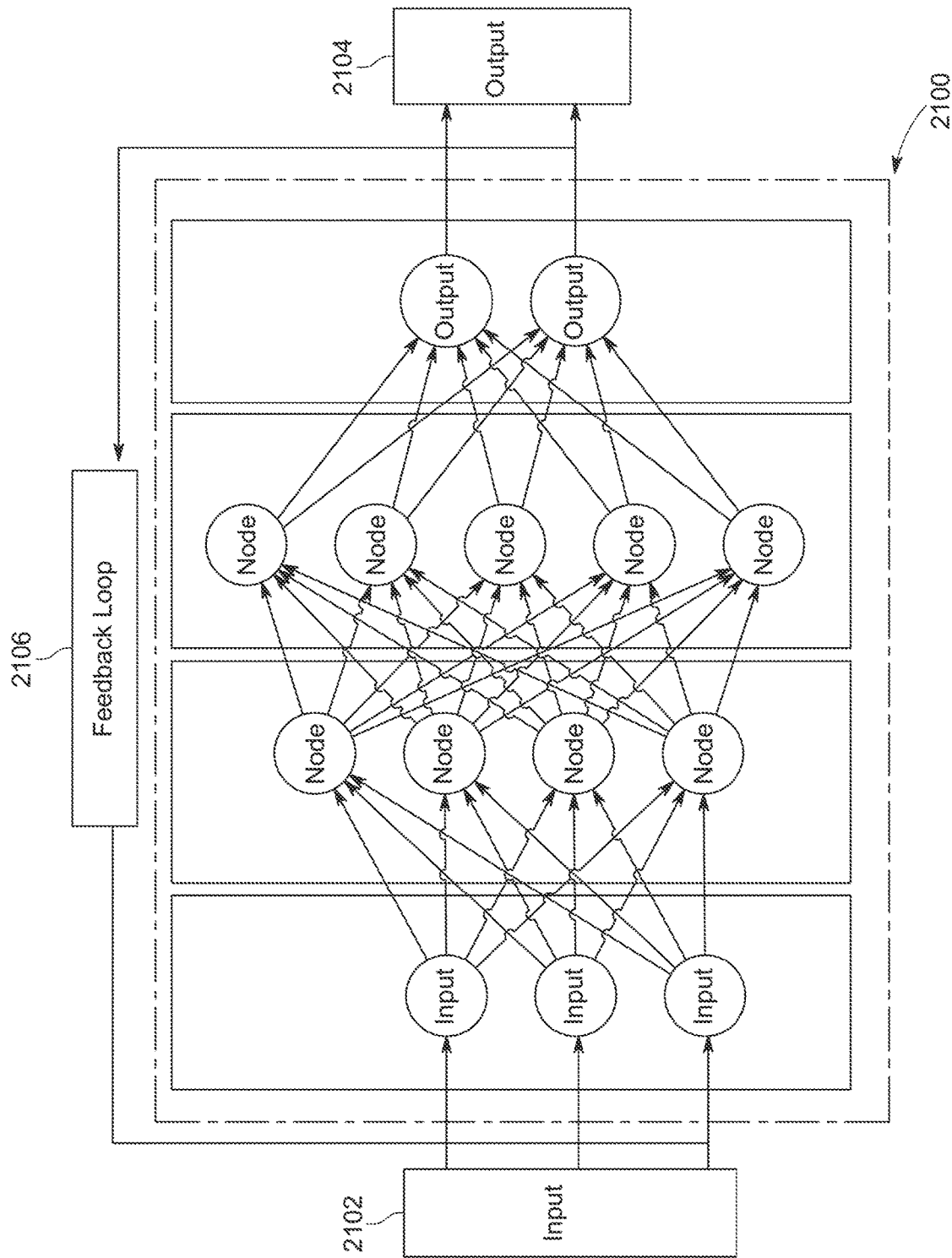
FIG. 21 shows an illustrative artificial neural network configured to operate in collaboration with systems, methods, and algorithms disclosed herein.

FIG. 21 illustrates a simplified example of an artificial neural network 2100 on which a machine learning algorithm may be executed. FIG. 21 is merely an example of nonlinear processing using an artificial neural network; other forms of nonlinear processing may be used to implement a machine learning algorithm in accordance with features described herein.

In FIG. 21, each of input nodes is connected to a first set of processing nodes. The external source 2102 which is fed into input nodes may be the metrics from the results through the steps of the methods disclosed herein. Each of the first set of processing nodes is connected to each of a second set of processing nodes. Each of the second set of processing nodes is connected to each of output nodes. Though only two sets of processing nodes are shown, any number of processing nodes may be implemented. Similarly, though only four input nodes, five processing nodes, and two output nodes per set are shown in FIG. 21, any number of nodes may be implemented per set. Data flows in FIG. 21 are depicted from left to right: data may be input into an input node, may flow through one or more processing nodes, and may be output by an output node. Input into the input nodes may originate from an external source 2102. Output 2104 may be sent to a feedback system 2106 and/or to data store. The feedback system 2106 may send output to the input nodes for successive processing iterations with the same or different input data.

In one illustrative method using feedback system 2106, the system may use machine learning to determine an output. The output may include a leak area boundary, a multi-sensor detection event, confidence values, and/or classification output. The system may use an appropriate machine learning model including xg-boosted decision trees, auto-encoders, perceptron, decision trees, support vector machines, regression, and/or a neural network. The neural network may be an appropriate type of neural network including a feed forward network, radial basis network, recurrent neural network, long/short term memory, gated recurrent unit, auto encoder, variational autoencoder, convolutional network, residual network, Kohonen network, and/or other type. In one example, the output data in the machine learning system may be represented as multi-dimensional arrays, an extension of two-dimensional tables (such as matrices) to data with higher dimensionality.

The neural network may include an input layer, a number of intermediate layers, and an output layer. Each layer may have its own weights. The input layer may be configured to receive as input one or more feature vectors described herein. The intermediate layers may be convolutional layers, pooling layers, dense (fully connected) layers, and/or other types. The input layer may pass inputs to the intermediate layers. In one example, each intermediate layer may process the output from the previous layer and then pass output to the next intermediate layer. The output layer may be configured to output a classification or a real value. In one example, the layers in the neural network may use an activation function such as a sigmoid function, a Tanh function, a ReLu function, and/or other functions. Moreover, the neural network may include a loss function. A loss function may, in some examples, measure a number of missed positives; alternatively, it may also measure a number of false positives. The loss function may be used to determine error when comparing an output value and a target value. For example, when training the neural network, the output of the output layer may be used as a prediction and may be compared with a target value of a training instance to determine an error. The error may be used to update weights in each layer of the neural network.

In one example, the neural network may include a technique for updating the weights in one or more of the layers based on the error. The neural network may use gradient descent to update weights. Alternatively, the neural network may use an optimizer to update weights in each layer. For example, the optimizer may use various techniques, or combination of techniques, to update weights in each layer. When appropriate, the neural network may include a mechanism to prevent overfitting—regularization (such as L1 or L2), dropout, and/or other techniques. The neural network may also increase the amount of training data used to prevent overfitting.

In one example, FIG. 21 depicts nodes that may perform various types of processing, such as discrete computations, computer programs, and/or mathematical functions implemented by a computing device. For example, the input nodes may comprise logical inputs of different data sources, such as one or more data servers. The processing nodes may comprise parallel processes executing on multiple servers in a data center. And, the output nodes may be the logical outputs that ultimately are stored in results data stores, such as the same or different data servers as for the input nodes. Notably, the nodes need not be distinct. For example, two nodes in any two sets may perform the exact same processing. The same node may be repeated for the same or different sets.

Each of the nodes may be connected to one or more other nodes. The connections may connect the output of a node to the input of another node. A connection may be correlated with a weighting value. For example, one connection may be weighted as more important or significant than another, thereby influencing the degree of further processing as input traverses across the artificial neural network. Such connections may be modified such that the artificial neural network 2100 may learn and/or be dynamically reconfigured. Though nodes are depicted as having connections only to successive nodes in FIG. 21, connections may be formed between any nodes. For example, one processing node may be configured to send output to a previous processing node.

Input received in the input nodes may be processed through processing nodes, such as the first set of processing nodes and the second set of processing nodes. The processing may result in output in output nodes. As depicted by the connections from the first set of processing nodes and the second set of processing nodes, processing may comprise multiple steps or sequences. For example, the first set of processing nodes may be a rough data filter, whereas the second set of processing nodes may be a more detailed data filter.

The artificial neural network 2100 may be configured to effectuate decision-making. As a simplified example for the purposes of explanation, the artificial neural network 2100 may be configured to detect faces in photographs. The input nodes may be provided with a digital copy of a photograph. The first set of processing nodes may be each configured to perform specific steps to remove non-facial content, such as large contiguous sections of the color red. The second set of processing nodes may be each configured to look for rough approximations of faces, such as facial shapes and skin tones. Multiple subsequent sets may further refine this processing, each looking for further more specific tasks, with each node performing some form of processing which need not necessarily operate in the furtherance of that task. The artificial neural network 2100 may then predict the location on the face. The prediction may be correct or incorrect.

The feedback system 2106 may be configured to determine whether or not the artificial neural network 2100 made a correct decision. Feedback may comprise an indication of a correct answer and/or an indication of an incorrect answer and/or a degree of correctness (e.g., a percentage). For example, in the facial recognition example provided above, the feedback system 2106 may be configured to determine if the face was correctly identified and, if so, what percentage of the face was correctly identified. The feedback system may already know a correct answer, such that the feedback system may train the artificial neural network 2100 by indicating whether it made a correct decision. The feedback system may comprise human input, such as an administrator telling the artificial neural network 2100 whether it made a correct decision. The feedback system may provide feedback (e.g., an indication of whether the previous output was correct or incorrect) to the artificial neural network 2100 via input nodes or may transmit such information to one or more nodes. The feedback system may additionally or alternatively be coupled to the storage such that output is stored. The feedback system may not have correct answers at all, but instead base feedback on further processing: for example, the feedback system may comprise a system programmed to identify faces, such that the feedback allows the artificial neural network 2100 to compare its results to that of a manually programmed system.

The artificial neural network 2100 may be dynamically modified to learn and provide better input. Based on, for example, previous input and output and feedback from the feedback system 2106, the artificial neural network 2100 may modify itself. For example, processing in nodes may change and/or connections may be weighted differently. Following on the example provided previously, the facial prediction may have been incorrect because the photos provided to the algorithm were tinted in a manner which made all faces look red. As such, the node which excluded sections of photos containing large contiguous sections of the color red could be considered unreliable, and the connections to that node may be weighted significantly less. Additionally, or alternatively, the node may be reconfigured to process photos differently. The modifications may be predictions and/or guesses by the artificial neural network 2100, such that the artificial neural network 2100 may vary its nodes and connections to test hypotheses.

The artificial neural network 2100 need not have a set number of processing nodes or number of sets of processing nodes, but may increase or decrease its complexity. For example, the artificial neural network 2100 may determine that one or more processing nodes are unnecessary or should be repurposed, and either discard or reconfigure the processing nodes on that basis. As another example, the artificial neural network 2100 may determine that further processing of all or part of the input is required and add additional processing nodes and/or sets of processing nodes on that basis.

The feedback provided by the feedback system 2106 may be mere reinforcement (e.g., providing an indication that output is correct or incorrect, awarding the machine learning algorithm a number of points, or the like) or may be specific (e.g., providing the correct output). For example, the machine learning algorithm may be asked to detect faces in photographs. Based on an output, the feedback system may indicate a score (e.g., 75% accuracy, an indication that the guess was accurate, or the like) or a specific response (e.g., specifically identifying where the face was located). In one example, a human operator/inspector may focus the inspection on a down-selected list of TMLs. Once any localized corrosion has been confirmed and repaired, a human operator may indicate as much so that the model 1412 can be updated to reflect the new wall thickness values. In addition, in some examples, a localized corrosion may be erroneously identified in the system 1400, and supervised human input into a machine learning or neural network executing in the digital analytics platform 112 may refine its alerts and model accordingly.

The artificial neural network 2100 may be supported or replaced by other forms of machine learning. For example, one or more of the nodes of artificial neural network 2100 may implement a decision tree, associational rule set, logic programming, regression model, cluster analysis mechanisms, Bayesian network, propositional formulae, generative models, and/or other algorithms or forms of decision-making. The artificial neural network 2100 may effectuate deep learning.

Figure 22:
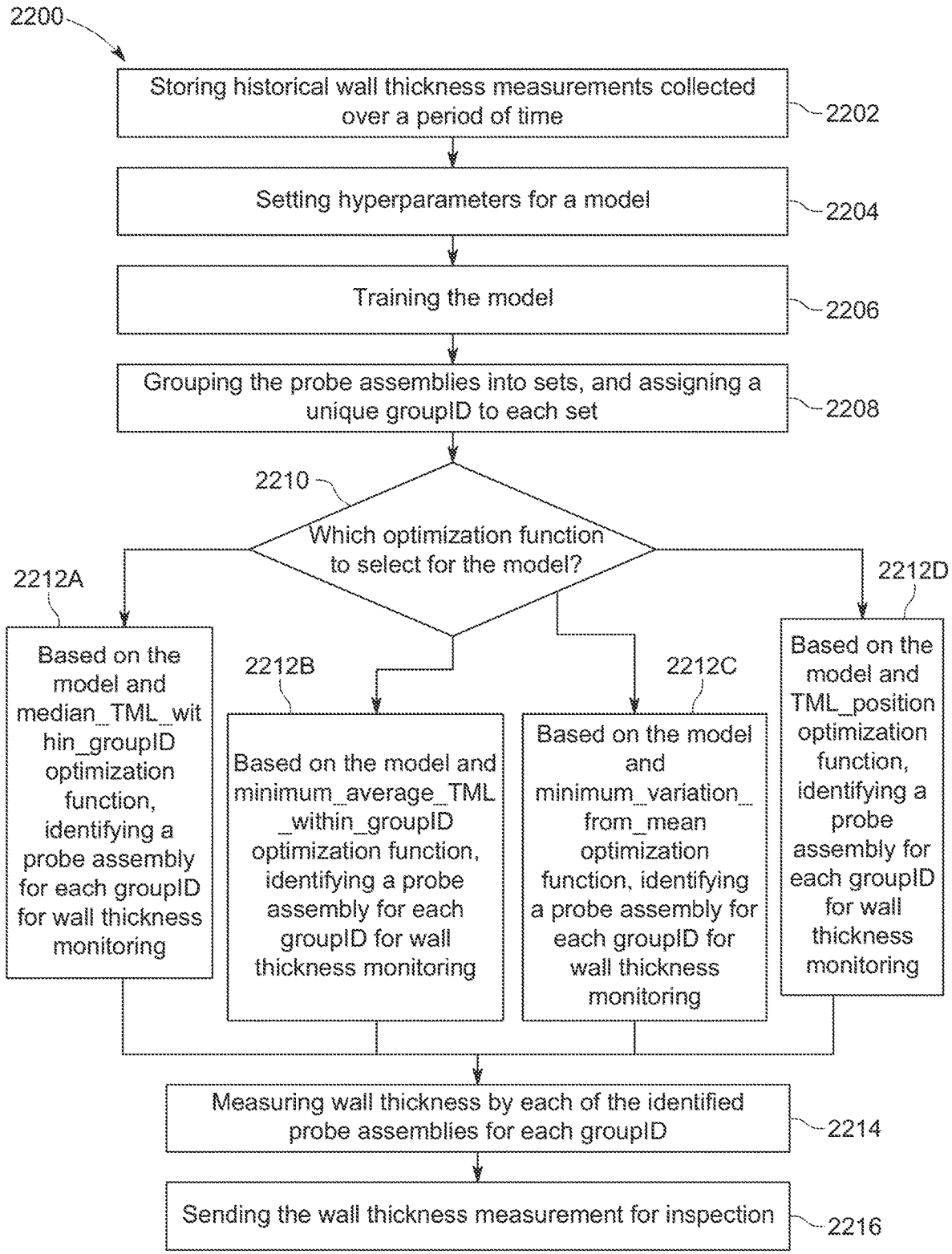
FIG. 22 is a flowchart showing illustrative steps of a method performed in accordance with some embodiments disclosed herein.

FIG. 22 is a flowchart showing illustrative steps of a method 2200 performed in accordance with some embodiments disclosed herein. The method 2200 may be performed by a system 1400 when computer-executable instructions, which are stored in a non-transitory computer-readable medium, are executed by a processor. The method 2200 may, among other things, down-select from among probe assemblies installed on a piping system in an industrial facility. As a result, the system and method for optimized asset health monitoring is improved because representative measurement locations are identified through down selection and the remaining probe assemblies can be disregarded during routine inspections of the piping system and other components in an industrial facility.

Regarding FIG. 22, in step 2202, the system is storing, in a computer memory 1406 communicatively coupled to the processor 1402, historical pipe wall thickness measurements collected over a period of time from the probe assemblies 150A installed on the piping system in the industrial facility. In step 2204, the data analytics platform 112 may set one or more hyperparameters, such as but not limited to a grouping_sensitivity hyperparameter, a threshold_measurements hyperparameter, a group_size hyperparameter, and/or combination thereof. Once the hyperparameters are set, in step 2206, the system 1400 may begin training the model with at least the historical pipe wall thickness measurements stored in the computer memory 1406 and hyperparameter values stored in computer memory 1404.

In step 2208, the model stored in computer memory 1404 may group a first set of the probe assemblies from among the numerous probe assemblies installed on the piping system. As explained in this disclosure, such as with respect to FIG. 15, several methods are provided by which the grouping may occur in the model. After grouping the probe assemblies, the data analytics platform 112 may assign a unique group identifier (groupID) to each set of probe assemblies. The unique groupID may be any identifier that the system 1400 can use to uniquely refer to the group of probe assemblies.

In step 2210, the data analytics platform 112 selects, based on at least the trained model, an optimization function for the operation of the system 1400. Numerous illustrative optimization functions are described in this disclosure, including but not limited to a median_TML_within_groupID optimization function, minimum_average_TML_within_groupID optimization function, minimum_variation_from_mean optimization function, and/or TML_position optimization function. The decision to select a specific optimization function causes subsequent identification and measurement steps to be effected. For example, in steps 2212A, 2212B, 2212C, and 2212D (collectively "step 2212"), the system 1400 identifies, based on the model stored in the computer memory 1404 and selected optimization function, a probe assembly corresponding to each groupID for pipe wall thickness monitoring of the piping system. In some examples, the system 1400 may identify a single probe assembly for the entire groupID to be representative of the area being measured. In other examples, multiple probe assemblies may be identified to be representative of the groupID. The number of TMLs assigned to be down-selected from a group may be based on one or more rules. This is based on the value of the maximum standard deviation of the group, in one example: if any group has a maximum standard deviation less than or equal to 0.25, then one TML is chosen from the group. for an increase in max SD by 0.25, the number of TMLs selected increases by one (i.e., if it is between 0.25-0.5, then two probe assemblies may be chosen from the group, and so on). In addition, the 0.25 step value can be modified for adjusting the sensitivity of TML selection. Decreasing the 0.25 value leads to more TMLs being selected in each group (i.e., a conservative approach), and increasing the 0.25 value leads to less TMLs being selected in each group (i.e., an aggressive approach).

In step 2214, during the inspection, the system 1400 may disregard all remaining probe assemblies in each groupID except the probe assembly identified from each groupID. The system may measure the wall thickness of each of the identified probe assemblies for each groupID, but exclude the other probe assemblies in the groupID. Thus, the system down-selects from among the plurality of probe assemblies installed on a piping system. At least one benefit of down-selecting the number of probe assemblies to use during an inspection is the time savings that results. For example, a human inspector that might have previously checked each probe assembly may now check measurements at a reduced number of probe assemblies without substantially increasing the risk of missing dangerous localized corrosion. In one example, at step 2214, the system 1400 may output a human-readable report listing those probe assemblies a human inspector should manually inspect for wall thickness measurements. The output may be ordered in any of various ways—e.g., based on highest risk of localized corrosion, based on geographic convenience from a known start position of the human inspector, or other order.

For example, as illustrated in FIG. 16B and FIG. 16C, when the amount of risk is graphed against the quantity of measurement locations taken, the amount of risk is asymptotic to a threshold minimum amount of risk 1602 regardless of the number of measurement locations increases. Importantly, when the quantity of measurements is decreased, the delta change in risk increases at an increasing rate as shown by graph 1604—stated another way, reducing the number of probe assemblies that are sampled can increase the risk to an unsafe amount. The system 1400 and method 2200 disclosed herein, however, shifts the graph from an initial risk graph 1606 to a more favorable risk graph 1608. Therefore, down-selecting the number of probe assemblies required to have actively checked during an inspection, by identifying those that are the most statistically probable to be general corrosion/degradation to the piping wall, results in reduced inspection time/cost while simultaneously maintaining (or even reducing) the risk profile.

Finally, in step 2216 in FIG. 22, the thickness monitoring controller 130 may receive and send the pipe wall thickness measurement of the probe assembly from each groupID for inspection. The thickness monitoring controller 130 may send the measurement data (and any other data) to the data store 1406 for historical recordkeeping and analytics, as well as to the data analytics platform 112 for analysis and generation of visualizations. For example, the wall thickness measurements may show that a particular segment of pipe in the piping system is suffering from degradation other than general corrosion such that it rises to the level of dangerous, localized corrosion and must be replaced within a particular period of time. In another example, pipe wall thickness measurements may be taken at one or more of a pipe, tank, vessel, and/or pipeline at a facility.

While particular embodiments are illustrated in and described with respect to the drawings, it is envisioned that those skilled in the art may devise various modifications without departing from the spirit and scope of the appended claims. It will therefore be appreciated that the scope of the disclosure and the appended claims is not limited to the specific embodiments illustrated in and discussed with respect to the drawings and that modifications and other embodiments are intended to be included within the scope of the disclosure and appended drawings. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the disclosure and the appended claims. Further, the foregoing descriptions describe methods that recite the performance of several steps. Unless stated to the contrary, one or more steps within a method may not be required, one or more steps may be performed in a different order than as described, and one or more steps may be formed substantially contemporaneously. Various aspects are capable of other embodiments and of being practiced or being carried out in various different ways. In addition, the disclosure also contemplates a non-transitory computer-readable medium storing computer-executable instructions that, when executed by a controller, cause a probe assembly comprising an intelligent amplified multiplexer to perform steps of the methods disclosed herein.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. Furthermore, while the term transducer is used throughout the disclosure, that term may be used interchangeably with the term sensor, in that both are used to sense a change within an environment they are surrounded by or an object they are attached to, and that their outputs are immediately and/or eventually converted into a format that is usable by one or more computer systems disclosed herein. In addition, while the term processor is used throughout the disclosure, that term may be used interchangeably with the term controller, in that both are used to execute computer-executable instructions to cause hardware devices to operate in a specific way or perform a specific function. Similarly, while a memory is recited as sometimes storing the aforementioned computer-executable instructions that are executed by the processor or controller, a person having skill in the art, after review of the entirety disclosed herein, will recognize that the computer-executable instructions may be hardcoded into the controller or processor, e.g., in the form of an application specific integrated circuit (ASIC), field programmable gate array (FPGA), etc.

We claim:

1. A system for detecting localized corrosion in a vicinity of a longitudinal wave (LW) transducer affixed to a component that transports materials across a distance, the system comprising:
   a probe assembly comprising the LW transducer and one or more guided wave (GW) transducers affixed to the component at locations in the vicinity of the LW transducer, wherein the one or more GW transducers are activated by analog waveform signals;
   the probe assembly further comprising an intelligent amplified multiplexer of high current, high voltage inputs configured to selectively activate one of: the LW transducer and one of the one or more GW transducers;
   a transmit channel for transmitting signals from a monitoring controller to the probe assembly;
   a receive channel for receiving signals at the monitoring controller from the probe assembly; and
   the monitoring controller comprising:
      a pulser;
      an analog-to-digital (ADC) converter;
      an adjustable gain amplifier;
      a processor and a memory storing computer-executable instructions that, when executed by the processor, cause the monitor controller to perform steps comprising:
         generating, by the pulser, a short spike signal that travels through the transmit channel to activate, by the intelligent amplified multiplexer, the LW transducer;
         generating, by the same pulser, a smooth low-frequency waveform signal that travels through the transmit channel to activate, by the intelligent amplified multiplexer, a first of the one or more GW transducers;
         in response to the generating of the short spike signal, receiving by the adjustable gain amplifier and the ADC converter, through the receive channel from the probe assembly, an indication of a spot thickness measurement based on measuring time-of-flight; and
         in response to the generating of the smooth low-frequency waveform signal, receiving by the adjustable gain amplifier and the ADC converter, through the receive channel, an indication of localized corrosion by a change of signal characteristics next to the time-of-flight.

2. The system of claim 1, wherein the pulser comprises a digital switch configured to transmit a predetermined number of predetermined voltage level pulses.

3. The system of claim 2, wherein the pulser comprises a high voltage, high frequency pulser with a high voltage capacitor in a range of 0.7 F to 5.3 uF, and wherein the predetermined number of predetermined voltage level pulses is three, and wherein the predetermined voltage level pulses are 0, 50V, and −50V, and wherein the short spike signal frequency is approximately 5 MHz, and wherein the smooth low-frequency waveform signal frequency is approximately 50-500 kHz.

4. The system of claim 1, wherein the intelligent amplified multiplexer of the probe assembly is configured to receive signals through the transmit channel, filter the received signals, and route the received signals to one of the LW transducer and the first of the one or more GW transducers.

5. The system of claim 4, wherein the intelligent amplified multiplexer comprises a switch assembly with a transmit switch, a receive switch, and amplifier.

6. The system of claim 4, wherein the intelligent amplified multiplexer comprises a resistance temperature detector (RTD) interface.

7. The system of claim 1, wherein the intelligent amplified multiplexer of the probe assembly comprises a low pass filter that switches signals received through the transmit channel to trigger either the LW transducer or the first of the one or more GW transducers, but not both transducer types simultaneously.

8. The system of claim 1, wherein the probe assembly comprises one LW transducer and four GW transducers, wherein the location of each GW transducer is permanently affixed to the component within about three feet of the one LW transducer, and wherein each GW transducer is an area monitoring ultrasonic transducer, and wherein the one LW transducer is a thickness monitoring ultrasonic transducer.

9. The system of claim 8, wherein the four GW transducers are arranged along a circumference of a circle-like shape with the LW transducer near a center of the circle-like shape.

10. The system of claim 1, wherein the change of signal characteristics is a change in amplitude, and wherein the probe assembly comprises a memory storing computer-executable instructions that, when executed by a controller of the probe assembly, cause the probe assembly to perform steps comprising:
receiving the smooth low-frequency waveform signal through the transmit channel;
activating, by the intelligent amplified multiplexer, the first of the one or more GW transducers;
in response to the activating of the first of the one or more GW transducers, measuring, by a second of the one or more GW transducers, a first echo signal received through the component, wherein the first echo signal has a first time of flight and a first amplitude;
in response to the activating of the first of the one or more GW transducers, measuring, by a third of the one or more GW transducers, a second echo signal received through the component, wherein the second echo signal has a second time of flight and a second amplitude;
processing, by an amplifier and controller of the probe assembly, the first echo signal and second echo signal by baseline subtracting and digital filtering into a combined echo signal; and
transmitting the combined echo signal through the receive channel to the monitoring controller.

11. The system of claim 1, wherein the component is a tank, and the materials are a liquid material.

12. The system of claim 1, wherein the component is a vessel, and the materials are a gaseous material.

13. The system of claim 1, wherein the first of the one or more GW transducers, when activated, produces non-dispersive shear horizontal zero waves, and wherein the monitoring controller detects localized corrosion in the vicinity of the LW transducer without storing a thickness map.

14. The system of claim 1, wherein the transmit channel comprises a first cable wire, and the receive channel comprises a second cable wire different from the first cable wire.

15. The system of claim 1, wherein the transmit channel comprises a first cable wire, and the receive channel comprises a wireless communications channel.

16. A method to assist a monitoring controller in detecting localized corrosion, comprising a pulser, an analog-to-digital (ADC) converter, an adjustable gain amplifier, a processor, and a memory storing computer-executable instructions that, when executed by the processor, cause the monitoring controller to perform steps comprising:
generating, by the pulser, a short spike signal that activates, by an intelligent amplified multiplexer, a longitudinal wave (LW) transducer affixed to a fixed equipment;
generating, by the pulser, a smooth low-frequency analog waveform signal that activates, by the intelligent amplified multiplexer, a first of a plurality of guided wave (GW) transducers affixed to the fixed equipment at locations in proximity to the LW transducer;
in response to the generating of the short spike signal, receiving by the adjustable gain amplifier and the ADC converter, an indication of a thickness measurement of the fixed equipment based on measuring time-of-flight; and
in response to the generating of the smooth low-frequency analog waveform signal, receiving by the adjustable gain amplifier and the ADC converter, an indication of localized corrosion of the fixed equipment by a change of signal characteristics next to the time-of-flight;
wherein the intelligent amplified multiplexer receives high current, high voltage inputs and is configured to selectively activate one of: the LW transducer and one of the plurality of GW transducers.

17. The method of claim 16, wherein the intelligent amplified multiplexer comprises a low pass filter, and wherein in response to the generating of the smooth low-frequency analog waveform signal, the first GW transducer of the plurality of GW transducers produces a non-dispersive shear horizontal zero wave, and wherein the monitoring controller detects localized corrosion occurring in the fixed equipment without storing a thickness map.

18. The method of claim 16, wherein the change of signal characteristics is a change in amplitude, and wherein the pulser comprises a digital switch configured to transmit a predetermined number of predetermined voltage level pulses, and wherein the short spike signal is approximately 5 MHz, and wherein the smooth low-frequency analog waveform signal is approximately 50-500 kHz.

19. A method performed by a probe assembly permanently affixed to a component that transports materials, the probe assembly comprising a memory storing computer-executable instructions that, when executed by a controller of the probe assembly, cause the probe assembly to perform steps comprising:
activating, by an intelligent amplified multiplexer, a longitudinal wave (LW) transducer of the probe assembly affixed to the component, in response to receiving a short spike signal;
activating, by an intelligent amplified multiplexer, a first guided wave (GW) transducer of a plurality of GW transducers of the probe assembly affixed to the component, in response to receiving a smooth low-frequency analog waveform signal;
in response to the activating of the first GW transducer, measuring, by a second GW transducer of the plurality of GW transducers, a first echo signal received through the component, wherein the first echo signal has a first time of flight and a first amplitude;
in response to the activating of the first GW transducer, measuring, by a third GW transducer of the plurality of GW transducers, a second echo signal received through the component, wherein the second echo signal has a second time of flight and a second amplitude;
processing, by an amplifier and the controller, the first echo signal and second echo signal by baseline subtracting and digital filtering into a combined echo signal; and transmitting the combined echo signal, wherein the combined echo signal is an indication of localized corrosion in the component.

20. The method of claim 19, wherein the first GW transducer produces non-dispersive shear horizontal zero waves in the component, and wherein the combined echo signal detects localized corrosion in the component without necessarily storing a thickness map.

* * * * *